| FIG. 20 | FIG. 21 |

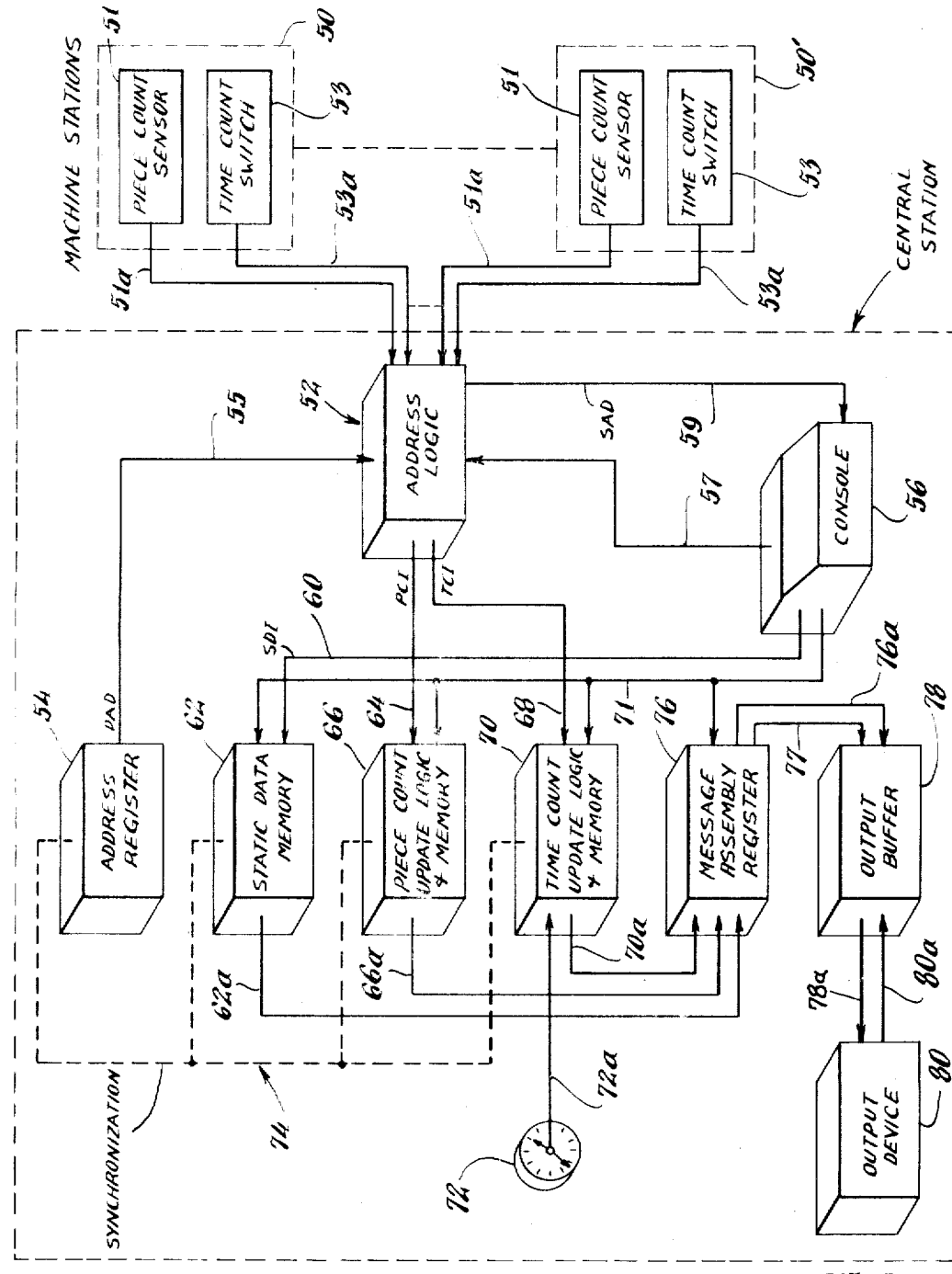

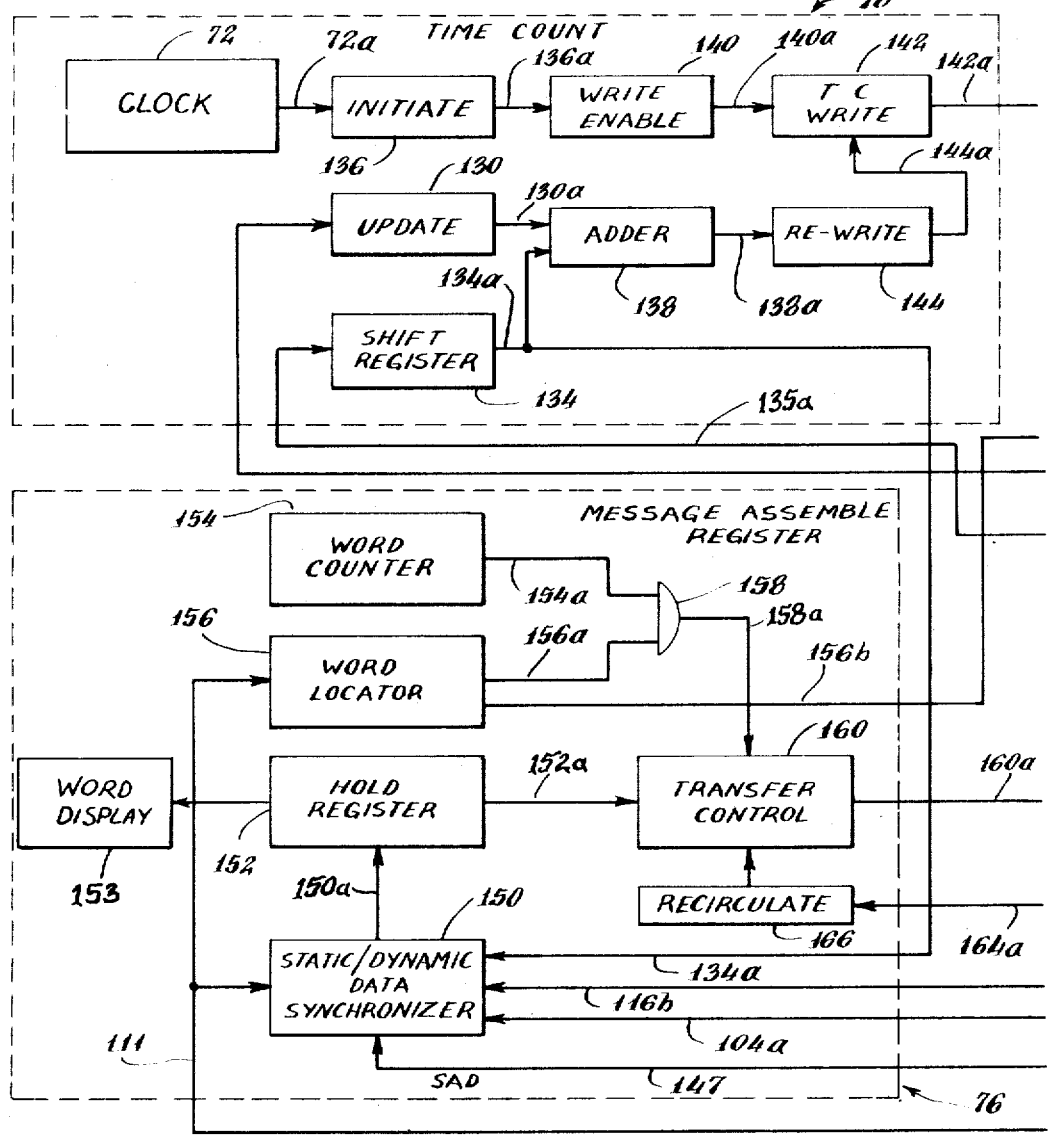
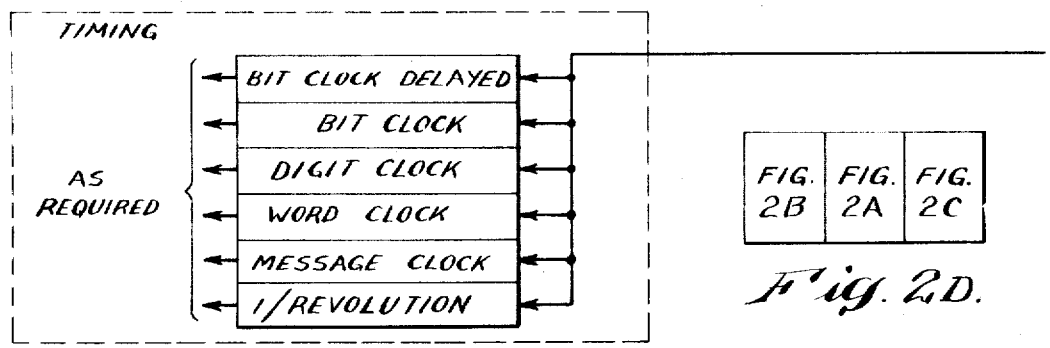
Fig. 2B.

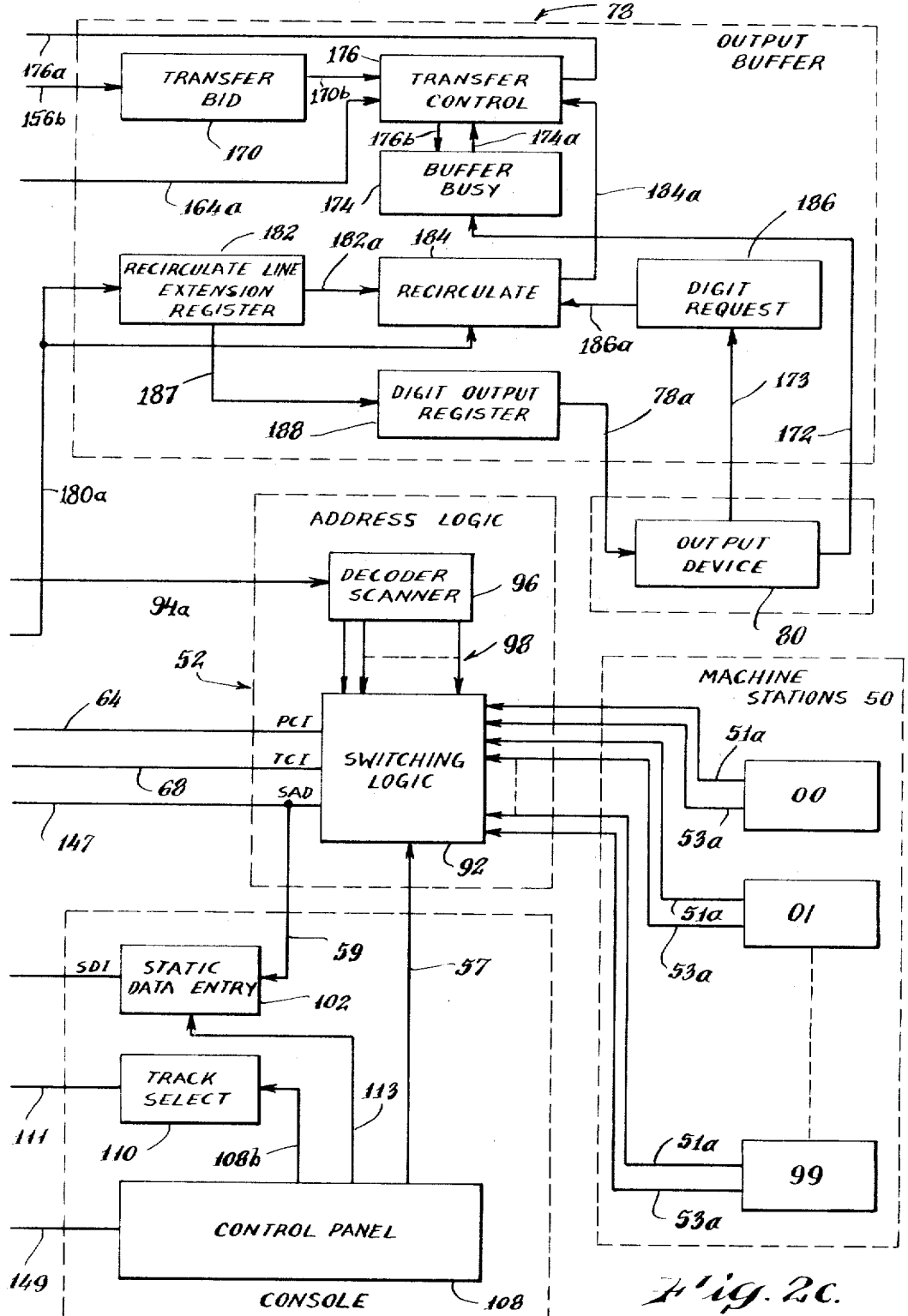

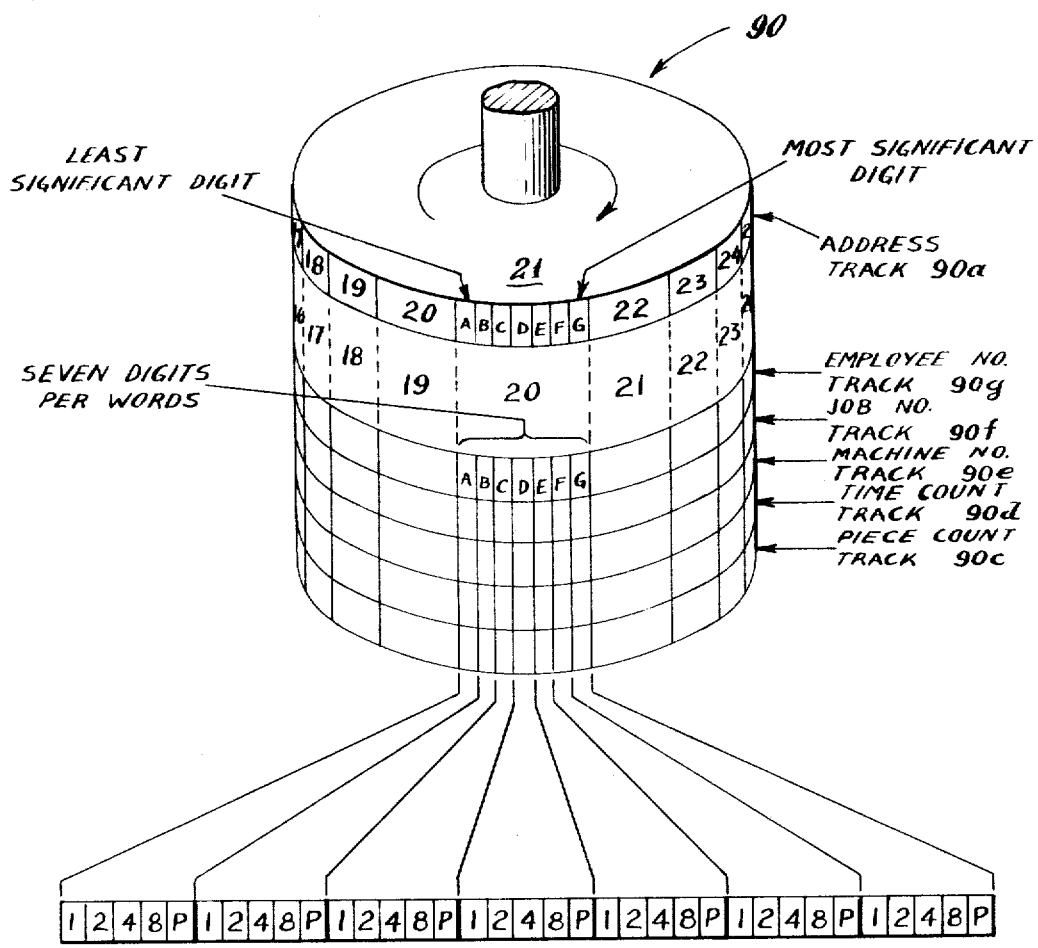

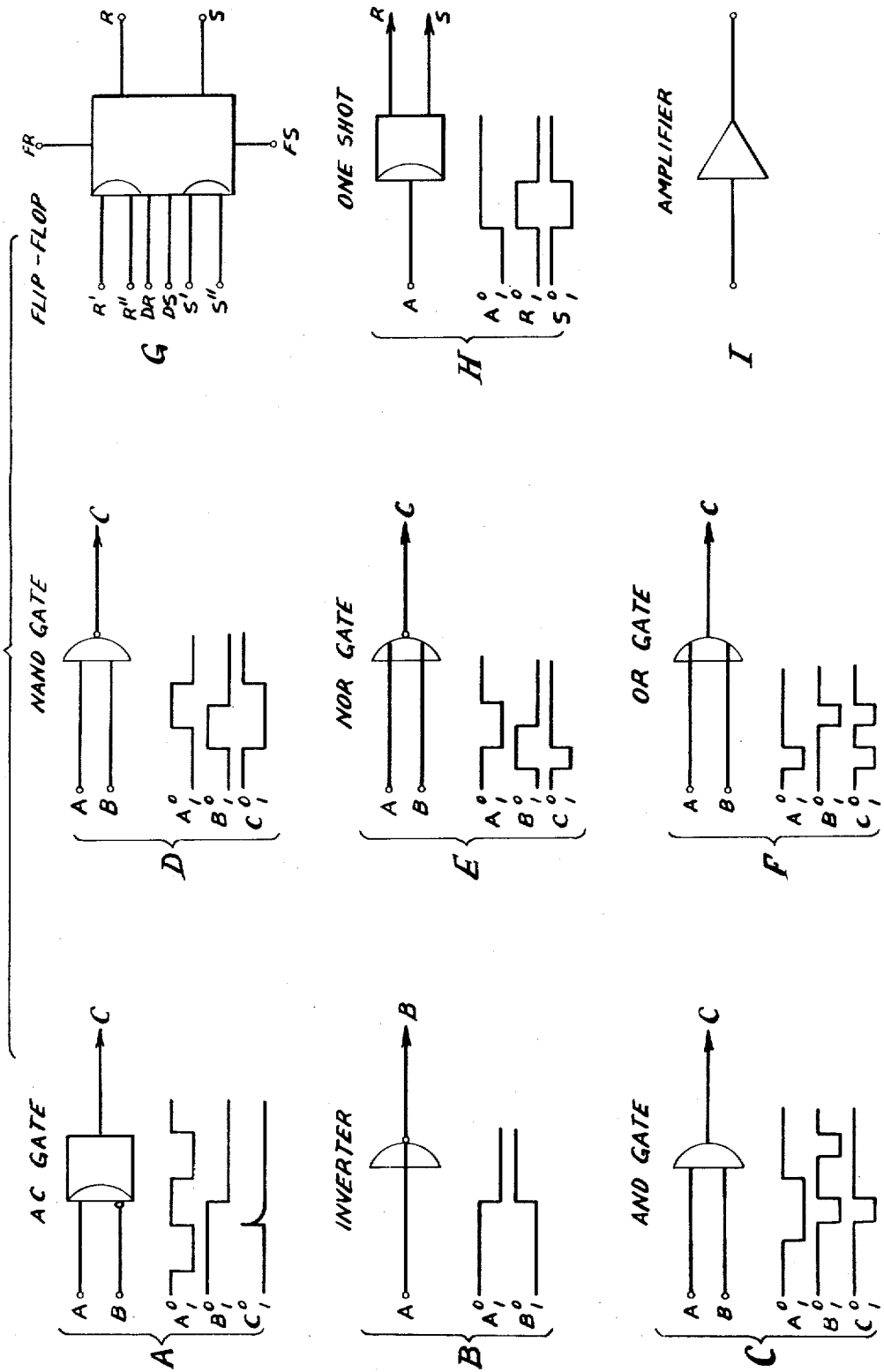

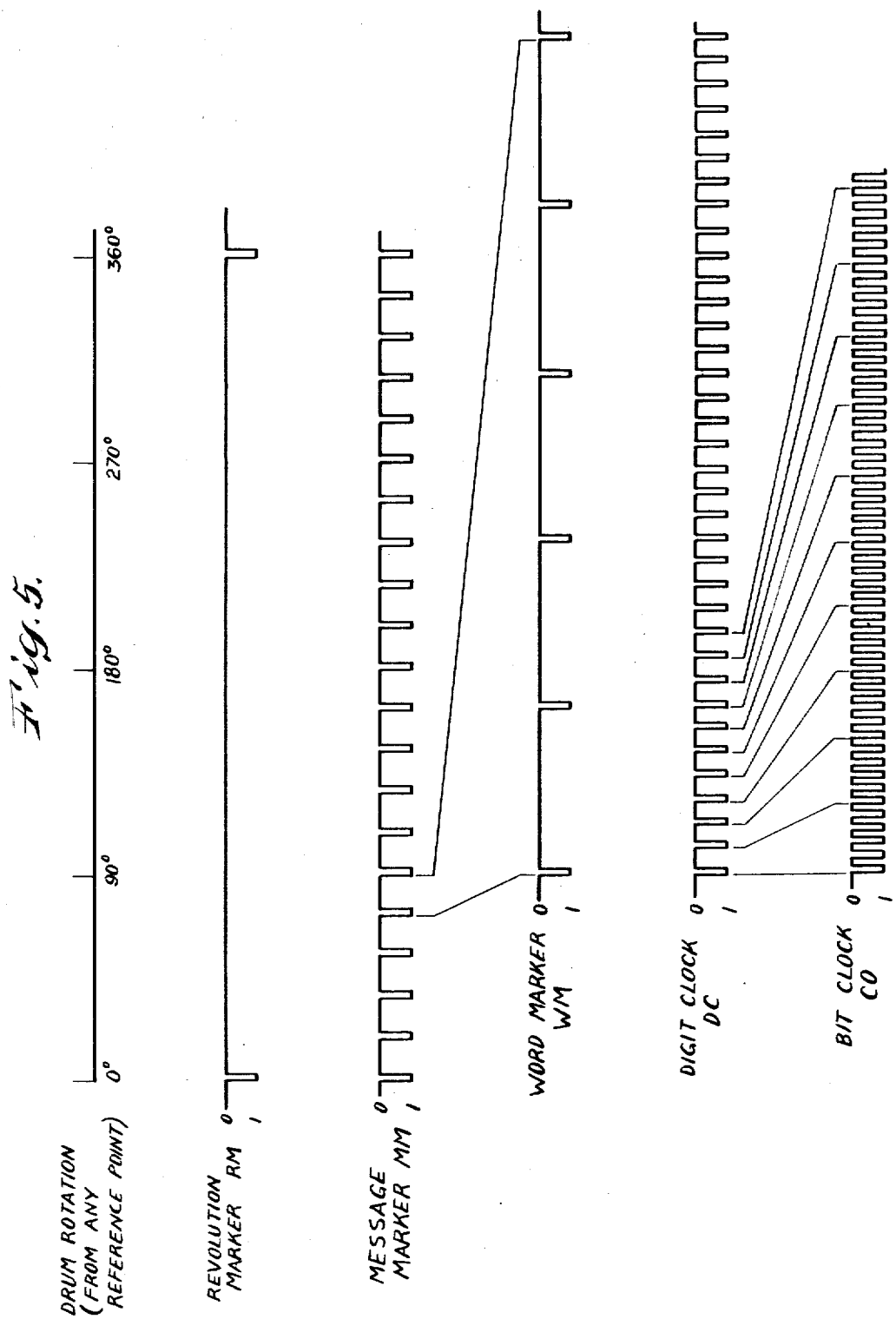

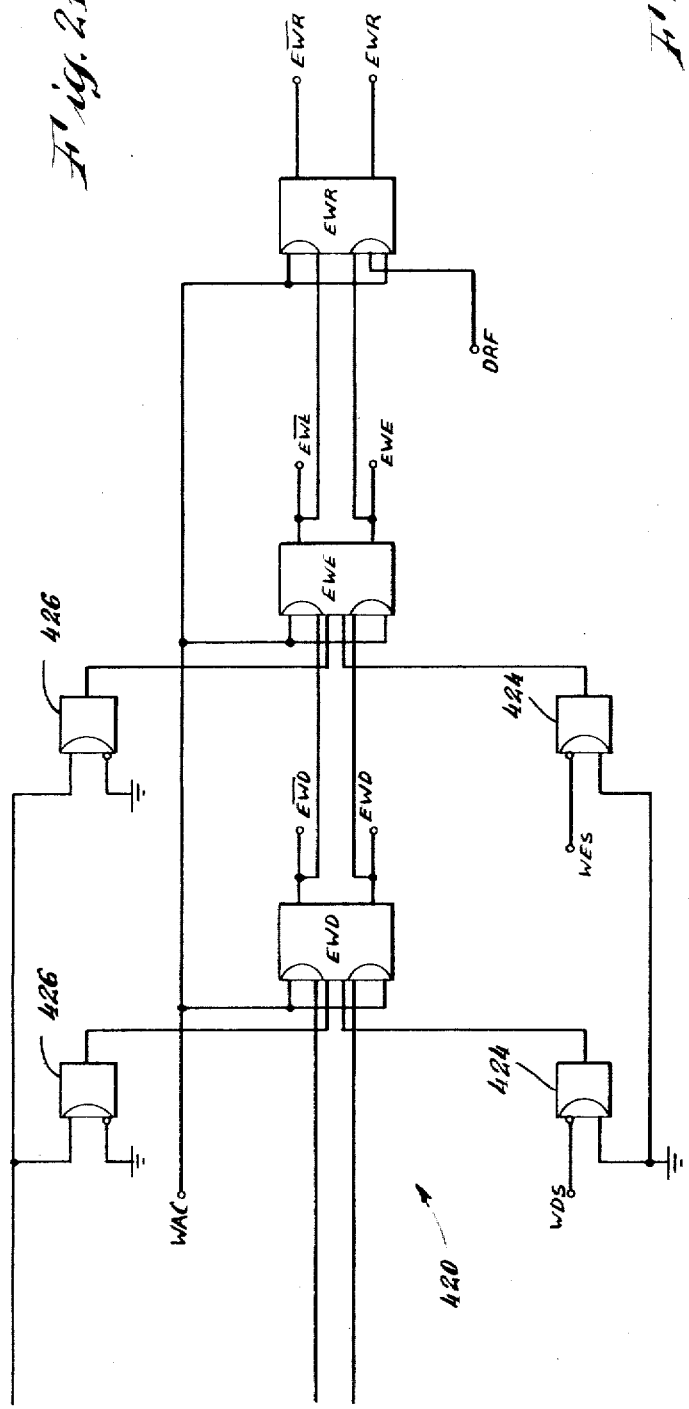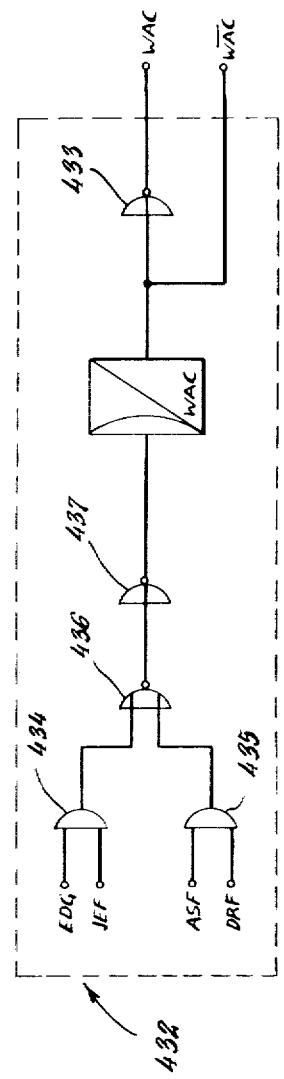
Fig. 21.
Fig. 21A

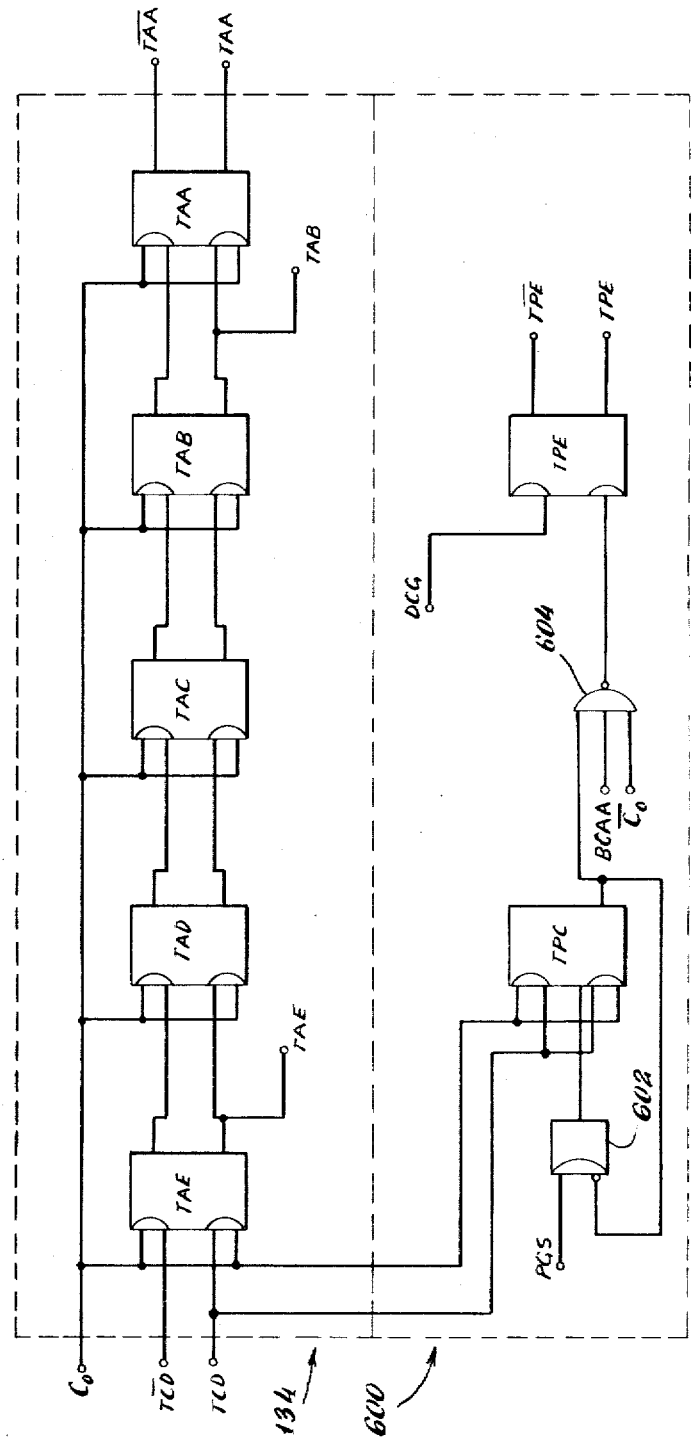

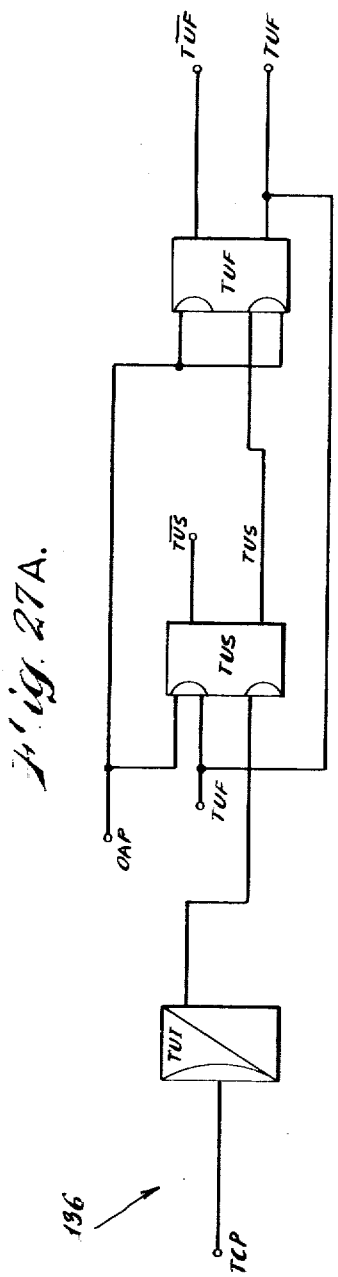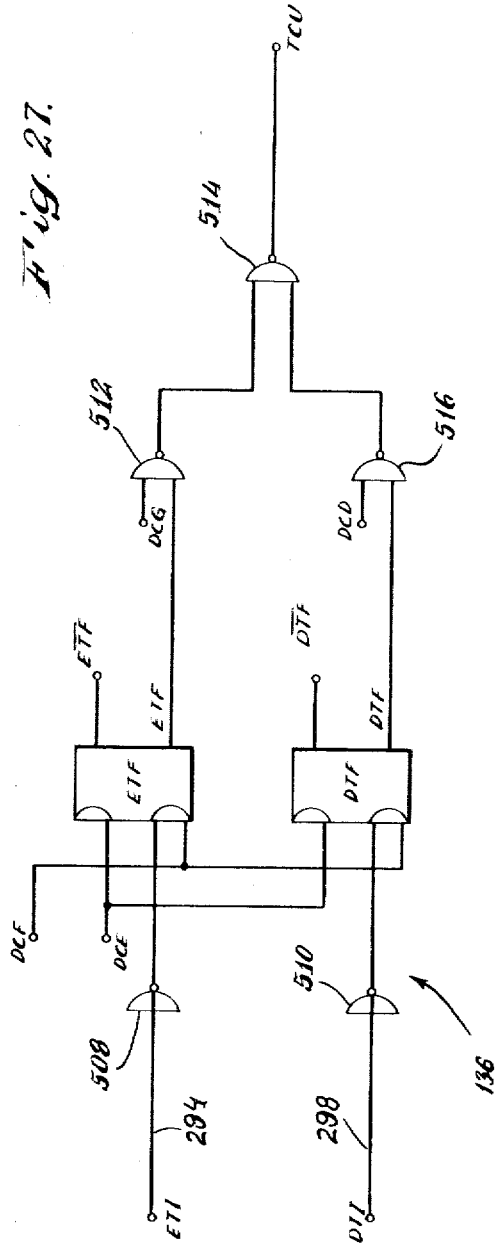

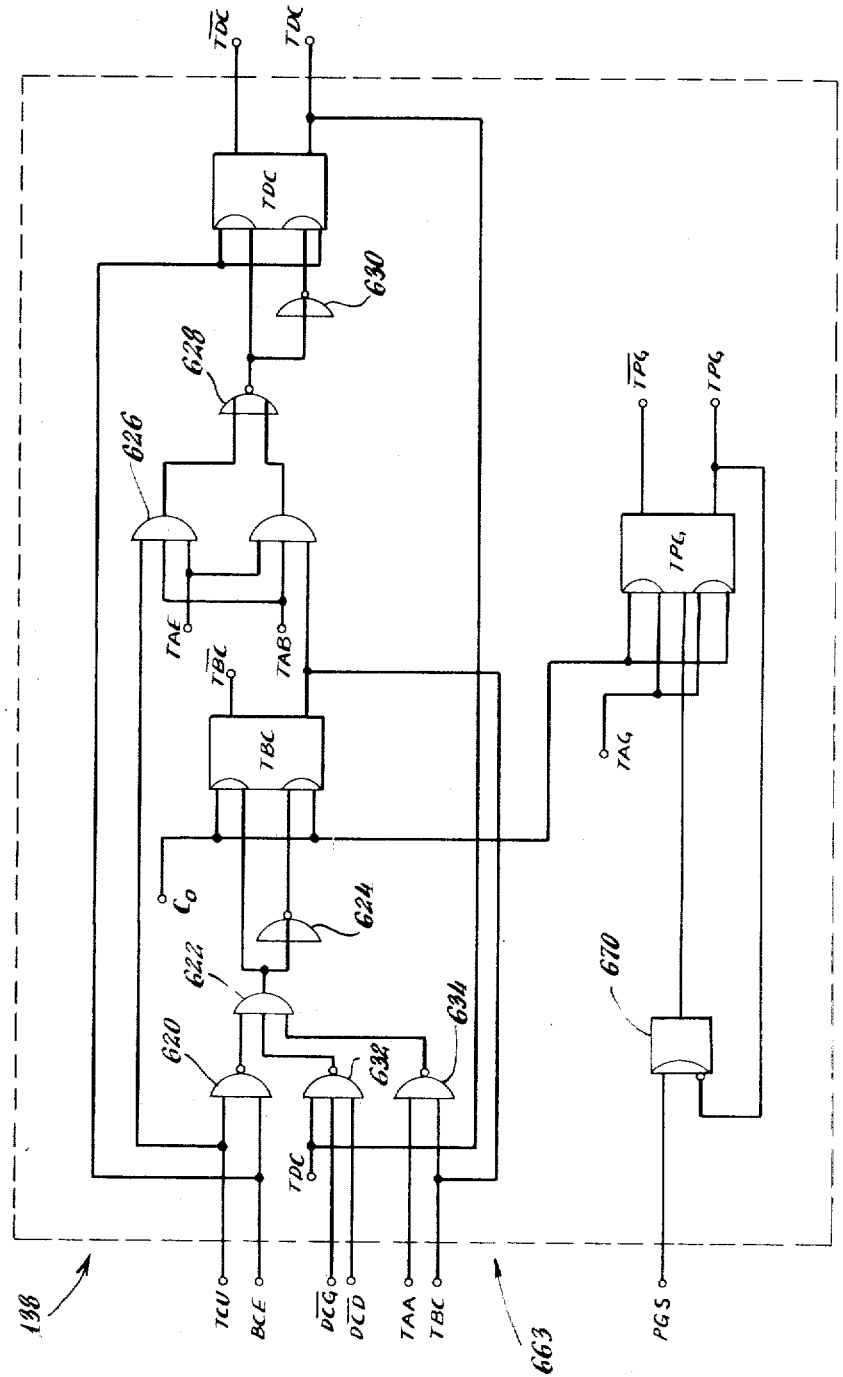

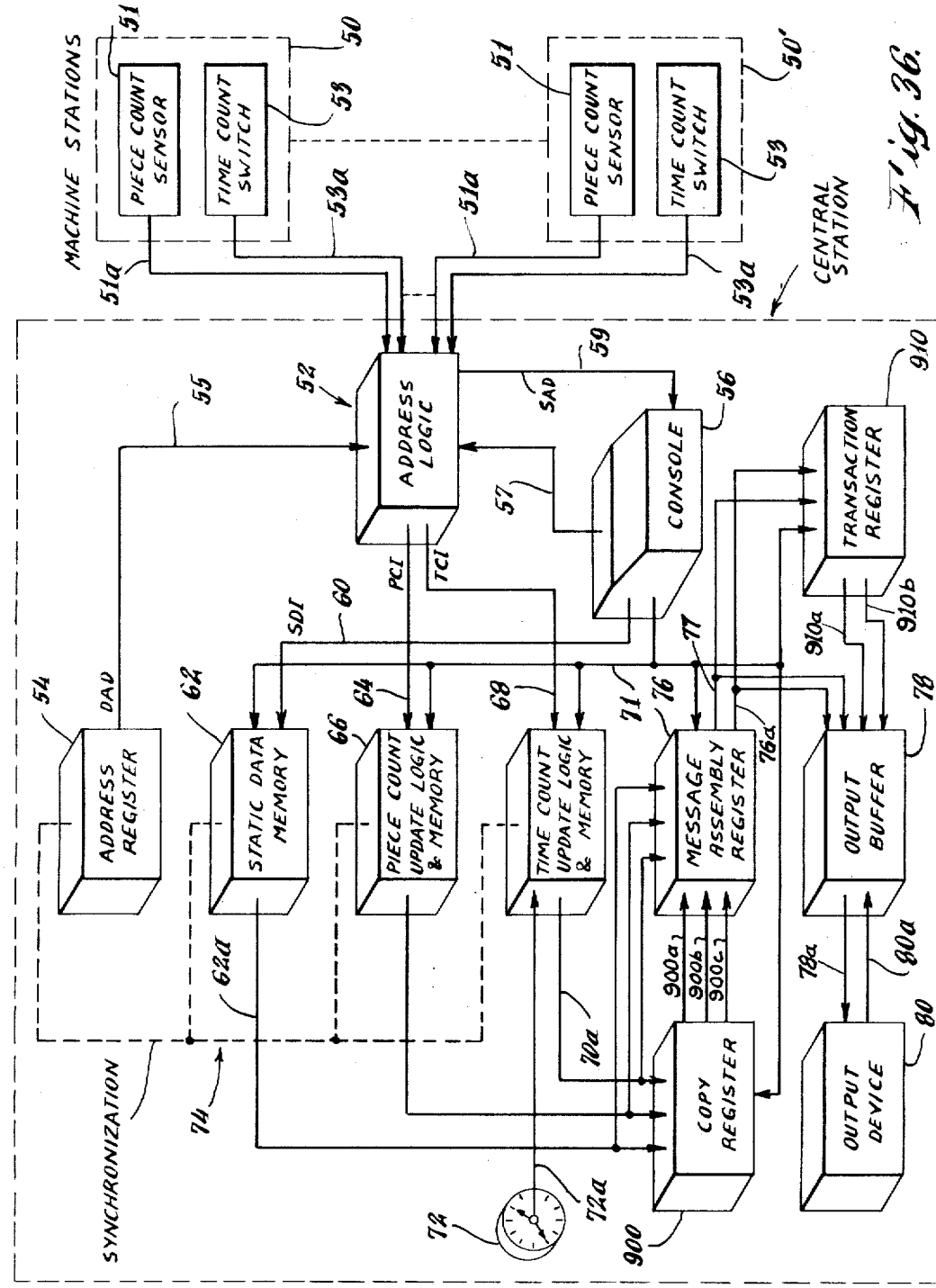

United States Patent Office 3,344,408
Patented Sept. 26, 1967

3,344,408
AUTOMATIC MONITORING SYSTEMS
AND APPARATUS
Edwin Singer and Ambros Geissler, Fairfield, Conn.,
assignors to Hancock Telecontrol Corporation, Old
Greenwich, Conn.
Filed Mar. 8, 1965, Ser. No. 437,781
92 Claims. (Cl. 340—172.5)

INTRODUCTION

The present invention relates to automatic monitoring systems and apparatus. More particularly, it relates to electronic systems and apparatus for monitoring a plurality of stations on an individual basis. The systems and apparatus of the invention accumulate data from each station, collate the accumulated data with related semistatic data, and read out the collated data in the form of individual messages. These messages provide a record facilitating the accounting for and control of the monitored operation. The apparatus of the invention counts events occurring at the monitored stations and records the time each of the monitored stations are in certain predetermined status conditions.

The invention is described with reference to a production monitoring system. However, the invention has broad applicability to many industrial monitoring systems and to the art of metering. Thus, the invention may be used in accounting for and control of industrial processes, maintenance, inventory, turnstiles and toll booths, automatic meter reading and the like.

The problems of the prior art

Efficient management of large industrial establishments requires accurate, up-to-date information relative to the progress and status of the total industrial operation. Typically, the key stations (production machines, inventory control points, process outputs, and the like) of an industrial operation are spread throughout a plant, in some instances throughout several plants. The gathering of current data from each key station for use at a central point thus is a problem, which may be characterized as one of communications. Management's need to know the total progress and current status of an operation may arise at any time. Consequently the lines of communication between the individual machines and the central points should be direct and continuous.

Current production and status information relative to individual stations enables management to efficiently manage by exception. Thus, when current operations are going according to the master plan and schedule, management may direct its efforts to planning future operations and the more efficient organization of operations under their control. Normal deviations from planned operations may be efficiently handled by line management. That is, normal breakdowns and other difficulties at individual stations can be immediately rectified by foremen, maintenance men and engineers. Materials, tools and men may be immediately assigned to key stations of the industrial operation, the servicing of less important stations being deferred. The master plan and schedule may be accurately adjusted to take into account minor difficulties in the plant. Moreover, staff management can be immediately alerted to a total breakdown in the plan or schedule when the number of adjustments required therein becomes excessive.

Immediately available up-to-date production and status information facilitates the accurate control of inventories. The quantities required by particular operations can be controlled, over and under buying and over and under production are eliminated. Current up-to-date information from the plant allows the accounting and data processing departments accurately to determine the status of any job or operation, the efficiency of machines and manpower, the availability of manpower and machines and payroll; and to keep general accounting records, and machine usage and breakdown records facilitating the most efficient parts replacement and capital expenditure programs.

As previously stated, supplying the required information for the above described total management control may be characterized as a communications problem. Many solutions of this communications problem have been proposed. These have, in the past, included the manual recording by production employees of data at certain scheduled times or at the beginning and conclusion of certain operations. Such systems are subject to human error. Furthermore, the reports must be gathered up and brought to a central point. In an operation of any complexity, they must be manually transcribed to machine form before they can be efficiently processed by modern data processing equipment.

In one class of data collecting apparatus which has been used recently, the data is in part manually entered by the production employees and in part entered by their inserting machine coded data cards in data collection transmitters. Such systems are, therefore, not readily adaptable to the efficient line management of an operation by exception.

In Patent No. 2,985,368 entitled "Production Control System" there is disclosed a system for gathering production data at a central station from individual, remotely located machine stations. Electromechanical counters assigned to the individual machine stations are located at a central station. The counters accumulate the number of pieces produced by the monitored machines as they are produced. Other electromechanical counters register the production time and idle time of the individual machines. Thus, the system of this patent provides continuous direct lines of communication from the individual machine stations to the central regions.

In order to present the gathered production data to management and accounting personnel in a readily usable form, readings of the electromechanical counters must be manually recorded on production status sheets or the like. This procedure is time-consuming and subject to human error. At the end of one work shift, for example, it is generally desirable to record the readings of all the counters and to reset them for the next work shift. When the work shifts run consecutively, there is generally not sufficient time to do all of this manually. Consequently, vital production data may be lost or improperly allocated to the wrong work shift. When the operators of the individual machines are piece workers, it is particularly important that the number of pieces produced by each be accurately recorded since their wages are determined from this record.

In Patent No. 3,099,512, entitled "System for Recording Registered Data," there is disclosed a system for automatically and rapidly reading out data registered by individual electromechanical counters. This data is printed on suitable record sheets together with predetermined static data, e.g., the employee number of the machine operator and the number of the job being worked on. This system, when used in conjunction with the system of Patent No. 2,985,368, eliminates some of the disadvantages inherent in manually transcribing the production data registered by the various electromechanical counters assigned to the individual machine stations. However, an excessive amount of time is still required to read out the large number of electromechanical counters required in most industrial operations.

Electromechanical counters are by far the largest expense items in such systems and the cost per machine station remains substantially fixed regardless of the number of machine stations. It will be appreciated that the greater the number of machine stations, the more pronounced are the advantages in employing an automatic system to gather and collate up-to-date production information. It has been suggested that common electronic means for counting cooperating with an electronic memory may be employed at a lower cost when a certain number of electromechanical counters are required in a system.

The use of electromechanical devices such as counters in a system also imparts substantial operating speed limitations to the system. While electromechanical counters are reasonably reliable, being mechanical in nature, they require some maintenance. Being somewhat bulky, an array of electromechanical counters necessary to monitor a large number of machine stations takes up a considerable amount of space at the central station. If the system is expanded to cover additional stations, an equivalent amount of additional control room space must be provided. A common electronic system and memory, however, may provide for easy expansion to monitor more stations without requiring additional bulky or expensive equipment.

Moreover, in contrast to systems using electronic components, systems using electromechanical components such as counters are relatively inflexible. Generally, electromechanical devices can perform only those functions for which they are specifically designed. Data processing systems wedded to electromechanical devices are severely limited in the varieties of acceptable input and output devices to which the system can be adapted. Such systems are particularly not adaptable to sophisticated data processing techniques. The relatively slow data rates of such systems are completely incompatible with present day high data rate electronic computers. In order for a computer to accept data processed by such systems, an elaborate output buffering stage must be used to achieve data rate compatibility and to conserve expensive computer time.

It has been suggested that an electronic counting system might employ a recirculating register providing individual data slots or word positions addressed to each monitored station. A commutator synchronized to the recirculating register would synchronize the monitoring of each station to the addressed word position assigned thereto. Such systems have many disadvantages. The commutator is an expensive and unreliable piece of apparatus. when subjected to a power failure, all the information recorded in a recirculating register is lost. Furthermore, such a system cannot readily provide means for recording status information and semi-static data that is required for total management control of an operation as above described.

Furthermore, it is desirable that an electronic monitoring system be compatible both with batch data processing and on line data processing. That is, it should be able to read out all of the data recorded therein into rather slow output equipment in a machine language compatible with low cost data processing equipment and it should also be able to read out requested data at high data rates to a computer in the computer's language and on demand of the computer. Such a system may be installed by a management before purchase of a computer and yet be compatible with a later purchased computer. The order in which messages are read out should be easily changed to meet varying requirements.

Furthermore, such a system must provide convenient means of access to the information recorded with respect to any station for immediate readout and display when required.

In order to minimize the total cost of such a system, it should provide the simplest form of data transmission links from the monitored stations to the central station requiring the lowest possible data transmission rates. The stations themselves should be free of complex equipment and all functions required with respect to a plurality of the monitored stations should be performed by common apparatus at the central station.

Objects of the invention

An object of the invention is to provide systems and apparatus for monitoring industrial operations.

Another object of the invention is to provide systems and apparatus of the above character for keeping an instantaneous record of the progress and status of an industrial operation at a central station.

Still another object of the invention is to provide systems and apparatus of the above character facilitating management by exception.

Yet another object of the invention is to provide systems and apparatus of the above character facilitating total management control of an industrial operation.

A further object of the invention is to provide systems and apparatus of the above character not subject to human error.

Still a further object of the invention is to provide systems and apparatus of the above character providing information in convenient form for data processing and accounting.

Moreover, another object of the invention is to provide systems and apparatus for monitoring individual stations.

Another object of the invention is to provide systems and apparatus for counting events at monitored stations.

Still another object of the invention is to provide systems and apparatus for measuring the time monitored stations are in predetermined status conditions.

Yet another object of the invention is to provide systems and apparatus for collating such event count and status time data.

A further object of the invention is to provide systems and apparatus for collating such dynamic event count and status time data with static data relating to each of the monitored stations.

Still a further object of the invention is to provide systems and apparatus of the above character capable of instantaneously providing individual data or collated data with respect to each monitored station for display purposes.

Yet a further object of the invention is to provide systems and apparatus of the above character providing messages comprising the collated data with respect to each monitored station.

Still another object of the invention is to provide systems and apparatus of the above character providing such messages either manually or automatically with respect to selected stations or with respect to all stations at predetermined times or at random times.

Moreover, another object of the invention is to provide station monitoring apparatus at monitored stations that is simple, trouble free and inexpensive.

Another object of the invention is to provide communication links between monitored stations and a central station that are simple, require minimum bandwidth and minimum transmission rates.

Still another object of the invention is to provide systems and apparatus of the above character employing common equipment at a central station rather than duplicating identical equipment at monitored stations.

Yet another objcet of the invention is to provide systems and apparatus of the above character compatible with both slow and fast output devices.

A further object of the invention is to provide systems and apparatus of the above character compatible with output devices requiring differing data formats.

Still a further object of the invention is to provide systems and apparatus of the above character compatible with batch and on line data processing devices.

Yet a further object of the invention is to provide systems and apparatus of the above character not subject to catastrophic data losses.

Another object of the invention is to provide systems and apparatus of the above character that may first be employed to monitor a first predetermined number of stations and then be expanded without great expense to monitor up to a second predetermined number of stations.

Yet another object of the invention is to provide systems and apparatus of the above character providing substantially instantaneous readout of all of the data recorded therein.

Moreover, another object of the invention is to provide systems and apparatus for assembling selected words into a predetermined message sequence.

Still another object of the invention is to provide systems and apparatus for transmitting the message units of a serial message to an output device in reverse serial order.

A further object of the invention is to provide a system and apparatus of the above character simultaneously converting said message units from a serial bit to a parallel bit basis.

Other objects of the invention will in part be obvious and will in part appear hereinafter.

The invention accordingly comprises the means and features of operation and combinations of functions, and the relation of one or more of such operations and functions with respect to each of the others of the system; and apparatus embodying features of construction, combinations of elements and arrangements of parts which are adapted to effect such operations and functions; all as exemplified in the following detailed disclosure.

*The figures of the drawings*

FIGURE 1 is a block diagram of one embodiment of the invention;

FIGURES 2A, 2B and 2C, when joined together in the manner shown in FIGURE 2D, form an overall logic block diagram of the embodiment of the invention of FIGURE 1;

FIGURE 3 is a physical layout of the magnetic drum shown in FIGURE 2A showing the preferred physical relationship as recorded on the magnetic drum of the various data processed by the system of the invention;

FIGURE 4 is a diagram of the various logic elements employed in the specific embodiment of the invention disclosed, together with diagrams showing their functions;

FIGURE 5 is a timing diagram of the various clock pulses recorded on the magnetic drum of FIGURE 2A used for synchronizing the operation of the system of the present invention;

Figure 2A:
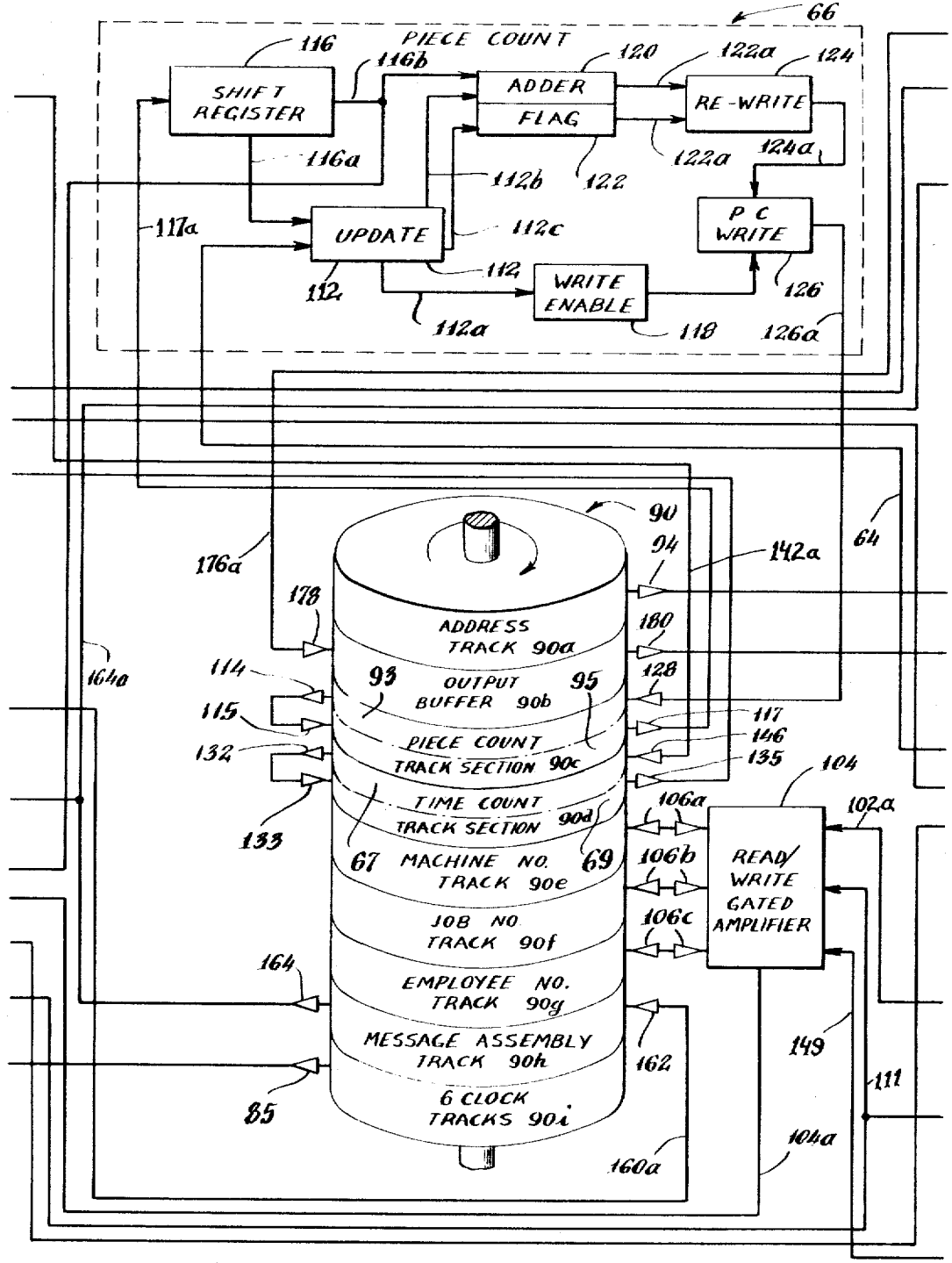
Figure 11:
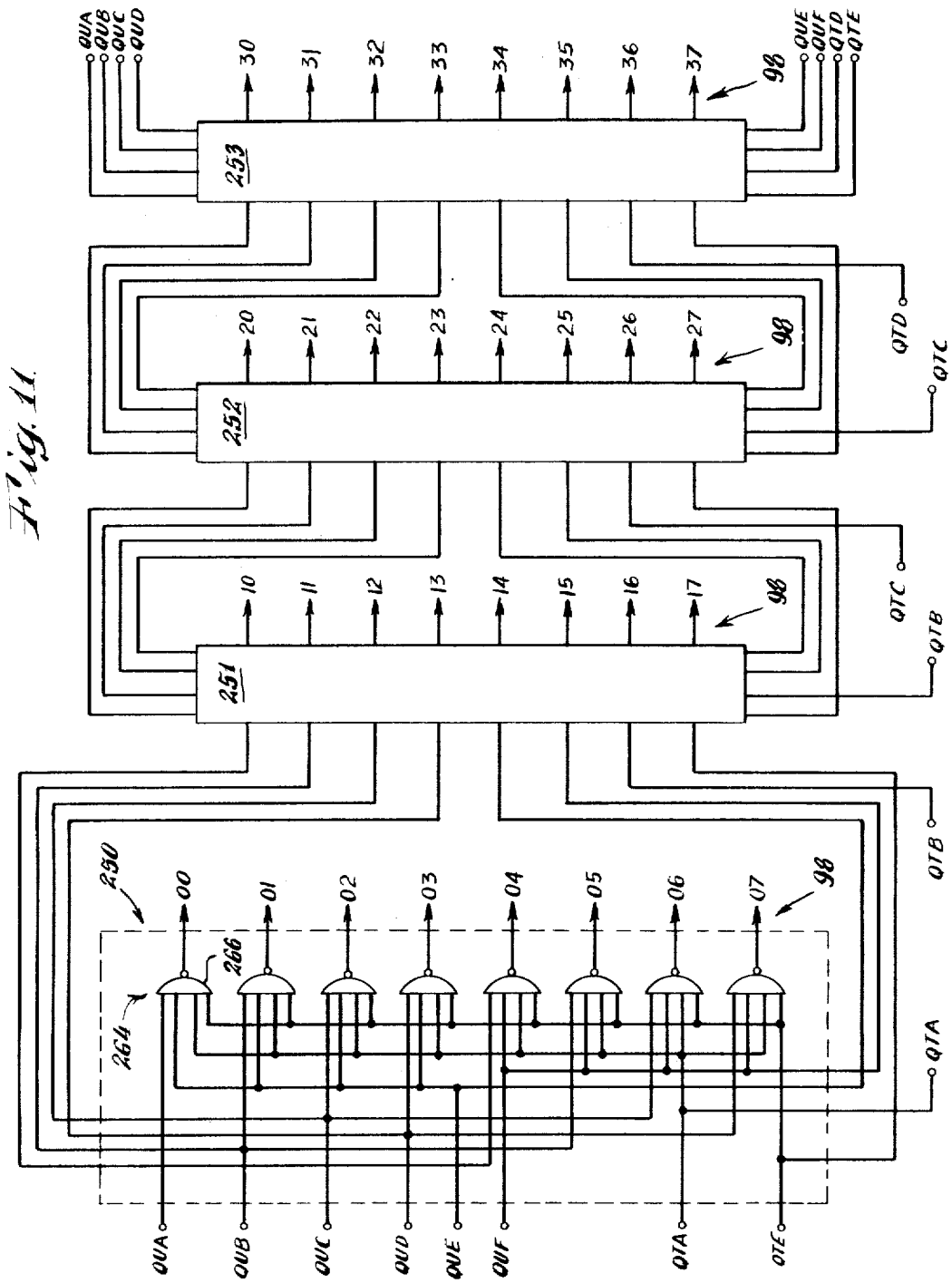
Figure 12:
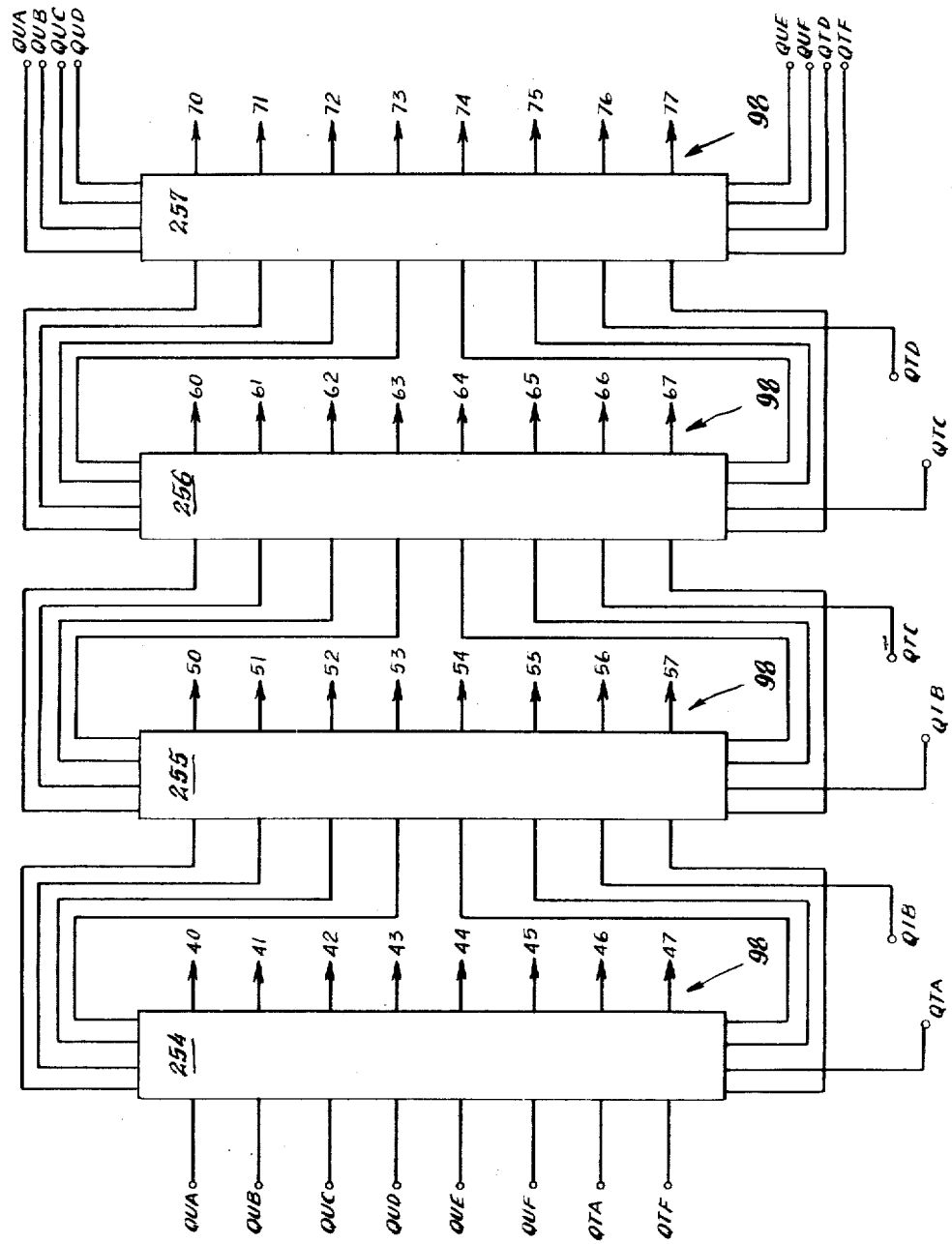
Figure 13:
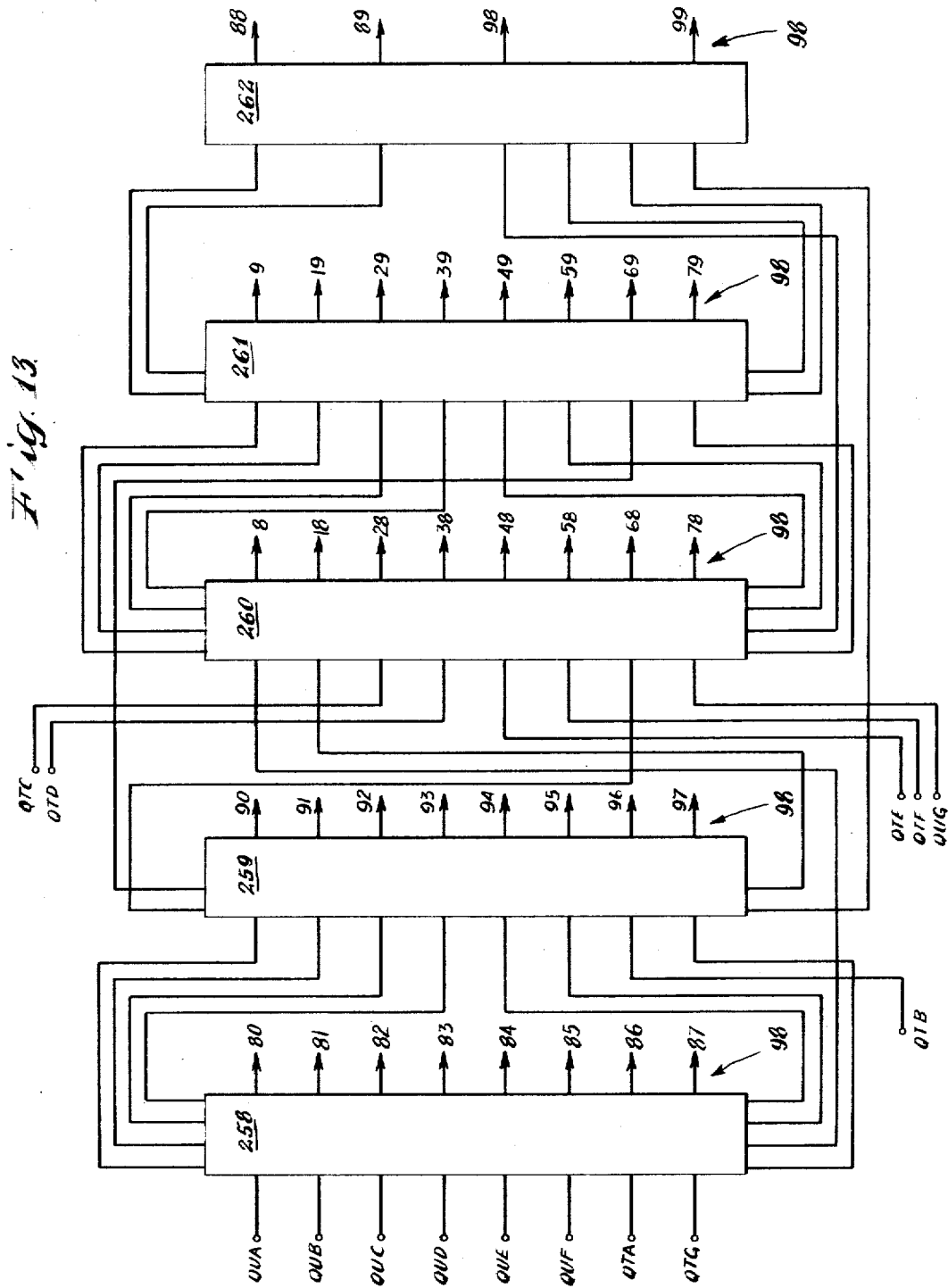
Figure 14:
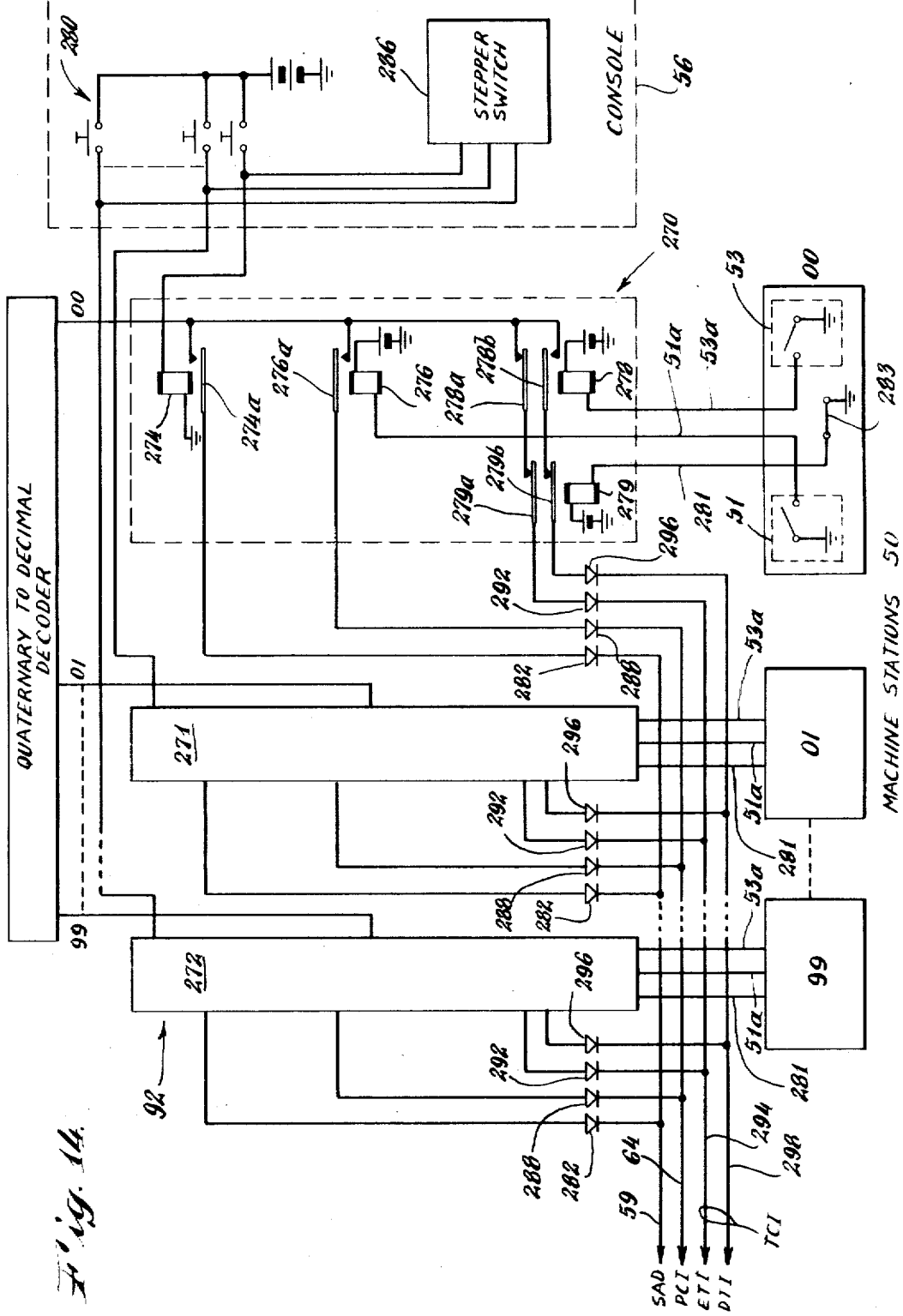
Figure 15:
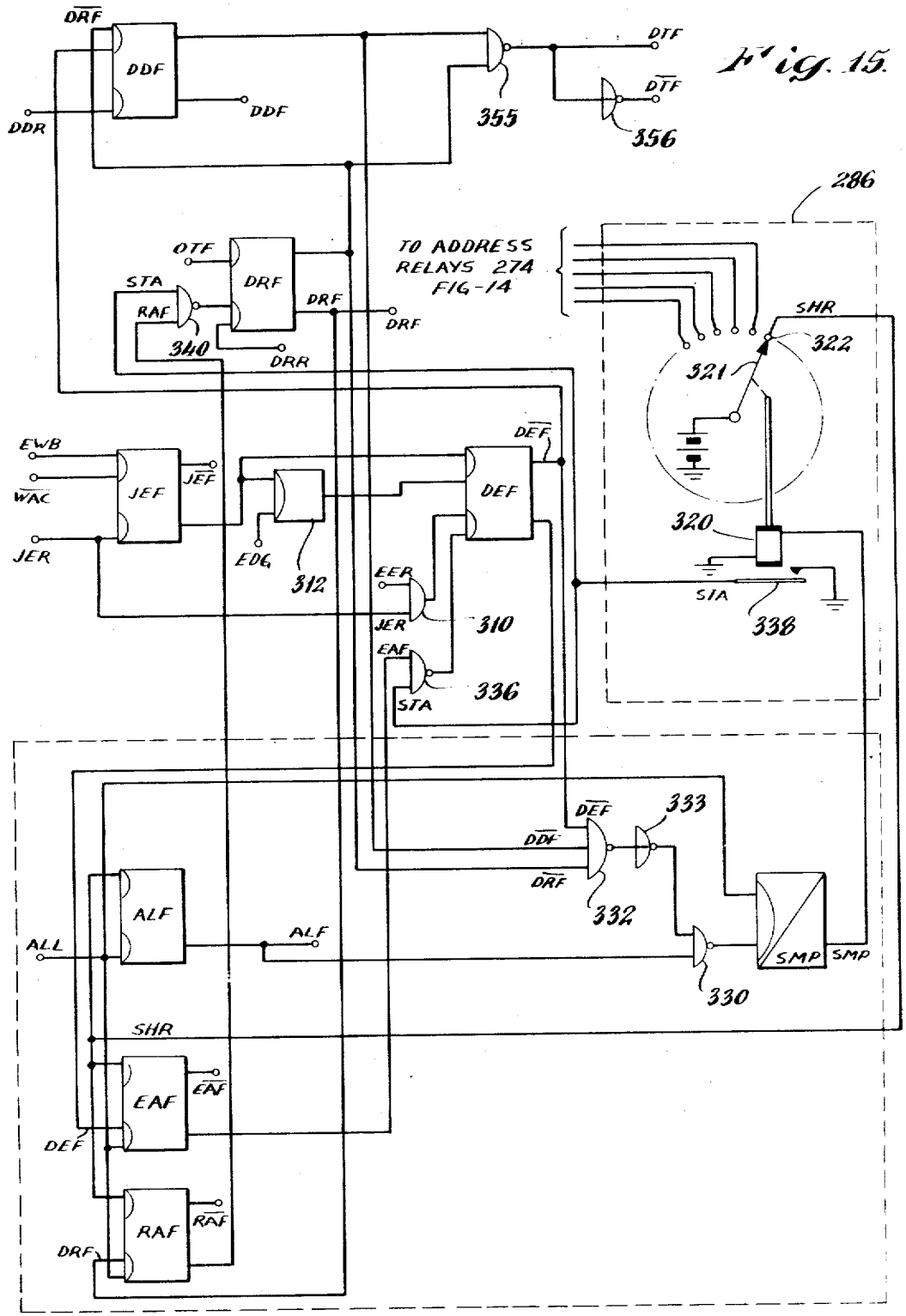
Figure 16:
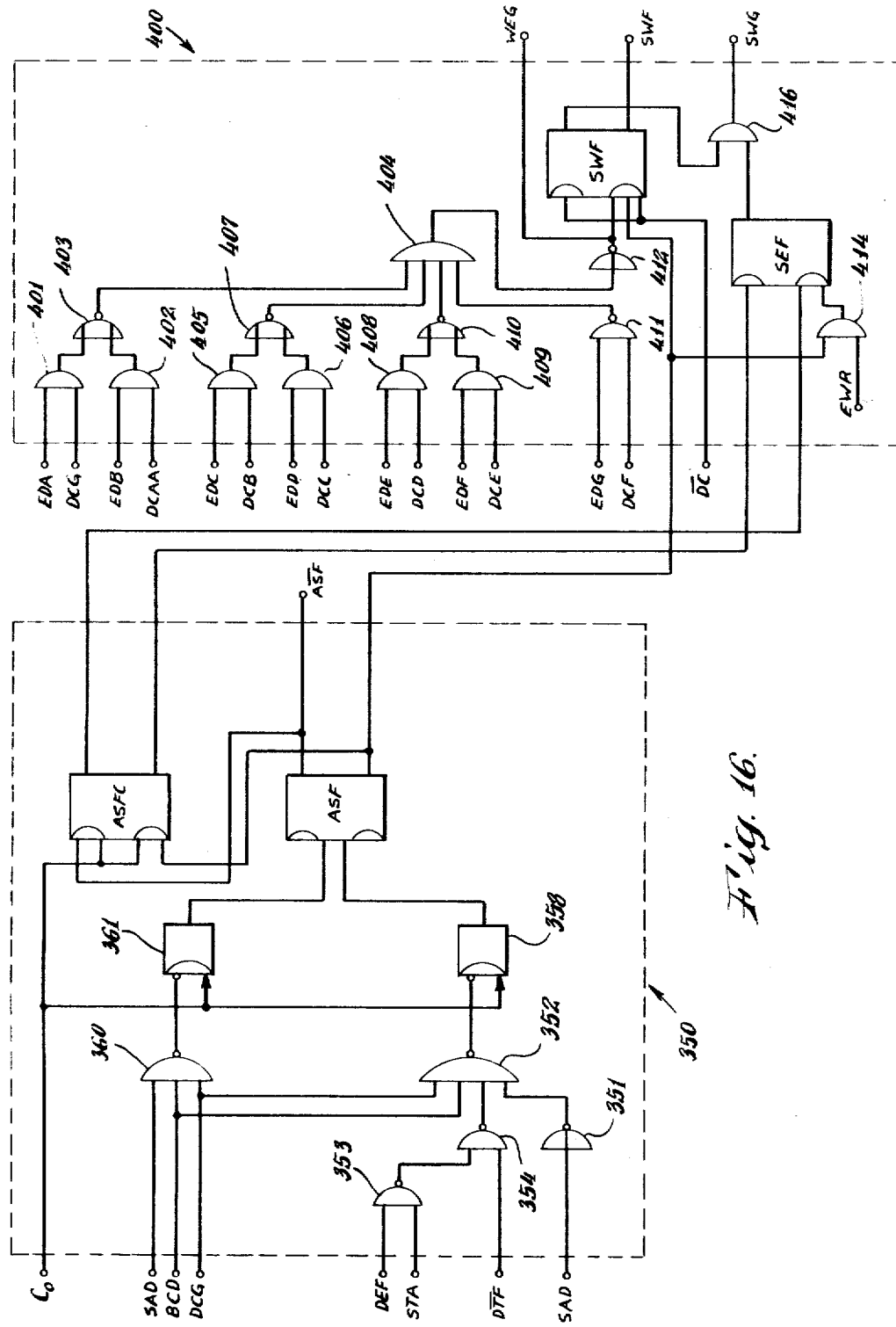
Figure 17:
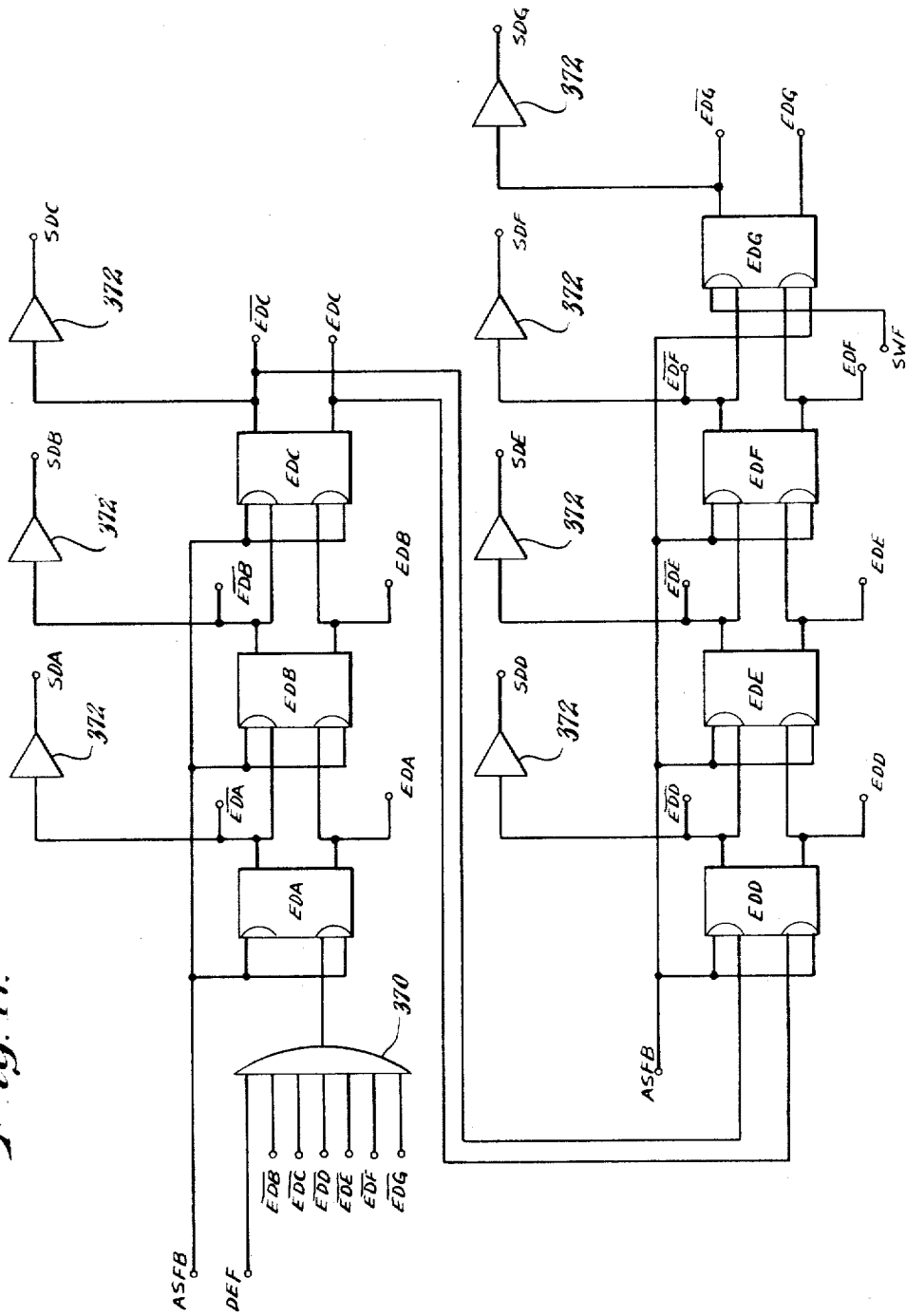
Figure 18:
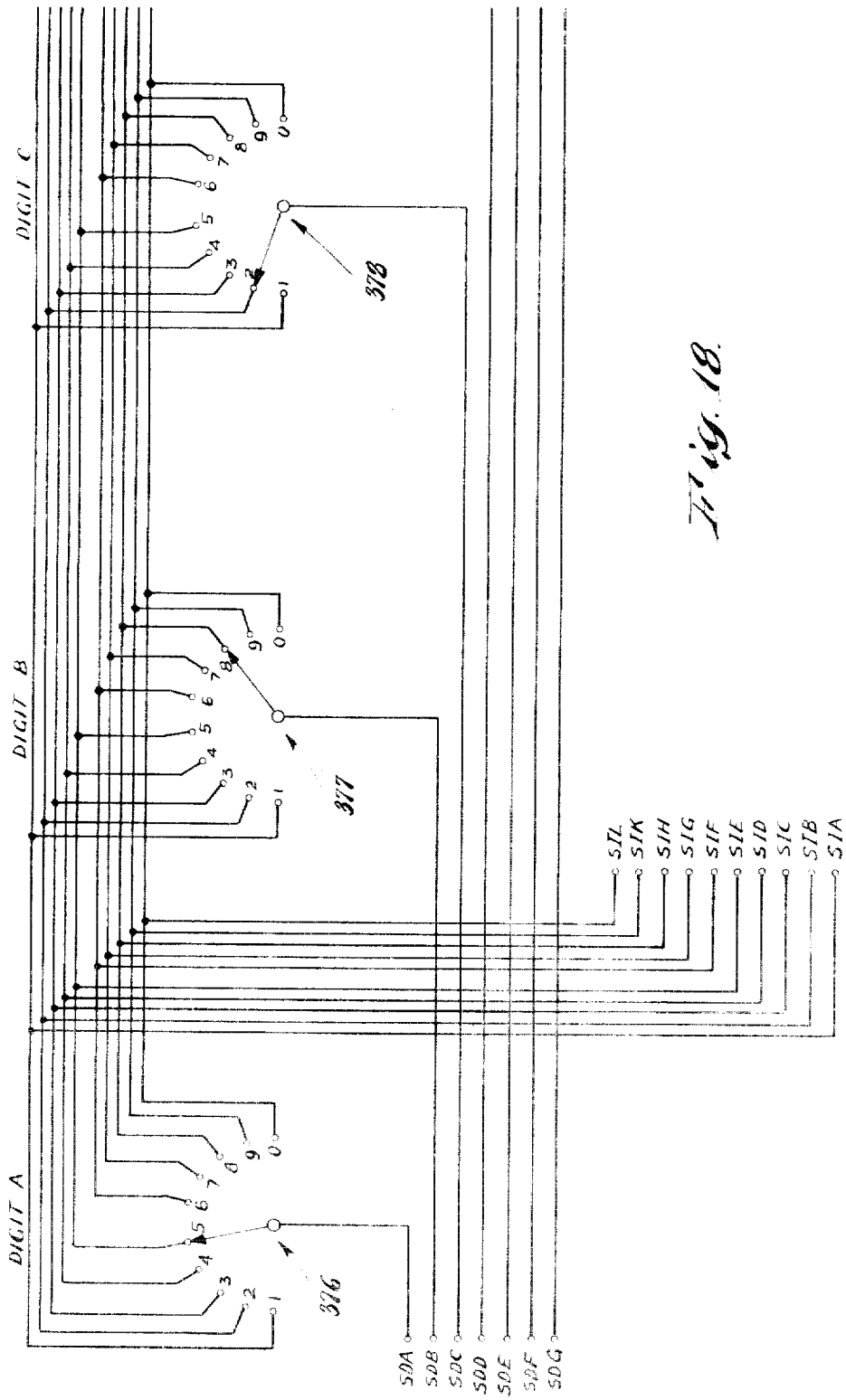
Figure 19:
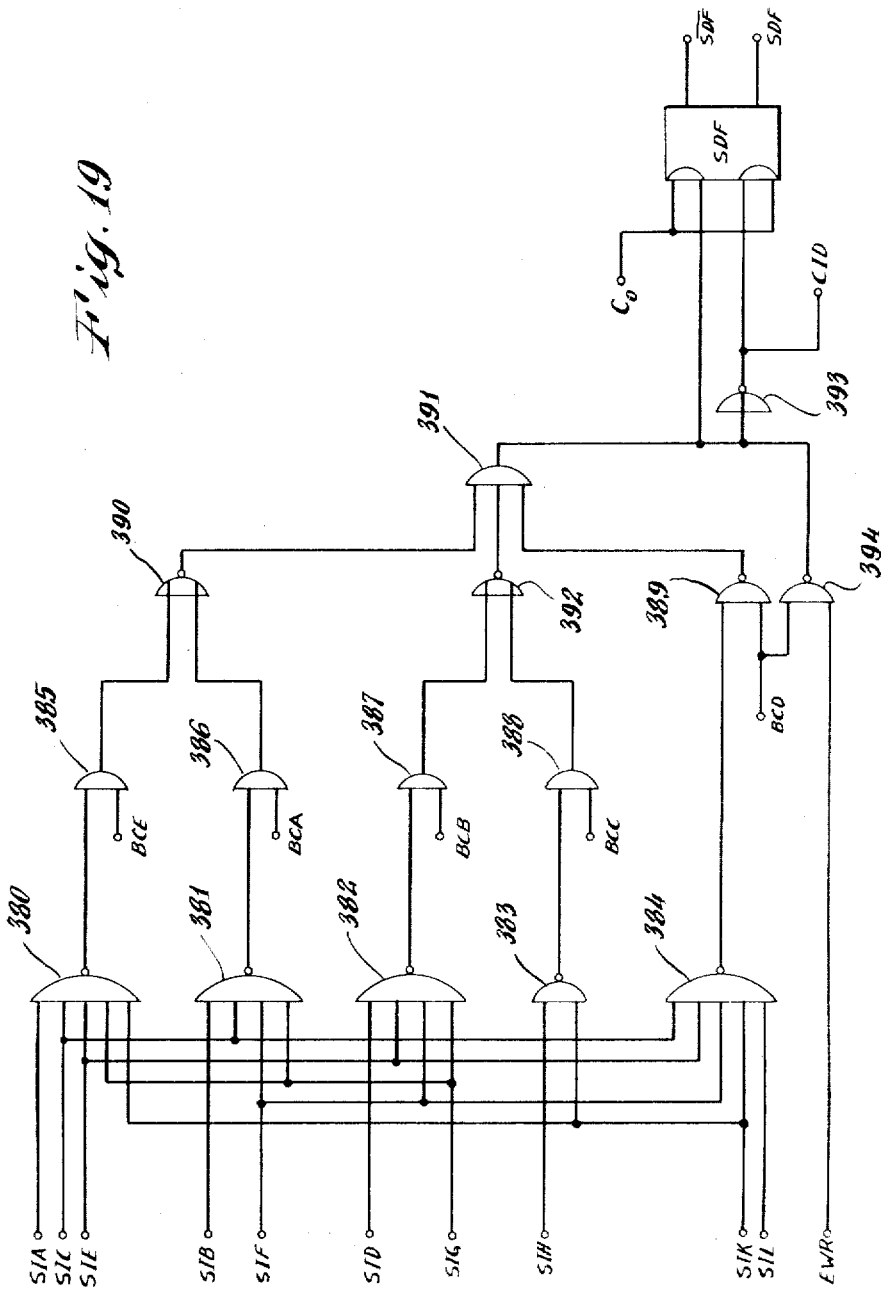
Figures 20, 20A:
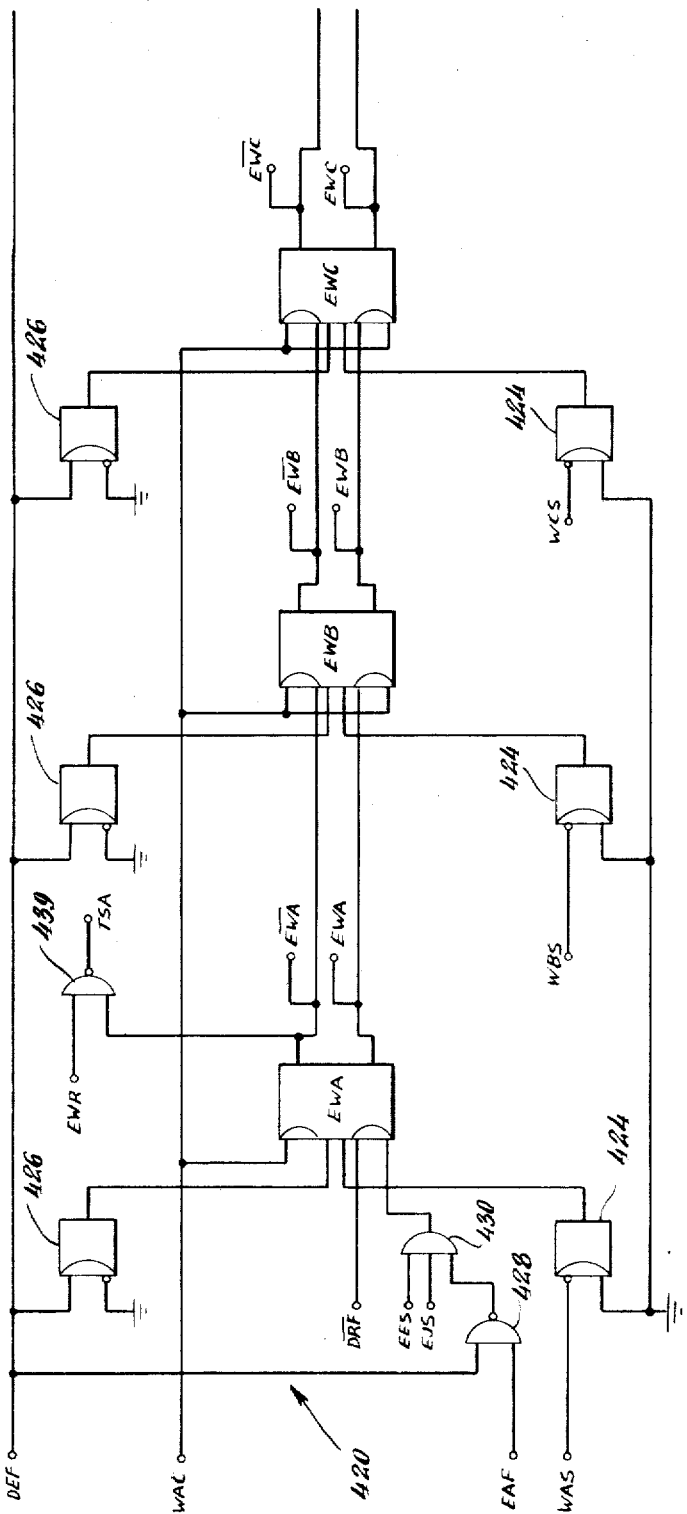
Figure 22:
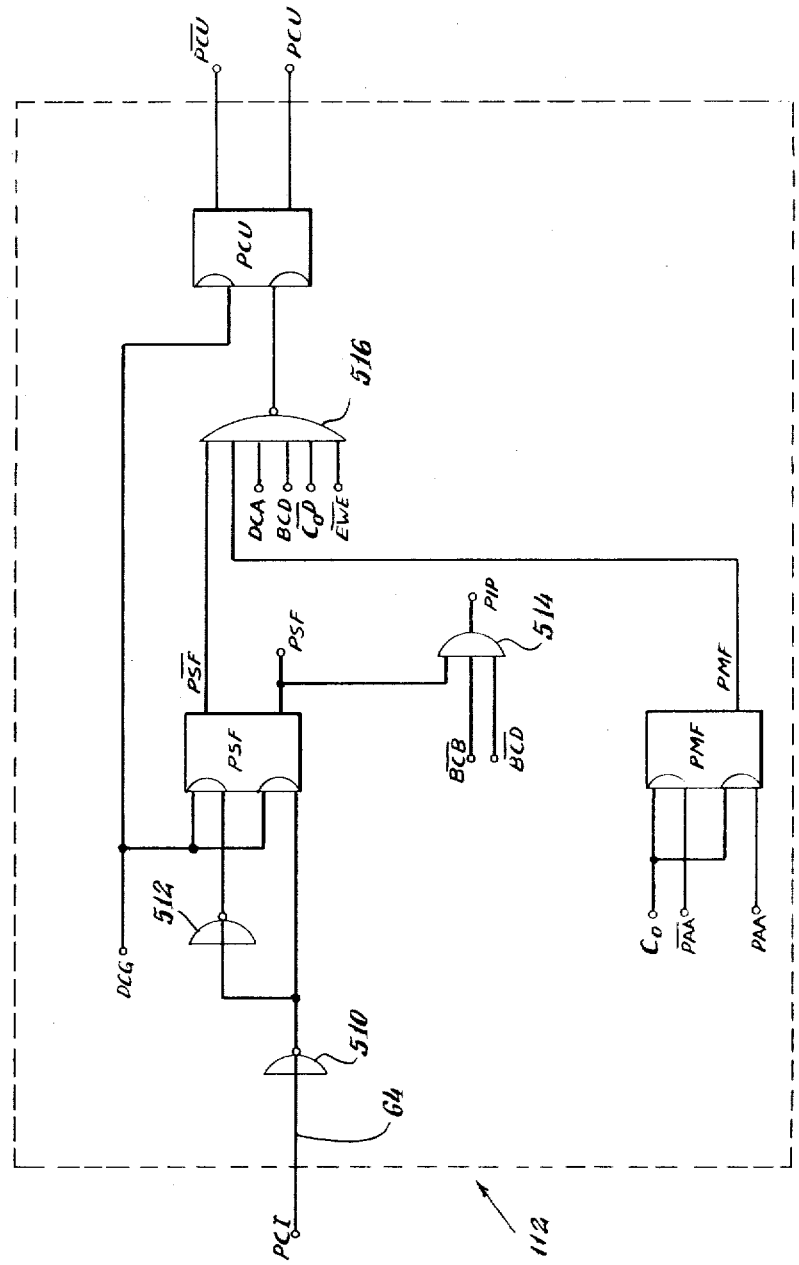
Figure 23:
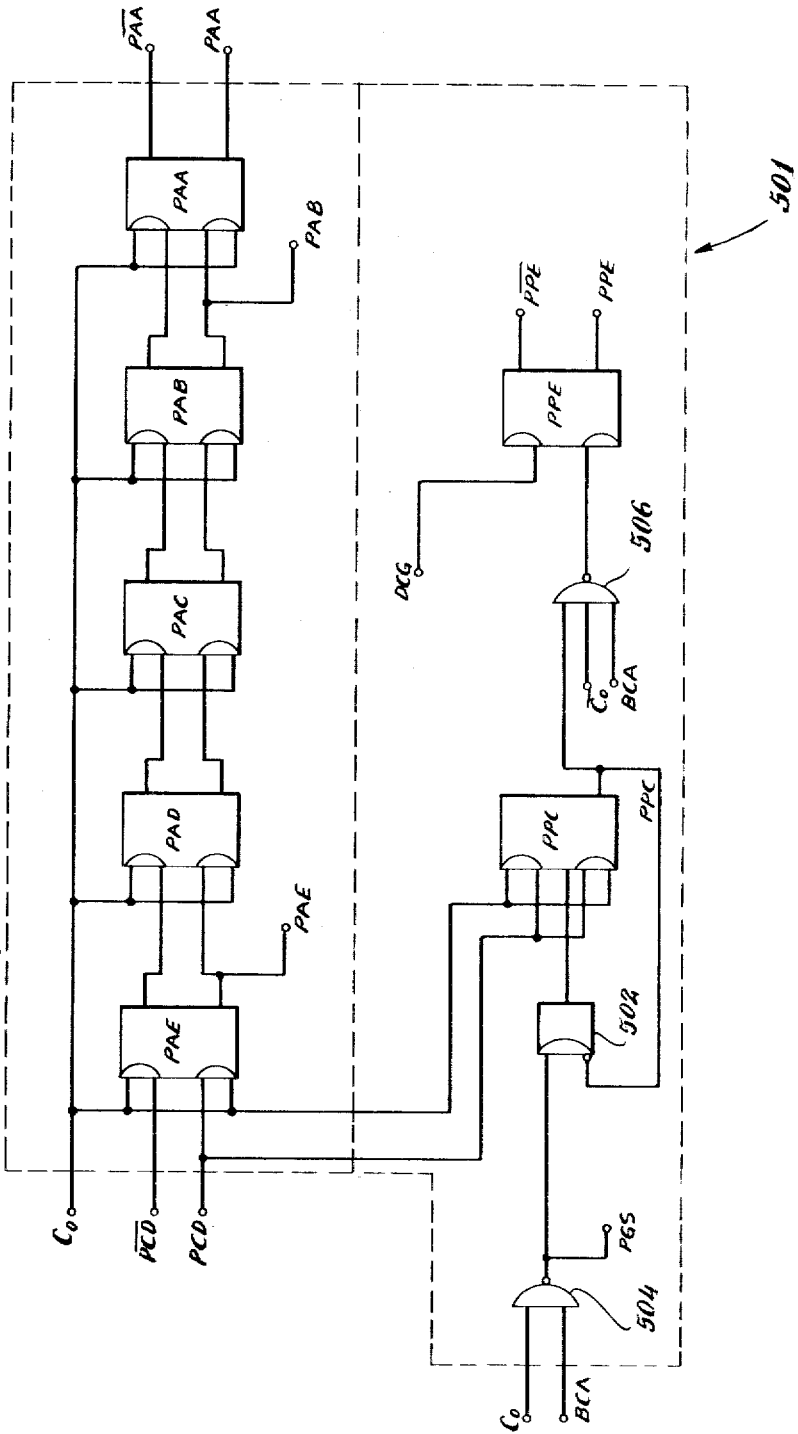
Figure 24:
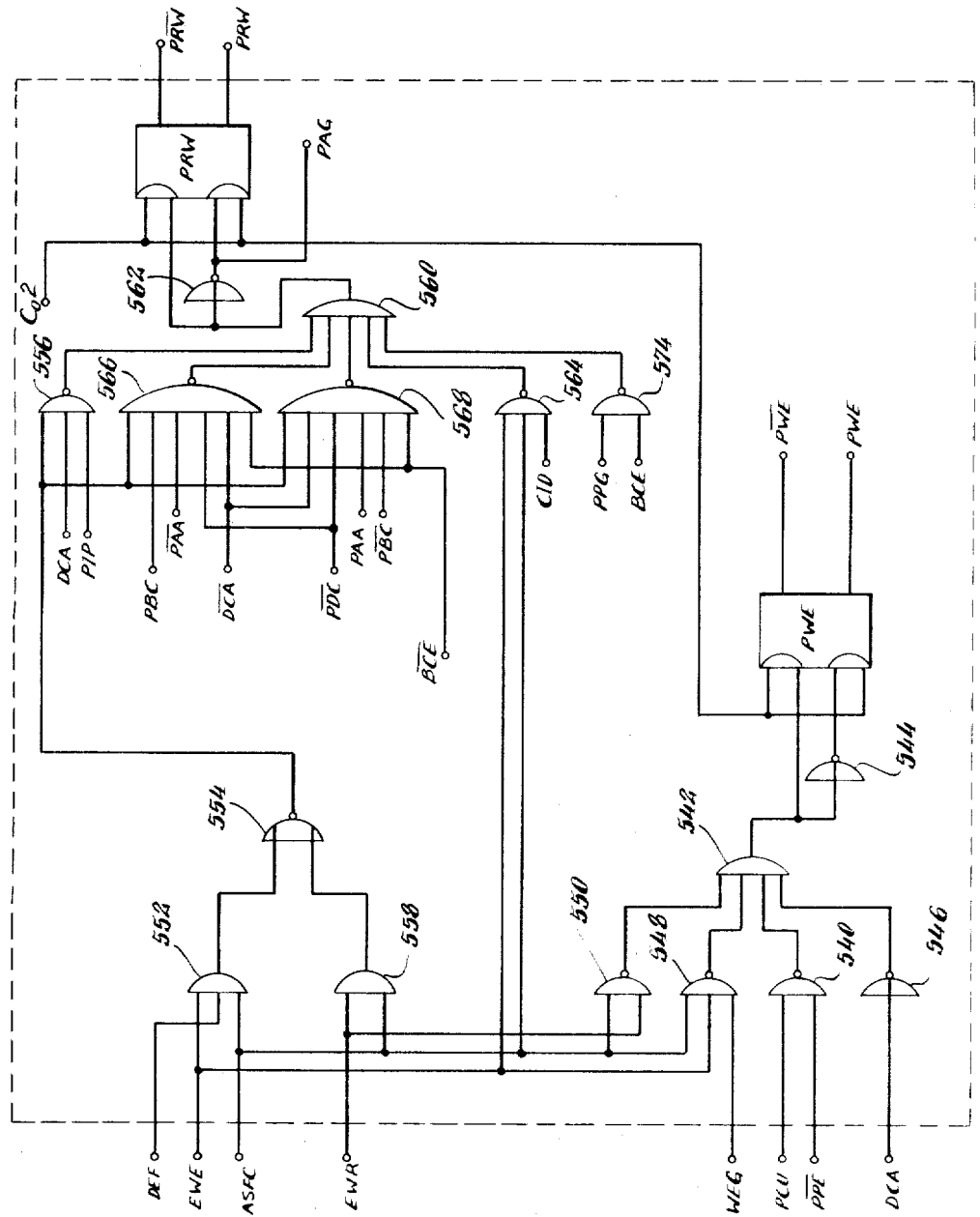
Figure 25:
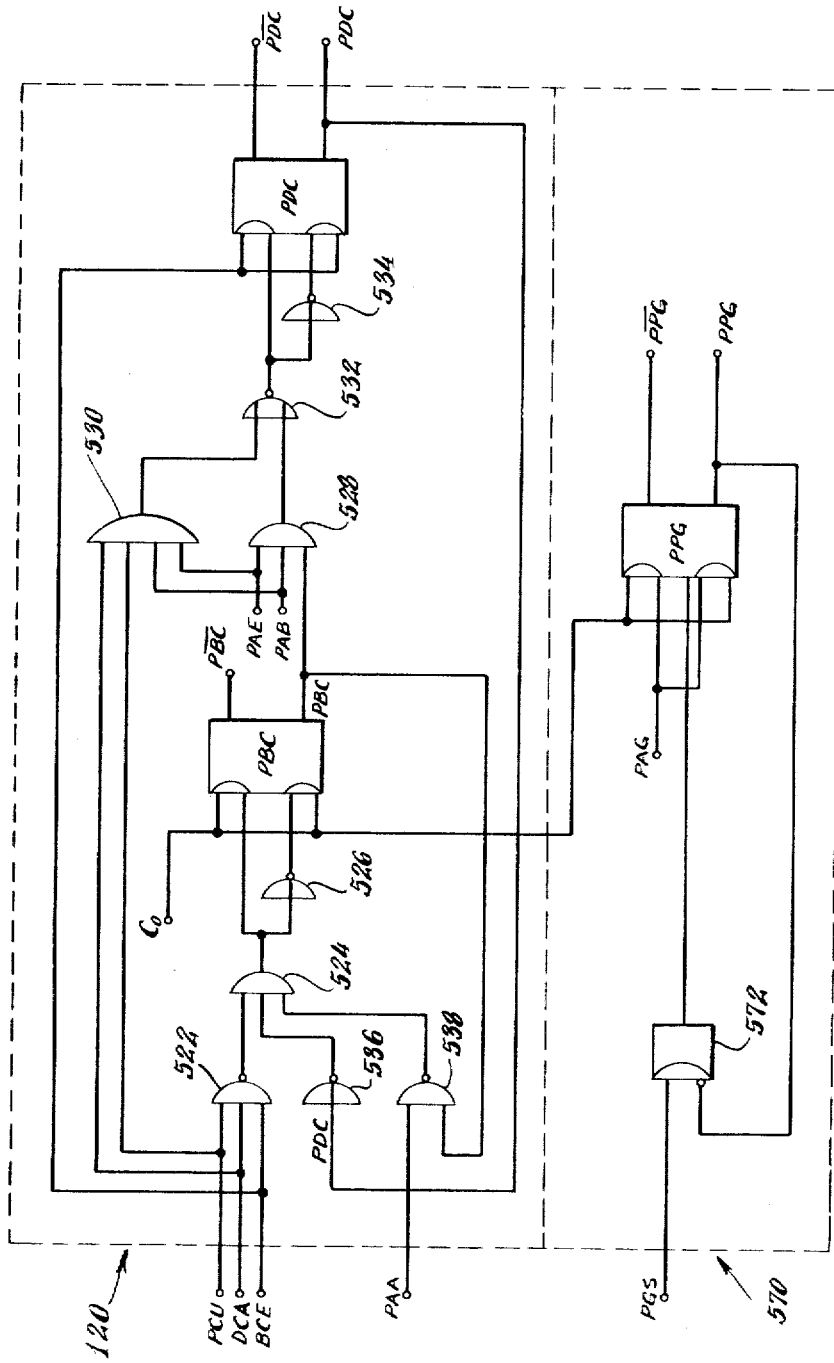
Figure 29:
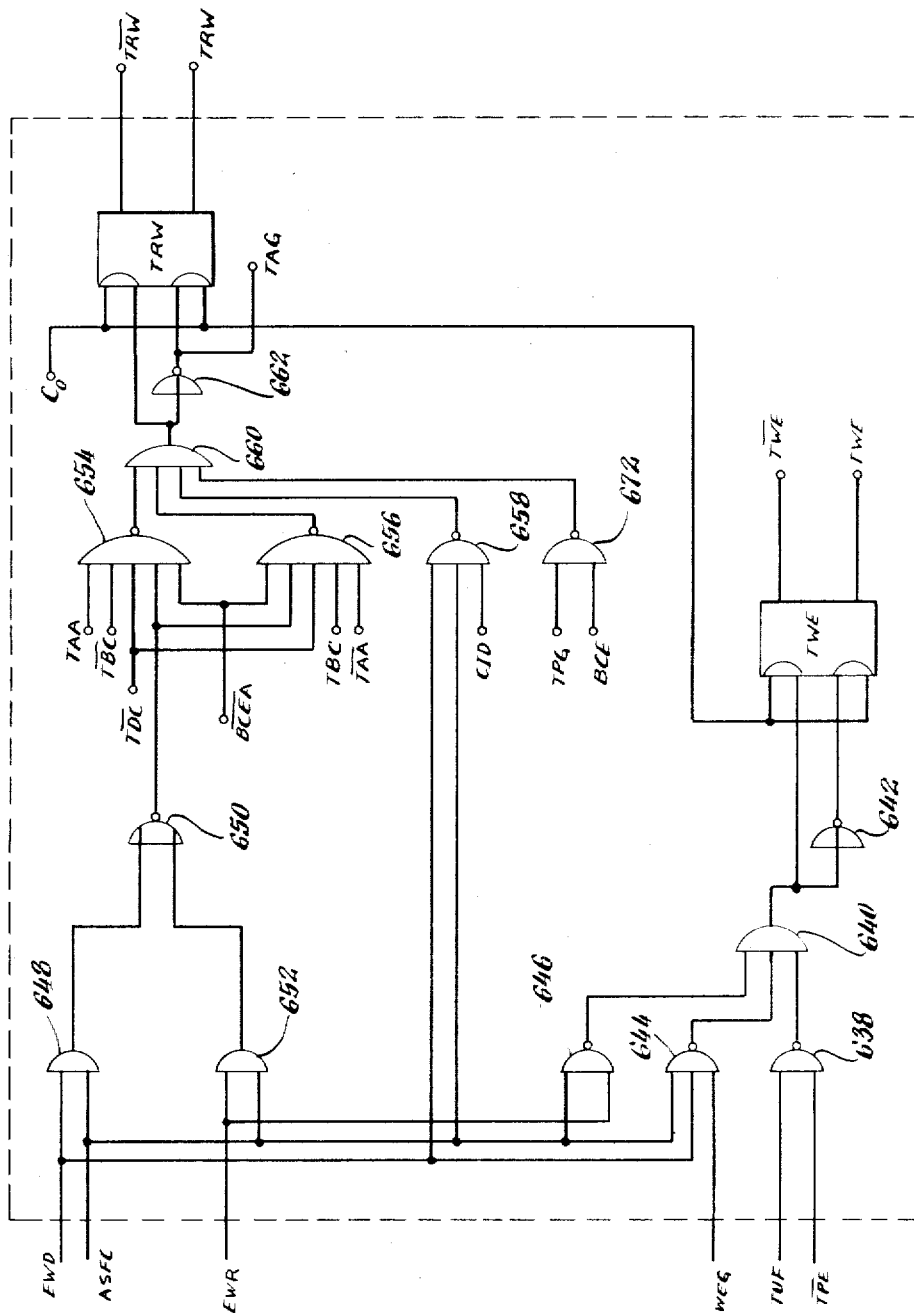
Figure 30:
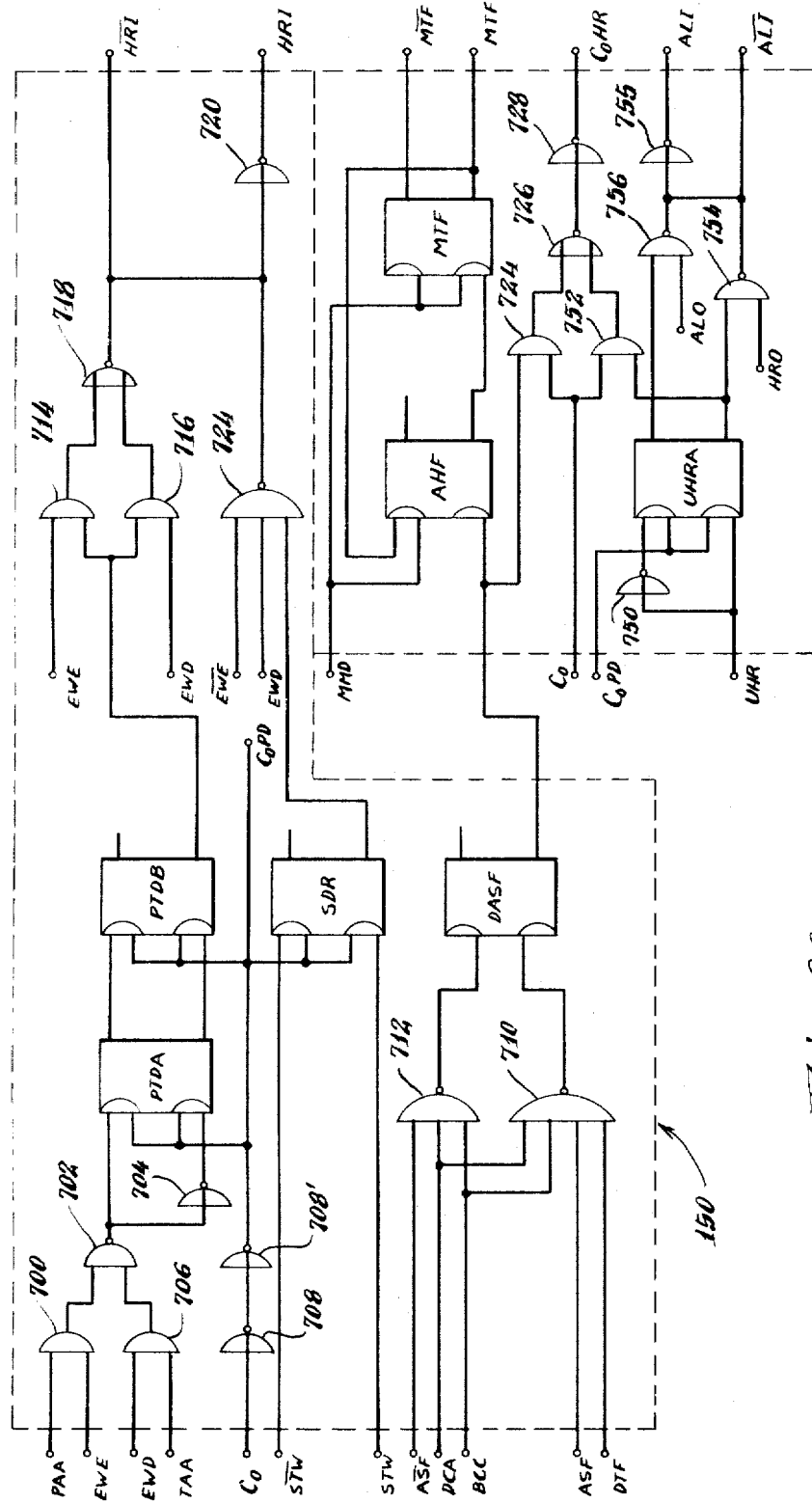
Figure 31:
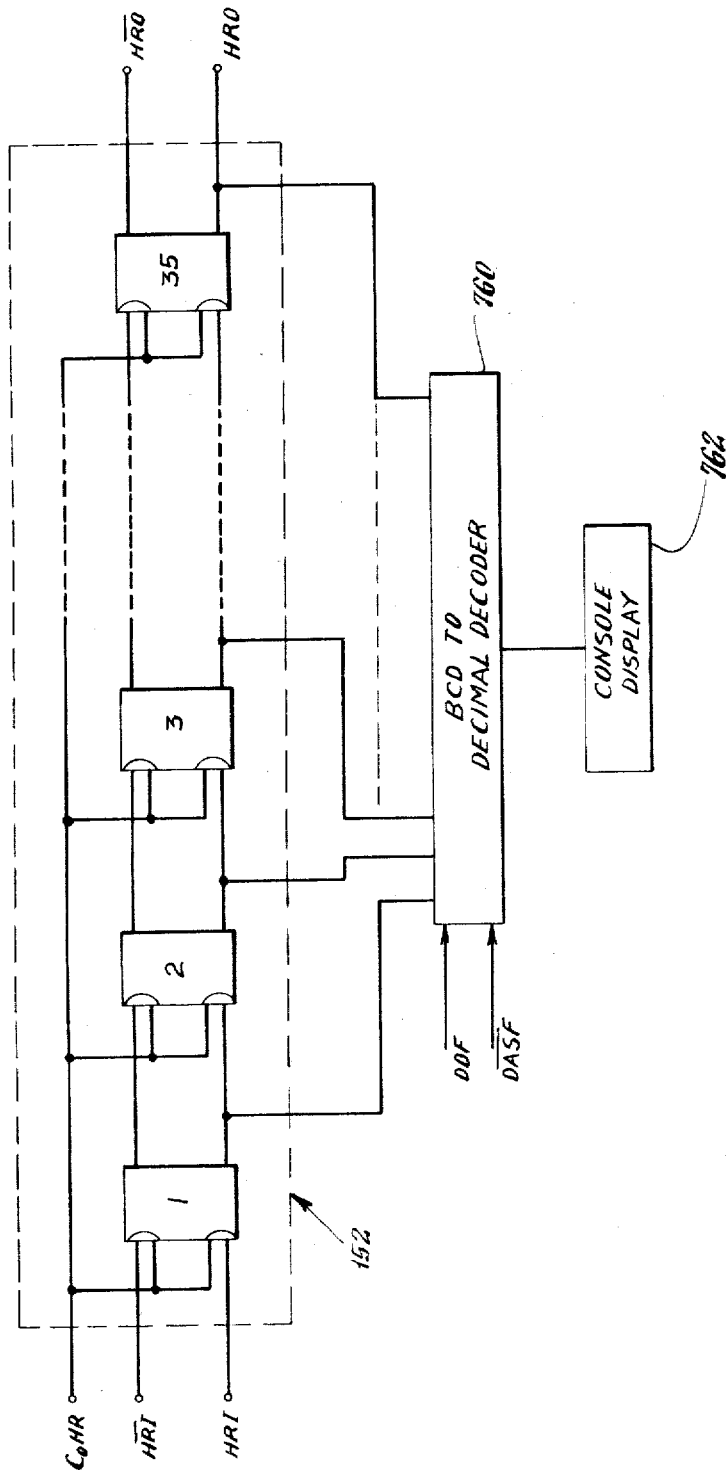
Figure 32:
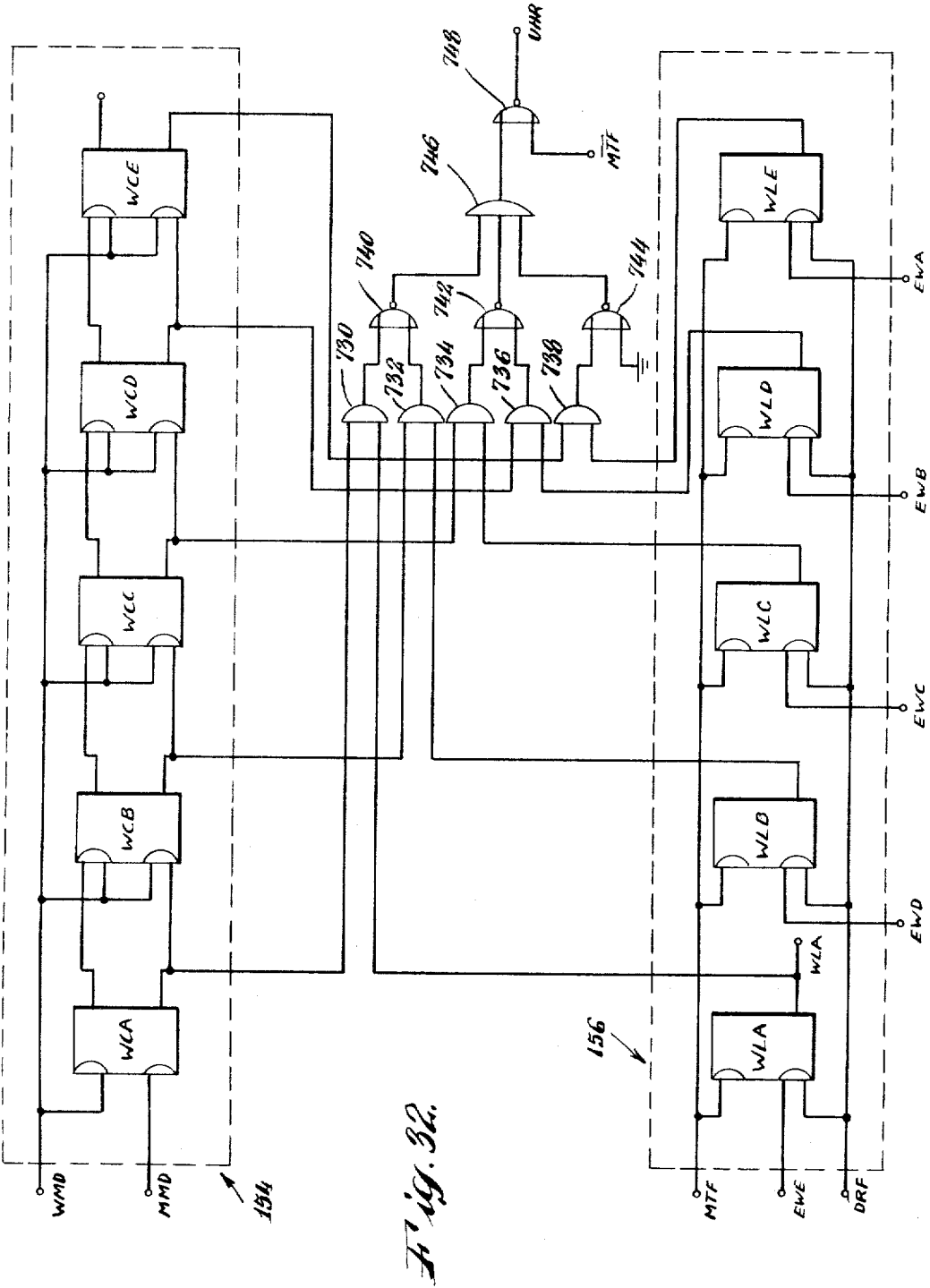
Figure 33:
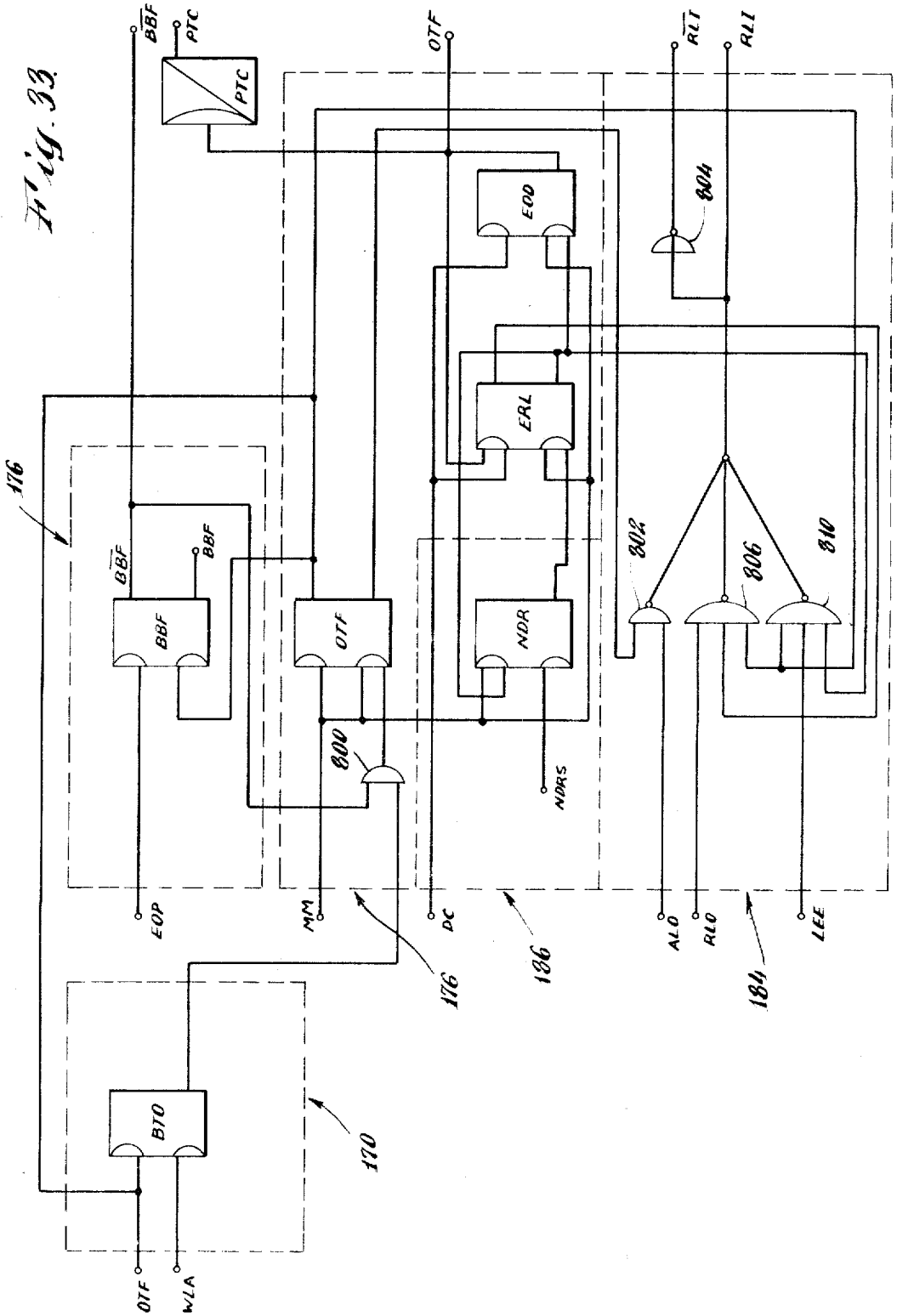
Figure 34:
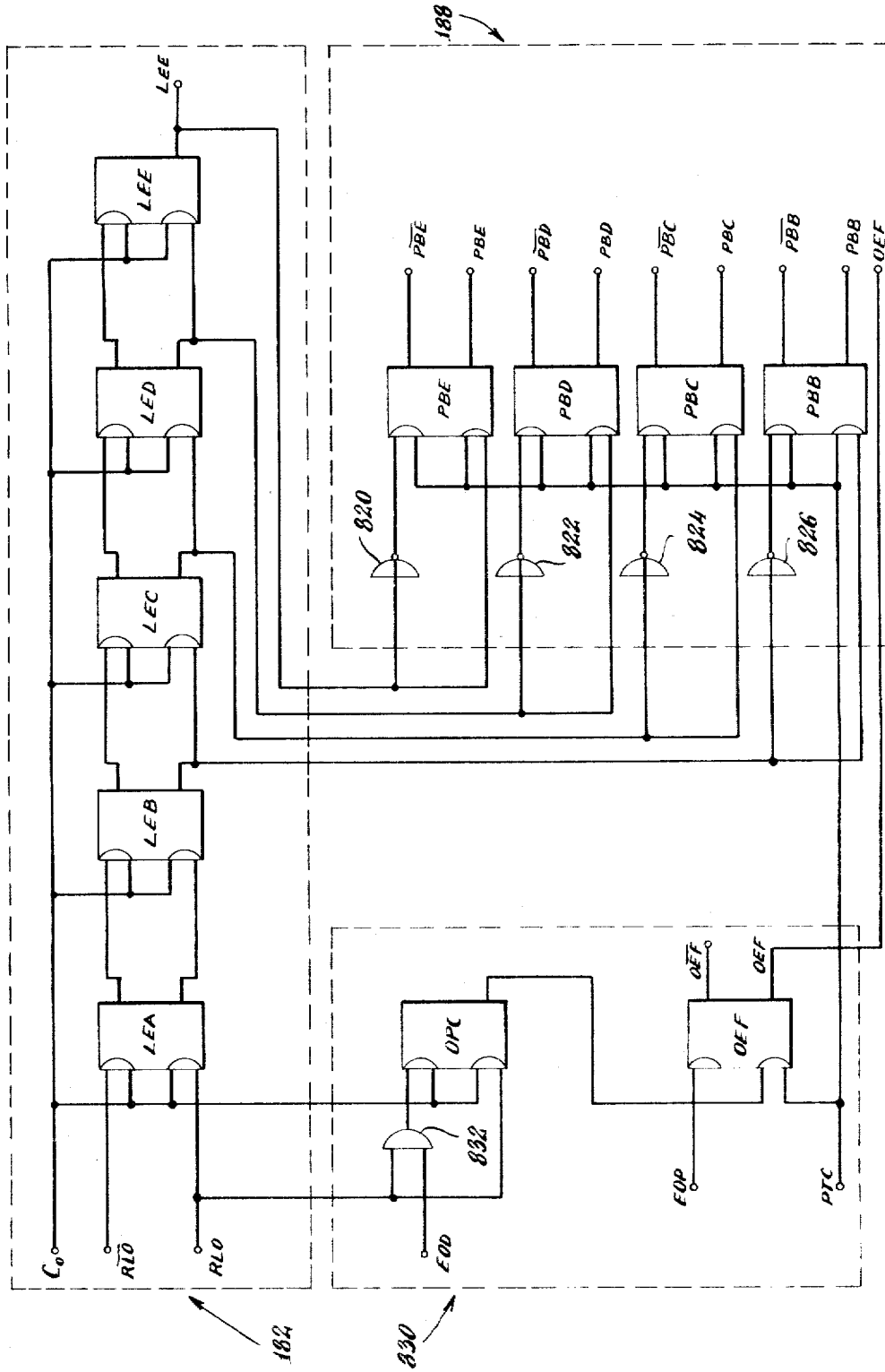
Figure 35:
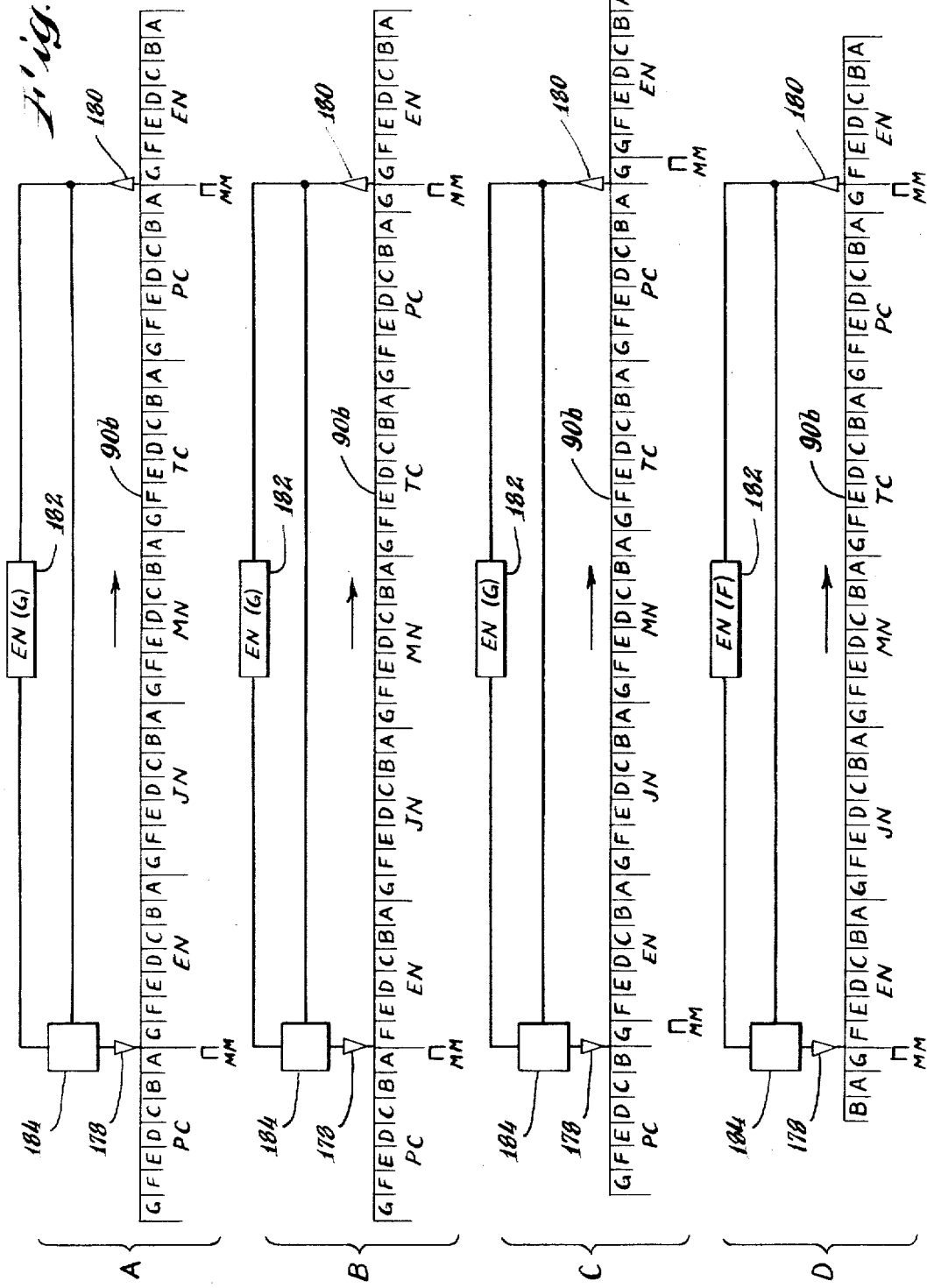

FIGURES 11, 12 and 13 form a detailed circuit schematic diagram, partially in block form, of the decoder-scanner of FIGURE 2C;

FIGURE 14 is a detailed circuit schematic diagram, partially in block form, showing the switching logic circuit and a portion of the console of FIGURE 2C;

FIGURE 15 is a detailed circuit schematic diagram of a portion of the console control panel of FIGURE 2C;

FIGURE 16 is a detailed circuit schematic diagram of a portion of the static data entry circuit included in the console of FIGURE 2C;

FIGURE 17 is a detailed circuit schematic diagram of a digit select driver included as a portion of the console control panel of FIGURE 2C;

FIGURE 18 is a detailed circuit schematic diagram of a portion of an array of decimal digit switches included in the console control panel of FIGURE 2C;

FIGURE 19 is a detailed circuit schematic diagram of a decimal to binary coded decimal encoder included in the console static data entry circuit of FIGURE 2C;

FIGURES 20 and 21, joined together as shown in FIGURE 20A, provide a detailed circuit schematic diagram of the track select circuit included in the console of FIGURE 2C;

FIGURE 21A is a detailed circuit schematic diagram of a word advance clock pulse generator used to provide sequential operation of the track select circuit of FIGURES 20 and 21;

FIGURE 22 is a detailed circuit schematic diagram of the piece count update circuit and flag digit generator of FIGURE 2A;

FIGURE 23 is a detailed circuit schematic diagram of the piece count shift register of FIGURE 2A;

FIGURE 24 is a detailed circuit schematic diagram of the piece count write enable and piece count rewrite circuits of FIGURE 2A;

FIGURE 25 is a detailed circuit schematic diagram of the piece count adder of FIGURE 2A;

FIGURE 26 is a detailed circuit schematic diagram of the time count shift register of FIGURE 2B;

FIGURE 27 is a detailed circuit schematic diagram of the time count update circuit of FIGURE 2B;

FIGURE 27A is a detailed circuit schematic diagram of the time count initiate circuit of FIGURE 2B;

FIGURE 28 is a detailed circuit schematic diagram of the time count adder of FIGURE 2B;

FIGURE 29 is a detailed circuit schematic diagram of the time count write enable and time count rewrite circuits of FIGURE 2B;

FIGURE 30 is a detailed circuit schematic diagram of the static/dynamic data synchronizer, the transfer control and the recirculate circuits included in the message assembly register of FIGURE 2B;

FIGURE 31 is a detailed circuit schematic diagram, partially in block form, of the hold register and word display circuits included in the message assembly register of FIGURE 2B;

FIGURE 32 is a detailed circuit schematic diagram of the word counter and word locator circuits included in the message assembly register of FIGURE 2B;

FIGURE 33 is a detailed circuit schematic diagram of the transfer bid, transfer control, buffer busy, recirculate, and digit request circuits included in the output buffer of FIGURE 2C;

FIGURE 34 is a detailed circuit schematic diagram of the recirculate line extension register and digit output register included in the output buffer of FIGURE 2C;

FIGURE 35 is a series of timing diagrams showing the physical relationship of a recorded message on the magnetic drum relative to the magnetic read and write heads of the output buffer of FIGURES 2A and 2C for illustrating the operation of the output buffer; and, FIGURE 36 is a generalized overall block diagram of an alternative embodiment of the invention.

The same reference numerals are used to designate the same or similar parts throughout the several views of the drawings.

GENERAL DESCRIPTION

The present invention comprises a system and apparatus for continuously monitoring a plurality of stations on an individual basis and accumulating data as to events occurring at the station. The stations may be remotely located from a central station where apparatus of the invention collates accumulated data. Events occurring at each station of the same kind are counted by the accumulating apparatus. The stations are also monitored with respect to their status condition. The accumulating apparatus accumulates the total time each station is in each of the monitored status conditions.

In order that the accumulating apparatus of the invention need not provide individual means to instantaneously record the occurrence of events at each station, the invention provides a binary signal transmission link between each station and the accumulating apparatus. The signals transmitted on each of these links may conveniently be defined as a logical zero or a logical one. The occurrence of an event is indicated by the transmission of a complete cycle of signals from zero to one to zero, or from one to zero to one.

The accumulating apparatus of the invention periodically samples and records the signal on the transmission link from each station. The transition of the status signal either from zero to one or from one to zero is arbitrarily chosen as indicating the occurrence of an event. Count logic in accumulating apparatus of the invention determines this occurrence by periodically comparing the recorded last sampled signal with the current sampled signal from each station. If the chosen transition has occurred, an event is indicated.

The accumulating apparatus of the invention further records such an event as an accumulated total number of events with respect to each station by periodically updating the accumulated total with respect to each station in synchronism with the determination that an event has occurred at said station.

The status monitoring function of the invention is accomplished by counting time signals generated by a master clock. These time pulses are supplied to the accumulating apparatus of the invention. A signal is provided to the accumulating apparatus from each station with respect to each status condition to be monitored. That is, if the status condition to be monitored is, for example, production time and down time there is a production time signal and there is a down time signal with respect to the stations to be so monitored. When, as in that case, the two status are logical opposites the status signals are provided by a binary transmission link from the station to the accumulating apparatus. If it is desired to monitor more than two status conditions or status conditions that are not logically related, further binary status transmission links may be provided.

The accumulating apparatus of the invention periodically samples the status signals from each station and the time signals provided by the master clock. Whenever a time signal is received from the master clock the accumulating apparatus records a time pulse status event by updating an accumulated total of such time pulses with respect to each status condition then existing at each station.

The accumulating apparatus of the present invention preferably comprises two or more synchronized cyclical memories. The first memory stores an address with respect to each station. The other count memories each store accumulated total event counts with respect to each station. If more than one kind of event is to be counted, the accumulated totals with respect to each station may be recorded together in the second cyclical memory or they may each be recorded on a separate synchronized cyclical memory. The former is preferable if the events are logically related such as production time and down time. The latter is preferable if the events are not so logically related such as production time and the accumulated total number of events at each station.

Since the cyclical memories operate in synchronism, they may, and preferably are, commonly addressed by the address memory or address register. The invention further provides address logic having a plurality of input terminals, each connected to one of the above described binary transmission links. The address logic receives the addresses read out serially from the cyclical address memory and in synchronism therewith serially gates the input terminals from the station associated with each address to the count logic.

The count logic comprises a logic circuit for determining the occurrence of each kind of event count and for determining the occurrence of each logically unreleated kind of status count. Each count logic circuit reads serially the past accumulated counts from a cyclical count memory and updates each if an event has occurred at the corresponding station.

The invention further provides means for recording static data with respect to each station. This static data is preferably recorded in one or more cyclical memories synchronized with the address memory. Preferably each type of static data is recorded in a separate memory.

The invention provides a console whereby static data can be recorded with respect to each station. Furthermore, a predetermined accumulated count can be recorded by means of the console. To these ends the console is connected to the address logic by a transmission link over which an individual signal can be transmitted from the console to identify each station. Each time the address of a station so identified is read from the address memory, the address logic provides the console with a signal for synchronizing the recording of data entered at the console.

The data can further be read from any of the memories utilizing these synchronizing signals and displayed or recorded on an output device. An individual item of data can be displayed or recorded or all the data with respect to each station can be read out in a station message. These functions can be automatically performed with respect to every station in the address sequence. This automatic full read out can be automatically initiated are predetermined times.

To facilitate the read out function, the invention provides a message assembly register for arranging in a user chosen sequence each of the individual items of data concerning each station (i.e., each word stored in each memory at each address) and the message assembly register preferably takes the form of a recirculating register. It provides an ordered array of data word slots. Each data word read from the accumulating apparatus of the invention is recorded in its word slot. Thereafter, the assembled message may be read serially from the message assembly register in the chosen order.

The invention further provides an output buffer for reversing the order of the digits of each data word. This facilitates use of an output device requiring reverse format from the accumulating apparatus. The output buffer preferably takes the form of a second recirculating register of one message length to which the assembled message is supplied from the message assembly register. A one digit serial shift register is selectively connectable in series with the output buffer recirculating register. When so connected, the one digit serial shift register shifts the position of the message in the recirculating register by one digit. This causes the last digit to become the first digit of the message. This digit is supplied to the output device. Then the next to the last digit is shifted to the beginning of the message and so forth in the manner of a cat chasing its tail until the entire message is read out in reverse order.

An alternative embodiment of the invention provides a transaction register performing the function of a buffer storage system to temporarily store messages when they can be read out from the accumulating apparatus of the invention at a greater rate than they can be recorded by an output device and during times when the output device is unavailable. Another alternative embodiment of the invention also employs a copy register. This comprises synchronized cyclical memories equal in number and ordered in the same manner as the cyclical memories of the accumulating apparatus used to store data. All of the data in the accumulating apparatus may be transferred to the copy register in identical format in one cycle of the cyclical memories. Thus, the copy register facilitates the most rapid method of clearing the accumulating apparatus of all data so that it may start to record data afresh.

The previously described recirculating registers utilized by the invention are preferably cyclical memories employing individual write and read terminals connected in feedback relation whereby what is read from the cyclical memory is thereafter again recorded in the cyclical memory. The transaction register also preferably takes the form of a cyclical memory. Preferably all of the cyclical memories of the apparatus are synchronized together and commonly addressed. Furthermore, they are preferably tracks on a rotating recording medium such as a magnetic drum recorder, each cyclical memory being a track on the drum. It will be obvious to one having ordinary skill in the art, however, that synchronized recirculating registers may be employed utilizing delay lines of various types. However a power failure causes loss of data in recirculating registers which is undesirable.

To facilitate updating accumulated counts in the accumulating apparatus of the invention and so that the read head and write terminals of the recording cyclical memories employed may be physically separated, a long delay line is provided. Rather than employing an expensive electronic delay line, the invention provides means for using a cyclical memory as a delay line.

The apparatus of the invention herein described is described with reference to the recording of production data where the monitored stations are production machines. The stations may, of course, take any form so long as they provide signals compatible with the accumulating apparatus of the invention.

As seen in FIGURE 1, the preferred embodiment of the present invention is designed to monitor a plurality of remote industrial machine stations, two of which are shown diagrammatically at 50 and 50'. Each machine station 50 is provided with a piece count sensor 51. As described in the above-noted Patent No. 2,985,368, each piece count sensor 51 is a switch automatically operated each time its associated machine manufactures a piece or a predetermined quantity of pieces. Each operation of a piece count switch generates a "count" signal on the output line 51a connected thereto. These count signals are supplied to an address logic circuit, generally indicated at 52, located at the central station.

Also as disclosed in Patent No. 2,985,368, a manually operable time count switch 53 is located at each machine station 50. Each time count switch 53 is positioned according to whether the particular machine is operating normally to produce pieces or is temporarily shut down. Each time count switch 53 thus generates either a "production time" or "down time" signal according to its position, on the output line 53 connected thereto. These product status signals are supplied to the address logic circuit 52.

For example, when there are one hundred remotely located machine stations 50, there are one hundred output lines 51a connecting the individual piece count sensors 51 to the centrally located address logic circuit 52, and one hundred output lines 53a connecting the individual time count switches to the address logic circuit 52. In practice there are other lines of communication between the individual remote stations 50 and the central station providing visual signal indications to the individual machine operators and to the central station attendant. Furthermore, there may be a telephone hookup to provide voice communication between each machine station 50 and the central station, all as described in Patent No. 2,985,368.

An address register, generally indicated at 54, has permanently recorded therein coded address words DAD each corresponding to a machine station 50. Since address register 54 is a cyclical memory, it repeatedly reads out in succession the address words DAD for every machine station 50. Each address word DAD, on being read out, is supplied over a cable 55 to the address logic circuit 52. In response thereto, the address logic circuit 52 interrogates the piece count output line 51a and time count output line 53a from the machine station 50 corresponding to the address word DAD supplied to the address logic circuit. Thus, each machine station 50 is interrogated in sequence by the address logic circuit 52 as to the conditions of its associated piece count sensor 51 and time count switch 53. When the sequence of interrogation is completed, the address register 54 begins again to read out each address word DAD and each machine station 50 is again interrogated in sequence. The maximum counting rate of the system is determined by the time required for the address register 54 to repeat an address. That is, if a piece count sensor were to change its state twice between the times its address was read out, this count would be lost.

As the result of each interrogation of a machine station 50, the address logic circuit 52 generates a piece count input PCI on an output line 64 connected to a piece count update logic and memory circuit 66. Each piece count input PCI indicates the condition of the piece count sensor 51 associated with the machine station 50 being interrogated. Since the machine stations 50 are interrogated in a repeating sequence, their corresponding piece count inputs PCI appear on output line 64 in the same repeating sequence.

At the same time that a machine station 50 is interrogated as to the condition of its piece count sensor 51, it is also interrogated as to the condition of its time count switch 53. As a result, the address logic circuit 52 generates a time count input TCI on an output cable 68 connected to a time count update logic and memory circuit 70. This time count input TCI indicates the condition of the time count switch 53 associated with the machine station 50 being interrogated. Consequently, as to any one machine station 50, the piece count input PCI and time count input TCI corresponding thereto appear simultaneously on output line 64 and cable 68, respectively.

A console 56 controls the several operating modes of the system. In one mode, the ENTRY mode, the console 56 controls the entry of static data relating to each of the individual machine stations 50. Such static data may include, for example, the machine number of the machine at each machine station 50, a designation of the particular job on which each machine is working, and the employee number of the operator of each machine. Static data is so designated because it changes rather infrequently. For example, the machine number will remain fixed as long as a particular machine remains at a specific machine station location. Ordinarily, the same operator will continue to operate the same machine for an entire work shift. Thus, the employee number for a particular machine station 50 usually only changes from one work shift to the next. The job number remains the same as long as work continues on a particular job.

During the ENTRY mode, the console operator can select an individual machine station 50 for which static data is to be entered. The machine number, job number, employee number, or the like is first entered in the console 56 by means of selector switches, a keyboard or other data entry device (not shown). The operator then selects the station by similar means (also not shown). The station selected is indicated by a signal transmitted on a control cable 57 connected to the address logic circuit 52. When the selected machine station 50 is interrogated to develop associated piece and time count inputs PCI and TCI, a selected address signal SAD is supplied to an output line 59 connected from the address logic circuit 52 to the console 56. The selected address signal SAD signals the console 56 that the time has arrived for the entry of data relating to the selected machine station 50. In response to the SAD signal, the console 56 transmits the static data as static data inputs SDI on output line 60 connected to a static data memory 62.

Also, during the ENTRY mode, the console operator can automatically record all employee numbers. To this end, an employee number entry device (not shown) is provided at the console 56 corresponding to each machine station 50. The operator enters the employee number for each machine station into the respective entry device. He then initiates an Automatic Entry mode whereby each machine station 50 is selected in automatic succession and the employee numbers are supplied as static data inputs SDI to the static data memory 62 in response to the selected address signal SAD. The console operator can also enter common static data for each job number in the common entry device and initiate automatic entry whereby this common number will be recorded with respect to each machine station.

The static data memory 62, like the address register 54, is a cyclical memory. They operate in synchronism as indicated diagrammatically at 74. Thus, read out of the address word DAD corresponding to a particular machine station 50 causes the address logic 52 to generate the PCI and TCI signals corresponding to that machine station. If that station has been selected for the entry of static data, the address logic simultaneously generates the selected address signal SAD. Upon receipt of the SAD signal, the console 56 provides the static data input SDI for the selected station. Thus, the static data for a particular machine station occupies the same relative location in the static data memory 62 as does the address word in the address register 54. The address words DAD can, therefore, be used to locate static data relating to a particular machine. For readout, the address words DAD provide random access to static and dynamic data for any selected one of the plurality of machine stations 50.

The memory portion of the piece count circuit 66 records dynamic data, so called because it is continually changing. This data is in the form of discrete words; each word being an accumulated total count from a machine station 50.

The piece count memory 66 also is a cyclical memory. It is synchronized with the address register 54 as indicated diagrammatically at 74. The piece count words are recorded in the piece count memory 66 in the same order as the machine stations are interrogated. The piece count words are read out to the piece count update logic portion of circuit 66 in this same sequence. Moreover, the piece count words and the address words DAD for any one machine station 50 occupy corresponding relative locations in the piece count memory 66 and address register 54. Since the piece count memory 66 is synchronized with the address register 54, the previously recorded piece count word for any one machine station 50 is supplied to the update logic portion of circuit 66 simultaneously with the piece count input PCI for the same machine station.

The PCI input may be a binary zero or a binary one. A count is indicated if the PCI input goes through a complete cycle from zero to one to zero or from one to zero to one. Thus, the PCI input corresponds, for example, to the operation of a normally closed switch opening when a part is made, then closing again. The switch closed condition is arbitrarily indicated by a binary zero and the switch opened condition by a binary one. In order to record the counts a second arbitrary choice is made. The count will be increased by one when the PCI input goes from zero to one.

To this end, each piece count word includes a "flag digit." This corresponds to the previous PCI input when last interrogated and is either a one or a zero. The piece count update logic portion of circuit 66 compares the piece count input PCI with the flag digit to see if a piece has been made since the last interrogation. If not, the piece count word is merely retained in the memory portion of circuit 62 unaltered. When a piece has been made since the last interrogation, the flag digit will be zero and the PCI input one. Then the update logic operates to augment the piece count word by one and enter this new count into the memory portion of circuit 62 at the same relative location it previously occupied. Thus, the principal function of the update logic portion of circuit 62 is that of an adder to add a one to the accumulated piece count for a particular machine station 50 any time a piece has been made at that machine station.

The time count update logic and memory circuit 70 operates in essentially the same fashion as the piece count update logic and memory circuit 66. The time count memory portion of circuit 70 records dynamic data in the form of discrete words, one corresponding to each machine station 50. The time count memory is a cyclical memory synchronized with the address register, as indicated at 74. These time count words are recorded in the time count memory in the same sequential order as the machine stations are interrogated. They are read out to the time count update logic in the same sequence. Thus, the time count word and the address word DAD corresponding to the same machine station 50 occupy the same relative locations in the time count memory 70 and address register 54. The time count word and the time count input TCI for a particular machine station 50 are supplied simultaneously at the time count update logic portion of circuit 70.

The time count words comprise two parts. One part comprises the digits of a number which is an accumulated count of down time while the second part comprises digits of a number which is an accumulated count of elapsed time. The time count input TCI for a particular machine station 50 similarly consists of two parts. One part termed elapsed time input ETI, is a binary zero if the machine station is on elapsed time while the second part, termed down time input DTI, is a binary zero if the machine station is on down time. The inputs ETI and DTI always are logically complementary except when the corresponding machine station 50 is not turned on, and therefore not on either elapsed time or down time. In this case the inputs ETI and DTI are both binary ones.

Still referring to FIGURE 1, a clock, generally indicated at 72, generates pulses at a predetermined rate on output line 72a connected to the time count update logic and memory circuit 70. On receiving a pulse, the time count update logic portion of circuit 70 augments each time count word in sequence for one complete cycle of the time count memory. Each augmented time count word is recorded in the time count memory in the same location it previously occupied. Whether the elapsed time or the down time portion of the time count word is augmented by adding one to either accumulated count is determined by the time count input TCI for that machine station. If the ETI part of the TCI input is zero, the elapsed time count is increased by one. If the DTI part of the TCI input is zero, the down time count is increased by one. If both parts of the TCI input are binary ones, nothing is done. Thus, the update logic portion of circuit 70 functions principally as an adder. The accumulated elapsed time and down time counts of a time count word are essentially counts of the number of pulses generated by the clock 72 while a particular machine was on elapsed time or on down time, respectively.

When it is desired to read out the information recorded in the memories 62, 66 and 70, a READOUT mode is initiated at the console 56. During the READOUT mode the information relating to an individual machine station can be selectively read out or the information relating to all machine stations can be automatically read out in succession. In either case, a machine station 50 is selected at the console 56. This selection is signalled on cable 57 to the address logic circuit 52. When the selected machine station 50 is interrogated, a selected address signal SAD is supplied on line 59 to the console 56 as previously described. Since, as previously noted, the memories 62, 66 and 70 are all synchronized to the address register 54, the selected address signal SAD serves to locate the words in these memories relating to the machine station 50 selected for read out. In the READOUT mode, the console 56 responds to the selected address signal SAD by generating control signals over a cable 71 to cause the static data words in memory 62, the piece count word in memory 66 and the time count word in memory 70 for the selected machine station 50 to be read out on output lines 62a, 66a and 70a, respectively. These words are supplied to a message assembly register, generally indicated at 76.

The message assembly register 76 is controlled from the console 56 over cable 71. It assembles the words supplied by memories 62, 66 and 70 in a predetermined message format. Once a message is fully assembled, the message assembly register 76 signals an output buffer 78 over lines 76a to inquire if the output buffer is free to accept transmission of the message over output line 77. If the output buffer 78 is free, the message is transmitted.

The output buffer 78 holds the message for ultimate transmission over a communication cable 78a to an output device 80. The output device 80, which may take the form of a teletypewriter, computer, or the like, signals the output buffer 78 over control cable 80a when it is ready to receive transmission of the message. The output buffer 78 responds to this "request for transmission signal" by transmitting the message to the output device 80 in a predetermined format and data rate acceptable to the output device 80.

Once a message has been assembled in the message assembly register 76 and transferred to the output buffer 78, a next machine station 50 is selected at the console 56. The readout of the words relating thereto and assembly of these words into a message is performed in the manner described. This operation can be repeated automatically to read out and assemble into messages the words relating to all of the machine stations 50. The messages are transmitted in succession to the output device 80. This is normally done at the end of a work shift and may be automatically initiated at predetermined times by a clock.

DETAILED GENERAL DESCRIPTION

Referring now to FIGURES 2A, 2B and 2C, there is shown an overall logic block diagram of the system and apparatus of the present invention; the overall diagram being formed by placing FIGURE 2B to the left of FIGURE 2A and FIGURE 2C to the right of FIGURE 2A as indicated in FIGURE 2D. According to an important feature of the invention, the static data memory 62, the piece count memory 66 and the time count memory 70 of FIGURE 1 are comprised of separate tracks on a magnetic drum, generally indicated at 90 in FIGURE 2A. Since a magnetic drum is a very economical large capacity memory, it is convenient and also an important feature of the invention to form the address register 54, the message assembly register 76 and the output buffer 78 (FIGURE 1) as separate tracks on the magnetic drum 90. Thus, as seen in FIGURE 2A, the address words DAD are held in an address track section 90a; the messages are held in an output buffer track section 90b for transmission to the output device 80; the piece count words are held in a piece count track section 90c; and the time count words are held in a time count track section 90d. Assuming that the static data for each machine station 50 includes a machine number, a job number and an employee number, the static data memory 62 (FIGURE 1) includes a machine number track section 90e, a job number track section 90f and an employee number track section 90g. The message assembly register 76 of FIGURE 1 includes a message assembly track section 90h on the magnetic drum 90. A series of clock tracks, indicated at 90i, recorded about the magnetic drum 90 are read out by read heads, commonly indicated at 85 to provide various timing pulses as indicated at 87 for synchronizing the operation of the overall system.

As described in connection with FIGURE 1 and as shown in FIGURE 2C, each machine station 50 produces a signal on the associated output line 51a indicating the condition of the associated piece count sensor 51 and a signal on output line 53a indicating the condition of the associated time count switch 53. The output line 51a and the output line 53a from each machine station 50 are each connected to the address logic circuit 52 and to a switching logic circuit 92 thereof.

The address words are recorded on the address track section 90a of the drum 90 in a binary coded decimal format. Each digit of the address word is coded and recorded in a binary 1, 2, 4, 8 parity (P) bit format. Each address word DAD is recorded least significant digit, least significant bit first in serial succession around the drum 90. Thus, as the drum 90 rotates, the discrete address words DAD are read out in sequence by a read head 94 and applied to a decoder-scanner 96 included in address logic circuit 52 (FIGURE 2C). The sequence of readout of the address words DAD is repeated for each cyclical revolution of the drum 90.

The decoder-scanner 96 operates to decode the binary coded decimal address words DAD into pure decimal representation, and to electrically activate one of a plurality of scanner lines, commonly indicated at 98. Each address word DAD corresponds to a particular machine station 50. Thus, there is a scanner line 98 corresponding to each machine station. Since the address words DAD are recorded serially on the drum track 90a, read out serially by read head 94, and successively decoded by the decoder-scanner 96, the scanner lines 98 are energized individually and in a corresponding serial sequence.

The scanner lines 98 are connected to the switching logic circuit 92 together with the piece count and time count signal output lines 51a and 53a from each machine station. Each scanner line 98, when activated by the scanner-decoder 96, causes the switching logic circuit 92 to sample the signals then appearing on the output lines 51a and 53a connected to the machine station 50 corresponding to the activated scanner line. That machine station is thereby interrogated as to the condition of its associated piece count sensor 51 and time count switch 53 (FIGURE 1). The result of each interrogation is the generation of a piece count input PCI on output line 64 and a time count input TCI on output cable 68. These inputs are either zeros or ones depending on the signal on the respective output lines 51a and 53a interrogated.

Still referring to FIGURE 2C, when the selection of a particular machine station 50 for ENTRY or READOUT is signalled over control cable 57 by a control panel 108 of the console 56, a selected address signal SAD is generated on output line 59 from the switching logic circuit 92 when the selected machine station 50 is interrogated by its corresponding scanner line 98. The selected address signal SAD is supplied to a static data entry circuit 102 in the console 56. This initiates transmission of the static data input SDI over line 60 digit by digit in binary coded decimal (BCD) format to a read/write gated amplifier 104 (FIGURE 2A).

One digit of the word is transmitted each time the signal SAD appears, i.e., one per drum spin. The read/write gated amplifier 104 is shared by the read/write heads 106a, 106b and 106c of the machine number track section 90e, the job number track section 90f and the employee number track section 90g, respectively. Since the static data is relatively unchanging, the single read/write gated amplifier 104 may be used in conjunction with the three dual function real/write heads 106a, 106b and 106c.

To select one of the three static data tracks 90e, 90f, 90g for ENTRY or READOUT, a track select circuit 110 controlled from the control panel 108 over a cable 108a supplies track selecting signals to a cable 111 connected to the read/write gated amplifier 104. It will be seen that, in this situation, track selection is synonymous to word selection. To facilitate entry of the desired static data for the selected machine station 50, the control panel is connected to the static data entry circuit 102 by a cable 113.

Since the address track 90a and the static data tracks 90e, 90f, 90g are on the same drum 90 and since entry of static data words into any of the static data tracks is controlled by the selected address signal SAD, the static data words and the address word DAD relating to a particular machine station 50 occupy corresponding relative word locations or slots in their respective drum track sections.

The piece count input PCI relating to each machine station 50 occurs in the same relative serial order on output line 64 from the switching logic circuit 92. Each is supplied to an update circuit 112 of the piece count update logic circuit 66 (FIGURE 2A). The piece count words, in BCD format, are recorded in precise word locations or slots on the piece count track 93 of the piece count track section 90c. The piece count word and address word DAD relating to the same machine station 50 are thus recorded in their respective piece count and address drum tracks in corresponding relative locations or word slots.

Still referring to FIGURE 2A, the piece count words recorded in the piece count track 93 of the drum 90 are read out serially by a read head 114 and read in to a shift register track 95 of piece count section 90c by a recording head 115. After a predetermined delay they are read out serially by a read head 117, and shifted through a shift register 116 bit by bit.

Shift register track 95 provides a predetermined delay between the time a piece count word is read out by read head 114 and subsequently read out by read head 117 for purposes that will become apparent hereinafter. The piece count word corresponding to a particular machine station can thus be read out by read head 117 and updated at the same time that a static data word relating to the same machine station may be read out.

Shift register 116 has a capacity of one digit, i.e., it can store all of the bits of one digit. The first digit of each piece count word is the status or flag digit indicating whether the last piece count input PCI for the related machine station 50 was a zero or a one during the previous revolution of the drum 90. Since the address track section 90a and the piece count track 93 are tracks on the same drum 90, their respective contents are cycled in synchronism. As previously stated, due to the relative placement of the heads 114, 115 and 117, when the flag digit of a piece count word relating to a particular machine station 50 is stored in the shift register 116, the piece count input PCI for that machine station is supplied over line 64 to the update circuit 112. As will be seen in the detailed description of the piece count logic, the flag digit is recorded as either a decimal five or a decimal zero so that it can be properly interpreted when displayed or printed out. For purposes of this general description, this is ignored. The flag digit in the shift register 116 is indicated to the update circuit 112 by a zero or a one on line 116a. If this is a zero, indicating that on the previous spin of the drum 90 the piece count input PCI was a zero, and if the PCI input is still a zero, the update circuit 112 determines that the accumulated count portion of the piece count word following the flag digit should not be augmented (updated). The update circuit 112 then disables a write enable circuit 118 by producing a disable signal on line 112a connected thereto. The piece count number recorded in the piece count track 93 of the drum 90 is unaltered. Similarly, when the flag digit in the shift register 116 is a one and the current PCI input is a zero, the write enable circuit is disabled. The same is true when the flag digit and the current PCI input are both zeros.

Only when the update detector 112 senses that the flag digit is a zero and the current PCI input is a one does it enable the write enable circuit 118 over line 112a during read out of the piece count number portion of the piece count word. It further simultaneously activates an adder circuit 120 to update or augment the piece count number. Thus, a piece count number is only increased by 1 if the piece count output line 51a relating thereto has gone through a full cycle from the previously recorded one to zero and back to one. The piece count sensor 51 (FIGURE 1) may therefore, in most instances, take the convenient form of a switch operated each time a part is made. In one physical embodiment of the invention, the drum 90 (FIGURE 2A) rotates at 60 cycles per second. In this case the piece count sensor must produce on the piece count output line 51a connected thereto ones and zeros of at least 17.5 milliseconds duration. This corresponds, of course, to a maximum counting rate of 60 counts per second.

When parts are manufactured at a faster rate, other piece count sensors are used, producing a full cycle indicating a count whenever a predetermined quantity of parts has been manufactured. A sensor may count such a predetermined quantity, or weight it, or it may produce alternate ones and zeros on the piece count output line connected thereto at a predetermined rate so long as an associated parts producing machine is operating normally.

Update logic circuit 112 also provides a flag digit generator 122 with a zero or a one signal on line 112c indicating whether the current PCI input is a zero or a one. Since the flag digit of each piece count word precedes the accumulated piece count number digits relating thereto, the flag digit generator 122 first generates a flag digit corresponding to the current PCI input. As noted above, the flag digit preferably is a binary coded decimal 0 if the current PCI is one and a binary coded decimal 5 if the current PCI is zero. Thus, when the piece count is read out the decimal 5 can readily be interpreted as a half count.

The coded flag digit is supplied over an output line 122a to the input of a rewrite circuit 124. The output from the rewrite circuit 124 is supplied over line 124a to a piece count write circuit 126 previously enabled by the write enable circuit 118. The new coded flag digit is supplied by piece count write circuit 126 over line 126a to a write head 128 and recorded in the digit slot previously occupied by the old flag digit of the same piece count word.

If the shift register track 95 were not employed, that is if the output of read head 114 of the piece count track 93 were supplied directly to the piece count update and logic circuit 66, the time allowed for a particular location in the piece count track 93 to move from the read head 114 to the write head 128 would be equal to the time delay imparted by the piece count update logic circuit 66. This is equal to the time it takes five recorded bits to pass under read head 114 and be read into shift register 115. Thus, heads 114 and 128 would have to be spaced apart by approximately the distance on the piece count track 93 required to record five bits. This is a practical impossibility. By providing the shift register track 95, an additional delay is introduced which allows the heads 114 and 128 to be conveniently spaced apart. Other delay means might be employed for this purpose, for example, an electronic shift register or a delay line, but it is believed that these other expedients would be more expensive than the use of a shift register track 95 on the drum 90 as provided by the invention.

The accumulated piece count number digits of the piece count word, following the flag digit are similarly read out by the read head 114 from the piece count track 93 and through the shift register track 95. They are then shifted through the shift register 116 and supplied on line 116b to the input of the adder 120. The adder 120 when enabled by the update detector 112, as previously described, augments the accumulated piece count number of the piece count word by one. The new piece count number is supplied on line 120a to the rewrite circuit 124, then to the enabled piece count rewrite circuit 126 and on to the write head 128 of the piece count track 90c where it is recorded in the same word location it previously occupied when read out by the read head 114.

The above described operation is repeated for each piece count word recorded on piece count track 93. The piece count word for each machine station 50 is updated, if required, by the piece count update logic circuit during each spin of the drum 90, e.g., once every 17.5 milliseconds in the illustrated example.

The time count update logic circuit 70, seen in FIGURE 2B, operates in substantially the same manner as piece count update logic circuit 66 to update the time count words serially recorded in BCD format on a time count track 67 of time count track section 90d on the drum 90. An additional delay is again provided by a time count shift register track 69 for the same purpose as the piece count register track 95.

The character of the time count input TCI appearing on cable 68 from the switching logic circuit 92 (FIGURE 2C) indicates either that a particular machine station is either on down time or elapsed time, i.e., either temporarily not producing pieces or producing pieces. The time count inputs TCI appearing on line 68 are supplied to an update circuit 130 in the time count update logic circuit 70. The accumulated time count words are read serially from the time count shift register track section 69 by a read head 135 and shifted through a shift register 134.

In the same manner as described above with reference to the piec count track section 90c, the time count word and the address word DAD relating to a particular machine station 50 are recorded in corresponding word locations or slots in their respective track sections 90a and 90d. Since these track sections are on the same drum 90, the address words DAD and time count words circulate in synchronism. Accordingly, through proper head spacing, the time count words for a particular machine station 50 may be shifted through the shift register 134 during the time when the time count input TCI for that machine station appears at the input of the update circuit 136.

The time count word is divided into a multiple digit portion representing accumulated elapsed time and a multiple digit portion representing accumulated down time. The time count input TCI for each machine station 50 serves to determine whether the elapsed time digits or the down time digits of the time count word for that machine station is to be updated at regular time intervals.

The clock 72 periodically supplies a timing pulse to output line 72a. The time interval between timing pulses may be any predetermined duration such as 36 seconds, i.e., one pulse for every $\frac{1}{100}$ of an hour. Each timing pulse is supplied to an initiate circuit 136. This initiate circuit 136 in response to each timing pulse, generates an output pulse which has a time duration equal to the time required for the drum 90 to complete one full spin. This output pulse is supplied on line 136a to a write enable circuit 140. In response thereto the write enable circuit 140 supplies an enabling signal on output line 140 to enable a time count write circuit for one complete revolution of the drum 90. The output from the update circuit 130 appearing on line 130a controls the adder 138 to update either the elapsed time portion or the down time portion of each time count word of a particular machine station 50 according to the time count input TCI for the particular machine station. During intervals between timing pulses, the adder is updating the time count words, however the time count write circuit 142 is disabled so that the updating is not carried out on the time count words recorded in the track 67.

The updated time count words are supplied on the output line 138a to a rewrite circuit 144 and from it to the enabled time count write circuit 142 on line 144a. The updated time count words are then supplied over line 142a to a write head 146 operating in the time count track 67 of the drum 90. The updated time count words are recorded on the time count track 67 in precisely the same word slots they previously occupied when read out by the read head 132. Thus, the time required for a particular word slot to move from the read head 132 to the write head 146 equals the sum of the time delays imparted by the time count update logic circuit 70 and the time count shift register track 69. The head spacing is chosen so that the updated time count words are written directly over the old time count words and the latter are completely obliterated. It will thus be seen that the time count words for every machine station 50 are updated in one drum spin. If the machine station is not turned on, the adder 138 is disabled and the corresponding time counts are recorded back on the drum 90 without being updated.

During the interval between timing pulses generated by the clock 72, the write enable circuit 140 is disabled and consequently the time count words recorded on the time count track section 90d are left unaltered.

In the READOUT mode, the recorded data relating to a particular machine station 50 is selected for readout in much the same manner as during the ENTRY mode. This selection of a machine station 50 at the control panel 108 is signalled on cable 57 to the switching logic 92. When the selected machine station 50 is interrogated once each revolution of the drum 90, the selected address signal SAD is generated. These selected address signals SAD, previously described with reference to static data entry, are supplied on line 147 to a static-dynamic data synchronizing circuit 150 included in the circuit of the message assembly register 76 (FIGURE 2B). Each selected address signal SAD, in effect, tells the message assembly register 76 when to accept a static data word read from one of the static data tracks 90e, 90f, 90g or a piece count word from the piece count update logic circuit 66 or a time count word from the time count update logic circuit 70.

The control panel 108 in the console 56, as previously described, controls the track select circuit 110, which in essence is a word select circuit. In addition, the control panel 108 signals the read/write gated amplifier 104 on cable 149 to either read or write static data. For each spin of the drum 90, the track select circuit 110 selects a particular static data track or a dynamic data word for readout by signalling on cable 111; cable 111 being connected to the read/write gated amplifier 104 and to the static/dynamic data synchronizer 150.

If the operator only wishes to know a selected word relating to one machine, he selects the word by operating a word switch (not shown) relating thereto. For example, if he operates the employee number switch, the track selector circuit 110 will be so notified by signals on cable 108b. The track selector circuit will so notify the static/dynamic data synchronizer 150 by signals on cable 111. Upon receipt of a SAD signal on line 147, the static/dynamic data synchronizer 150 will supply the employee number being received thereby on line 116b to a hold register 152. The employee number is supplied in convenient form to a word display 153.

An entire message, i.e., all the words, relating to one machine station 50 is read out in the following manner. The static data words (machine number, job number and employee number in the illustrated embodiment) are supplied over line 104a from the read/write gated amplifier 104 to the static/dynamic data synchronizer 150. The piece count word is supplied by shift register 116 in the piece count update logic circuit 66 on line 116b to the input of the static/dynamic data synchronizer 150. Time count word is supplied to the static/dynamic data synchronizer 150 over line 134a from shift register 134 in the time count update logic circuit 70. For purposes of the present description, it will be assumed the order of readout is the employee number first, the machine number second, the job number third, the time count word fourth, and piece count word fifth. This is an arbitrary order of readout since regardless of the order received, the message assembly register can arrange the data in any desired word order to form a message.

When the employee number has been arbitrarily chosen as the first word in the message to be assembled, the track select circuit 110 may first select read head 106c to read out employee numbers from drum track 90g. The employee numbers are supplied on line 104a to the static/dynamic data synchronizer 150. This circuit is gated by the first selected address signal SAD such that only the employee number for the selected machine station 50 is passed through the synchronizing circuit 150 to hold register 152. The track select circuit 110 controls the static/dynamic data synchronizer 150 over cable 111 to only accept the data word appearing on line 104a during the selected address signal time SAD. Thus, the piece and time count words appearing on lines 116a and 134a are ignored at this time.

An employee number may be stored at any time in hold register 152. The message assembly track 90h forms a recirculating register, as will be explained below, having five word slots, each corresponding to one word of a message in the customer specified order. The slot of the message assembly track 90h for the employee word, for example, must be under write head 162 when the employee number is to be read out of hold register 152. This is accomplished as follows.

Referring to FIGURE 2B, word counter 154 is controlled by timing pulses read from the clock pulse tracks 90i in synchronism with the word slots on message assembly track 90h. A word locator 156 is signalled by the track select circuit 110 as to which data word has been entered into the hold register 152. Word counter 154 and word locator 156 have their outputs connected to lines 154a and 156a. These lines are gated together in a gate circuit 158. When coincidence occurs between the outputs of the word counter 154 and the word locator 156, an output signal from the gate circuit 158 on line 158a opens a transfer control circuit 160. This enables the hold register 152 to transmit the employee number on line 160a to write head 162. The number is thus recorder in the appropriate word slot in the message assembly track 90h.

Preferably, the message assembly track 90h is of sufficient length to record a plurality of complete messages in message slots about the drum 90. Consequently, as the drum 90 rotates bringing the recorded employee number under read head 164, the employee number is read out and supplied to a recirculate circuit 166 on line 164a. By this time, the output from gate circuit 158 on line 158a has terminated. The transfer control circuit 160 will then pass the employee number word read out by read head 164 back to the write head 162 over line 160a. The employee number word is recorded on the message assembly track 90h in the employee number word slot of another message slot. The write head 162 and the read head 164 are spaced precisely one message length apart along the message assembly track 90h and, consequently after one drum spin, the employee number word will be recorded in the same corresponding word slot of each message slot in the message assembly track.

Next, the track select circuit 110 selects the job number track 90f, and job numbers are supplied to the static/dynamic data synchronizer 150 over line 104a. The same operation as described for the employee number relating to the selected machine station 50 is repeated for the job number except that the word counter 154 and the word locator 156 operate to transfer the job number held in the hold register 152 to the write head 162 for recording on the message assembly track 90h in a preselected job number word slot immediately adjacent an employee number word slot. The job number word is read out and recirculated through the transfer control circuit 160 and recorded back on the message assembly track, in each job number word slot. Consequently, at the end of a full drum spin the job number word is recorded on the message assembly track 90h the same number of times as the employee number word.

The identical operation is again performed for the machine number pertaining to the selected machine station 50 as read from the machine number track 90e. It is recorded in the message assembly track 90h under the control of the word counter 154 and word locator 156 in preselected word slots adjacent to the job numbers already recorded in the message assembly track.

Next, the time count word for the selected machine station 50 from the output of the shift register 134 during the time of the selected address signal SAD is gated through the static/dynamic synchronizing circuit 150 to the hold register 152. The word counter 154 and the word locator 156 control the transfer circuit 160 so as to pass the time count word held in the hold register 152 to the write head 162 for recording on the message assembly track 90h in a preselected word slot adjacent a word slot occupied by the job number word.

Finally, the piece count word from the output of the shift register 116 in the piece count update logic circuitry 66 during the selected address time SAD is gated through the static/dynamic data synchronizing circuit 150 to the hold register 152. The word counter 154 and the word locator 156 cause the piece count word in the hold register 152 to be passed to the write head 162 for recording on the message assembly track 90h in a preselected word slot adjacent a word slot occupied by the time count word. After one more spin of the drum 90, the message for the selected machine station 50 is fully assembled in the message assembly track 90h with the message duplicated a plurality of times around the drum.

As described, the words are read into the hold register 152 in the same order in which the word slots occur on the message assembly track 90h. It will be seen that the order of the word slots determines the word order of the message selected by the customer. The order the words are read into the hold register 152 may differ therefrom and is completely arbitrary.

The word locator 156 of the message assembly register 76 supplies a signal on output line 156b when the last word of the message, e.g., the piece count word, has been entered into the message assembly register 76. This signal is supplied to a transfer bid circuit 170 included in the output buffer circuit 80 of FIGURE 2C. This signal tells the output buffer 78 that the assembly of a message in the message assembly register 76 has been completed and, in effect, asks the output buffer if it is prepared to accept the assembled message. If the output buffer 78 is then engaged in the process of transmitting a previously assembled message to the output device 80, a buffer busy circuit 174 signals a transfer control circuit 176 on line 174a not to accept the transfer of an assembled message from the message assembly register over line 164a connected from the read head 164 operating in the message assembly track 90h. After a message has been transferred from the output buffer 78 to the output device 80 over transmission cable 78a, the output device generates an "end of transmission" signal over line 172 to the buffer busy circuit 174. The buffer busy circuit 174, in turn, signals the transfer control circuit 176 that the output buffer 78 is now empty and the assembled message read from the message assembly track 90h is passed through the transfer control circuit 176 and out on line 176a for recording on the output buffer track 90b by a write head 178. The buffer busy circuit 174 then receives a signal over line 176b from the transfer control circuit 174. In response thereto, the buffer busy circuit 174 signals the transfer control circuit 174 over line 174a not to accept any further transfers of messages from the message assembly register 76 until the output device again generates an end of transmission signal appearing on line 172.

The message recorded on the output buffer track 90b is read out by a read head 180 one message time later. That is, the spacing between the write head 178 and the read head 180 of the output buffer track 90b is equal to the length of one recorded message. The message read out by read head 180 is supplied over line 180a to the input of a recirculate line extension register 182 and to one input of a recirculate circuit 184.

During quiescent operation of the output buffer 78, the message read out by the read head 180 thereof is passed through the recirculate circuit 184 to the transfer control circuit 176 on line 184a and therefrom on line 176a to write head 178. Since the message is being read out by read head 180 and supplied directly to the write head 178 for recording back on the drum track 90b, the words of the message remain in the same word locations relative to a message slot. The message is also being shifted serially through the recirculate line extension register 182 and out on line 182a, but is not accepted by the recirculate circuit 184 during quiescent operation. As long as a message is being recirculated in the output buffer 78, the buffer busy circuit 174 controls the transfer control circuit 176 such that no new message will be transferred from the message assembly track 90h into the output buffer 78.

As noted above, the words of the message are coded in BCD format and are processed in the portions of the system generally described, least significant bit, least significant digit first. Thus, the individual digits of the message words appear in the output buffer least significant digit first. However, in most output device, e.g., typewriters, the first digit of a word received is interpreted as the most significant digit and not as the least significant digit. In order to make the system compatible with these devices, the output buffer 78 operates to transmit the most significant digit of each word as the first digit to the output device 80. This may be a teletypewriter of the type made by the Teletype Corporation of Skokie, Illinois, Model 33 teletypewriter.

With a teletypewriter as the output device 80, the message in the message assembly register 76 is assembled in reverse word order such that the piece count word is the first word and the employ number is the last word of the message. The message is transferred in reverse word order from the message assembly register 76 to the output buffer 78 and so recorded in the output buffer track 90b. The reason for this will be clear from the description to follow.

When the output device 80 is ready to accept a digit from the output buffer 78, it transmits a signal on line 173 to a digit request circuit 186. The digit request circuit 186, in response thereto transmits a signal on line 186a to the recirculate circuit 184 to condition the recirculate circuit to accept the message as shifted through the recirculate line extension register 182 rather than directly from the read head 180. The length of the recirculate line extension register 182 is such as to extend the length of the recirculating line of the output buffer 78 (normally one message length) by one digit. The message is now shifted through the recirculate line extension register 182, passed through the recirculate circuit 184 and the transfer circuit 176, and recorded back on the output buffer track 90b by write head 178.

By virtue of the one digit extension provided by the recirculate line extension register 182, the entire message, as recorded on the output buffer track 90b, is shifted by one digit slot. This one digit shift is in the opposite direction from the direction of drum rotation. Since the words of the message are recorded on the output buffer track in reverse word order, the most significant digit of the employee number (i.e. the last digit of the last word of a message written in reverse word order) is shifted to the first digit slot of the next message slot. When the beginning of this next message slot arrives at the read head 180 one message time later, the most significant digit of the employee number is the first digit read out and shifted into the register 182. At the end of the first digit time after this next message slot arrives at read head 180, this most significant digit is held in register 182 and is then automatically read out in parallel on a cable 187 to a digit output register 188 for transmission on transmission cable 78a to the output device 80.

Immediately after the most significant digit of the employee number is read out to the digit output register 188, the recirculate line extension register 182 is switched out of the output buffer recirculating line by the recirculate circuit 184. The message is then recirculated with this one digit shift relative to a message slot preserved.

On receipt of a second next digit request signal, the operation is repeated, and the entire message is again shifted one digit slot to bring the second most significant digit of the employee number into the first digit slot of the next message slot. One message time plus one digit time later, this second most significant digit is read out from the recirculate line extension register 182 to the digit output register 188 for transmission to the output device 80.

The above described operation continues under the control of the output device 80 until the entire message has been transmitted and printed out as a message in proper word order. During this time, the message assembly register 76 can be assembling a message relating to the next selected machine station 50 for transfer to the output buffer 78 after the first message has been transmitted to the teletypewriter 80.

In an alternative embodiment shown in FIGURE 36, a copy register 900 is provided to accept mass parallel transfer of all of the static and dynamic data recorded in their respective drum data tracks. The copy register includes a plurality of drum tracks in which are recorded the static and dynamic data precisely as recorded in their respective data tracks 90c through 90g (FIGURE 2A). Thus, these data tracks can be cleared in several drum spins and then be ready for recording static and dynamic data pertaining to the next work shift, for example. The message assembly register 76 is then conditioned to receive the static and dynamic data for selected machine stations from the copy register 900 for assembly into messages in the manner described. The message assembly register 76 can also be conditioned to accept the static and dynamic data for selected machine stations directly from the static and dynamic data memories 62, 66 and 70 for message assembly, thereby effectively bypassing the copy register 900.

Still referring to FIGURE 36, a transaction register 910 is provided for intermediate storage of assembled messages. The transaction register 910 is found to be necessary in situations where the output device 80 is not always available to accept message transmissions. If it is desired to read out the static and dynamic data for selected machine stations at times when the output device 80 is not available to print out the messages, it will be appreciated that the dynamic data will be changing during the time taken for the output device to become available. Thus, the value of the dynamic data existing at the time when readout is desired could not be ascertained. With the inclusion of the transaction register 910, the static and dynamic data can be read out when desired and held as assembled messages in this buffer store until the output device is made available. When this happens, the assembled messages in the transaction register 910 are transferred to the output buffer 78 for transmission to the output device 80 in the manner described. For mass readout, such as at the end of a work shift, and the output device is available, the transaction register 910 is bypassed. The messages assembled in the message assembly register 76 are then transferred directly to the output buffer 78 for transmission to the output device 80.

DETAILED DESCRIPTION

Drum layout

The individual words stored on the magnetic drum 90 and processed by the system and apparatus of the present invention are comprised of seven digits. A seven digit word length could then accommodate a seven digit employee number or a seven digit machine number. Each digit of the word includes five binary bits which express the digit in binary coded decimal (BCD) format. The bits making up each digit are arranged with the positional significance 1, 2, 4 and 8 in the binary code format. The fifth bit is an odd parity bit for error checking purposes. With five bits per digit and seven digits per word, each word is thirty-five bits in length. For purposes of the present disclosure, a message is assumed to comprise five words, all of which pertain to one machine station 50. Accordingly, a message is then 135 bits in length.

It will be further assumed that the circumference of the drum 90 is such that a single circumferential track has the capacity to hold one hundred seven-digit words. Accordingly, the drum 90 has the capacity to handle the address words DAD for one hundred machine stations 50 in a single address track. Similarly, the employee numbers for one hundred machine stations could be handled in a single circumferential track. The same is true of machine numbers and job numbers. The piece and time count word tracks, for reasons to be explained later, are split up into two separate tracks each.

The physical layout showing the positional relationship of the bits, digits and words as recorded on the drum 90 is shown in FIGURE 3. The address words DAD recorded in the address track 90a are recorded consecutively from 00 to 99 to refer to the one hundred machine stations. The digit makeup of address word DAD 21 is shown in FIGURE 3. Of the seven digit slots shown for address word DAD 21, digit slot A, which is recorded and read out first, is the least significant digit slot, while digit slot G, recorded and read out last, is the most significant digit slot. Since each address word DAD is only two digits long, the last significant digit of the address word is recorded in digit slot C while the most significant digit is recorded in digit slot D. Accordingly, for address word 21, the decimal 1 is recorded in digit slot C in BCD format while the decimal 2 is similarly recorded in digit slot D. The reason that the address word DAD is written in digit slots C and D is to allow the digit times corresponding to digit slots E, F and G for the address logic circuit 52 (FIGURE 1) to process the address words DAD.

As seen in FIGURE 3, the data words for machine station 20 are recorded in parallel in drum tracks 90c through 90g in word locations vertically aligned under the address word DAD for machine station 21. Consequently, the address word DAD 20 is read out in advance to prepare the system for processing all of the words concerned with machine station 20 when they appear slightly later in time.

As seen below the drum 90 in FIGURE 3, the seven digit slots making up a single word are blown up to show the binary coded decimal format in which the individual bits of the seven digits are recorded and read out serially on a drum track, least significant bit, least significant digit first.

Logic definitions

In the operation of disclosed embodiment of the invention, a logical one in the binary code format is expressed by a negative signal level of from −8 to −12 volts while a logical zero is expressed by a zero signal level. In addition, the logic circuits interpret an open or "floating input" line as a logical one.

The various logic circuits used in the system and apparatus of the invention are shown in FIGURE 4 at (A) through (I). The logic symbol for an A.C. gate is shown at (A). The A.C. gate performs the dual function of an AND gate and a differentiator, and its output C is generally utilized to trigger a flip-flop. As seen from the signal diagram, when the input B is a logical zero, the A.C. gate is enabled to pass a logical one to zero signal level transition (positive transition) in the form of a positive pulse C. When the input B is a logical one, the A.C. gate is completely disabled.

An inverter logic symbol is shown at (B). The output B of the inverter merely complements the input A. Accordingly, if the input A is a logic zero, the output B is a logical one, and vice-versa.

The logic symbol for an AND gate is shown at (C). The output C from the AND gate is a logical one only when both inputs A and B are logical ones.

The logic symbol for a NAND gate is shown at (D). As seen in the signal diagram, the output C from the NAND gate is a logical zero when both of its inputs A and B are a logical one. When either of the inputs A and B go to a logical zero, the output C goes to a logical one.

A NOR gate is shown at (E), and its output C is a logical one when its inputs A and B are both a logical zero. If either of its inputs A and B go to a logical one, the output C switches to a logical zero. The logic symbol for an OR gate is seen at (F). The output C from the OR gate is a logical one when either of its inputs A and B goes to a logical one.

The logic symbol for a bistable multivibrator or flip-flop is shown at (G). Its output R is a logical one when the flip-flop is in the reset condition and goes to a logical zero when the flip-flop is set. The set output S exactly complements the reset output R. Thus, the set output S is a logical one when the flip-flop is set and a logical zero when the flip-flop is reset. Inputs FR and FS to the flip-flop are forced reset and forced set inputs, respectively. One or the other of these inputs is pulsed generally when the system is first turned on to insure that the flip-flop is forced into the state it should assume at the beginning of system operation. The inputs R', R", and DR are operational inputs used to trigger the flip-flop to its reset condition while inputs S', S" and DS are operational inputs used to trigger the flip-flop to its set condition. Inputs DR and DS are direct reset and direct set inputs to the flip-flop and are effective in and of themselves to trigger the flip-flop. Thus, a positive pulse on the input DR triggers the flip-flop to its reset condition while a positive pulse on the input DS triggers the flip-flop to its set condition. Generally, the DS and DR inputs to a flip-flop are generated by A.C. gates. Inputs R' and R" are gated reset inputs effective to reset the flip-flop when both are a logical one and either one goes to a logical zero. Similarly, inputs S' and S" are gated set inputs effective to set the flip-flop when both are a logical one and either goes to a logical zero.

The logic symbol for a monostable multivibrator or one-shot is shown in (H). When its input A goes from a logical one to a logical zero, its reset output R, which is normally a logical one, goes to a logical zero for a predetermined time period. The one-shot then automatically returns to its single stable state whereupon the reset output R returns to a logical one. The set output S merely complements the reset output R.

The logic symbol for an amplifier is shown at (I). The amplifier is used where necessary to increase the drive capability of a signal whenever the loading is too great for the driving stage. As will be pointed out in the detailed description to follow, some of the amplifiers are gated power amplifiers. As such, the amplifier will have a signal input which is to be amplified and a gating input. When the gating input is a logical one, a logical one input signal level will be amplified and passed to the output.

All of the above described logic circuits are of convention circuit construction. Such circuits to perform the above described logic functions may be obtained from digital system build block suppliers such as Magnetics Research Company, Inc. of White Plains, New York.

Timing

The magnetic drum 90 is provided with six prerecorded clock tracks which are used in synchronizing the multiplicity of operations of the system. The pattern of five of the six prerecorded clock tracks on the drum 90 is shown in FIGURE 5. In one clock track there is recorded a single pulse which is read out at the beginning of each revolution of the drum 90 and is termed a revolution marker pulse RM. A second prerecorded clock track includes twenty pulses recorded at equally spaced increments about the drum 90. Each of these twenty pulses is read out as a message marker pulse MM. In the interval between two consecutive message marker pulses there is prerecorded on another clock track five word marker pulses WM. Since there are twenty message marker pulses MM in one drum revolution, the number of word marker pulses WM recorded about the drum 90 is one hundred. There are seven digit clock pulses DC prerecorded on another drum clock track in the interval between consecutive word marker pulses WM. For the interval between consecutive digit clock pulses, there are five bit clock pulses $C_o$ prerecorded on another drum track. It will thus be seen that there are 700 digit clock pulses DC prerecorded in the digit clock track and 3500 bit clock pulses $C_o$ prerecorded in the bit clock track. Finally, there is a sixth clock track, not shown in FIGURE 5, which is identical to the bit clock track except that the prerecorded bit clock pulses are slightly misaligned so that the bit clock pulses $C_oD$ read from this sixth clock track are delayed by approximately two microseconds from the bit clock pulses $C_o$ read from the bit clock track.

When the various clock pulses shown in FIGURE 5 are read from the drum clock track, they are reshaped and effectively reclocked with bit clock pulses $C_o$. In this way each and every one of the clock pulses, i.e., the revolution marker pulse RM, the message marker pulse MM, etc., are precisely aligned in time with a bit clock pulse $C_o$.

Figure 6A:
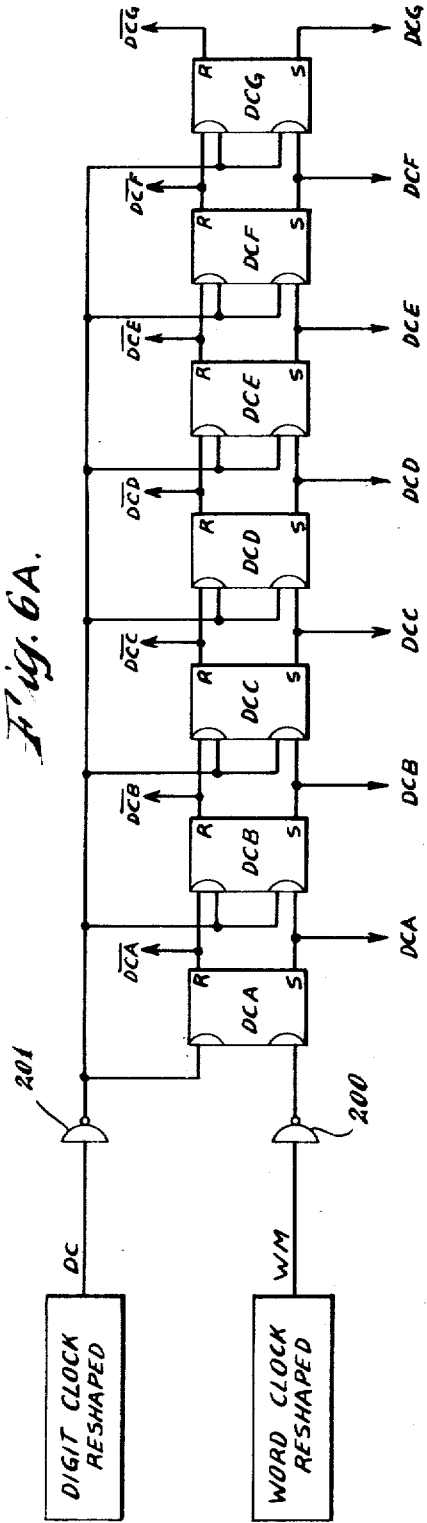
FIGURE 6A is a detailed circuit schematic diagram of a digit counter used to generate digit timing signals.

Referring now to FIGURE 6A, the reshaped work clock pulses WM and the reshaped digit clock pulses DC are used to generate additional timing pulses serving to identify the individual digit slots A through G in each word. As seen in FIGURE 6A, a series of flip-flops DCA through DCG are interconnected to form a digit counter. Each word clock pulse WM is inverted in an inverter 200 in order to provide a one to zero leading edge signal transition (positive) effective to trigger the first flip-flop DCA to its set condition. The digit clock pulses are applied through an inverter to the reset input of flip-flop DCA, and to the set and reset inputs of the remaining flip-flops DCB through DGC. Inasmuch as the flip-flops used in the circuitry of the present invention are reversible flip-flops, the set output S is fed back internally to the gated reset input and the reset output R is fed back internally to the gated set input. Consequently, when the flip-flop is in its reset state, its reset output R is a logical one and, when fed back to the gated set input, serves to enable the gated set input circuitry of the flip-flop. On the other hand, the set output S is a logical zero which, when applied internally to the gated reset input effectively inhibits any input tending to reset the flip-flop.

This being the case, it will be seen that although the leading edge of an inverted digit clock pulse DC applied to the gated reset input and an inverted leading edge of a word marker pulse WM simultaneously applied to the gated set input are both effective triggering pulses for the flip-flop DCA, the flip-flop will be triggered to its set condition by the word marker pulse WM inasmuch as it was previously in the reset condition. The flip-flop set output is a logical one for the interval of the least significant digit slot G of each word. The digit clock pulses DC serve to shift this logical one through the stages DCB through DCG in sequence so as to generate in corresponding sequence the digit timing signals DCA through DCG, and their complements $\overline{DCA}$ through $\overline{DCG}$, marking the digit slots of each word. Each word marker pulse WM causes the digit counter to recycle and again generate the digit timing signals DCA through DCG and $\overline{DCA}$ through $\overline{DCG}$ in sequence.

In a corresponding manner, the reshaped digit clock pulses DC and the bit clock pulses $C_0$ are applied to a bit counter comprised of flip-flop BCA through BCE to generate bit timing signals BCA through BCE, and their complements $\overline{BCA}$ through $\overline{BCE}$, identifying the individual bit slots of each digit. According to the binary decimal coded format, bit timing signals BCA and $\overline{BCA}$ identify the least significant bit slot 1 of a digit, timing signals BCD and $\overline{BCD}$ the most significant bit slot 8, and bit timing signals BCE and $\overline{BCE}$ the parity bit slot P.

Figure 6B:
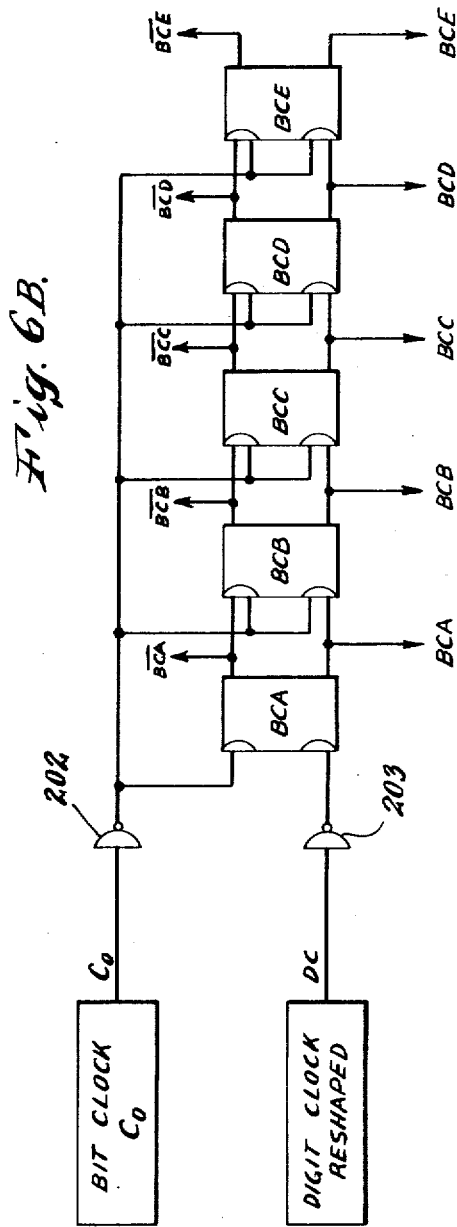
FIGURE 6B is a detailed circuit schematic diagram of a bit counter used to generate bit timing signals.
Figure 7:
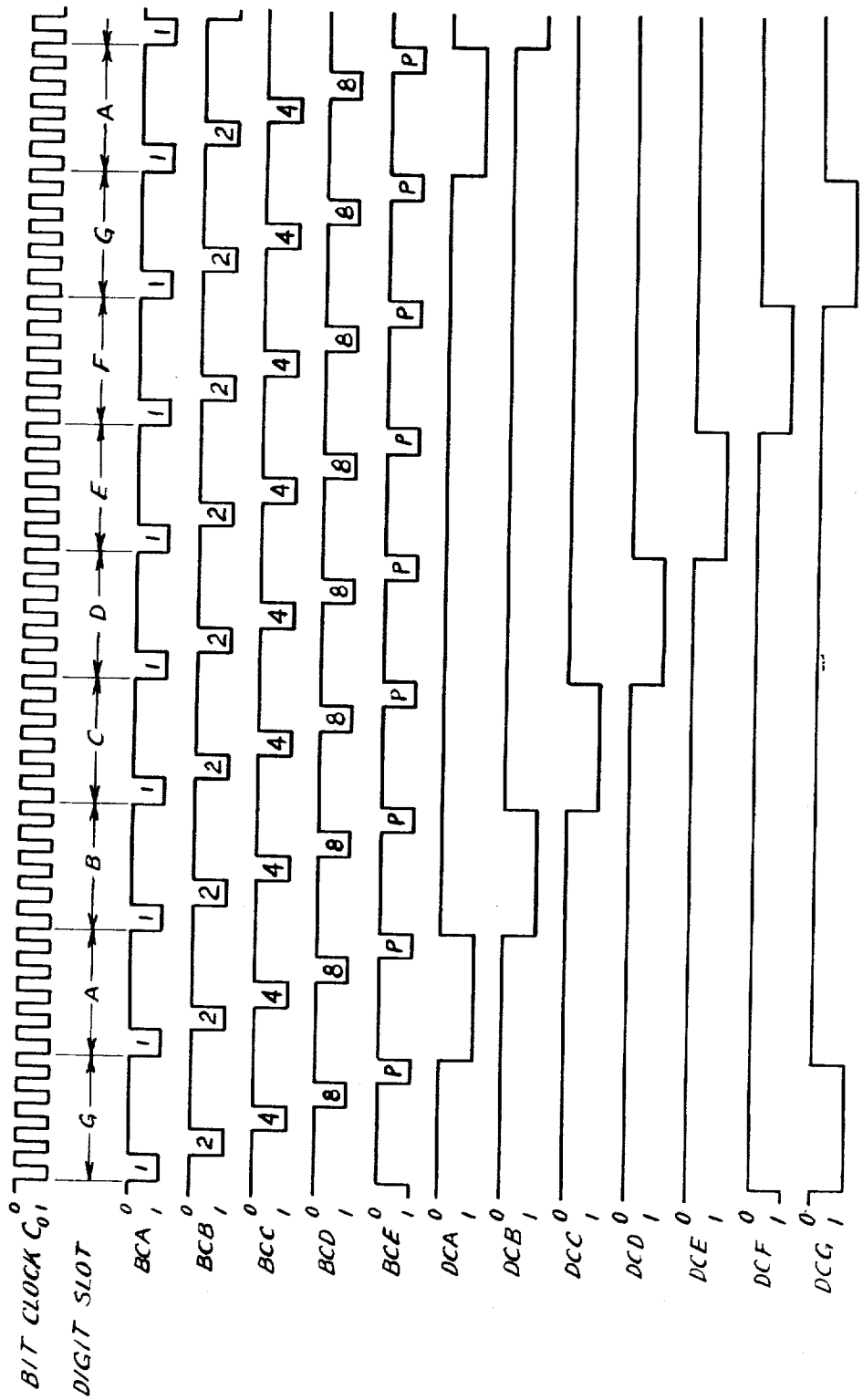
FIGURE 7 is a signal timing diagram of the digit and bit timing signals generated by the digit and bit counters of FIGURES 6A and 6B.

The timing relationship of the digit timing signals CDA–CDG generated by the digit counter (FIGURE 6A) and the bit timing signals BCA–BCE generated by the bit counter (FIGURE 6B) is shown in FIGURE 7.

ADDRESS LOGIC

Decoder-scanner

Figure 8:
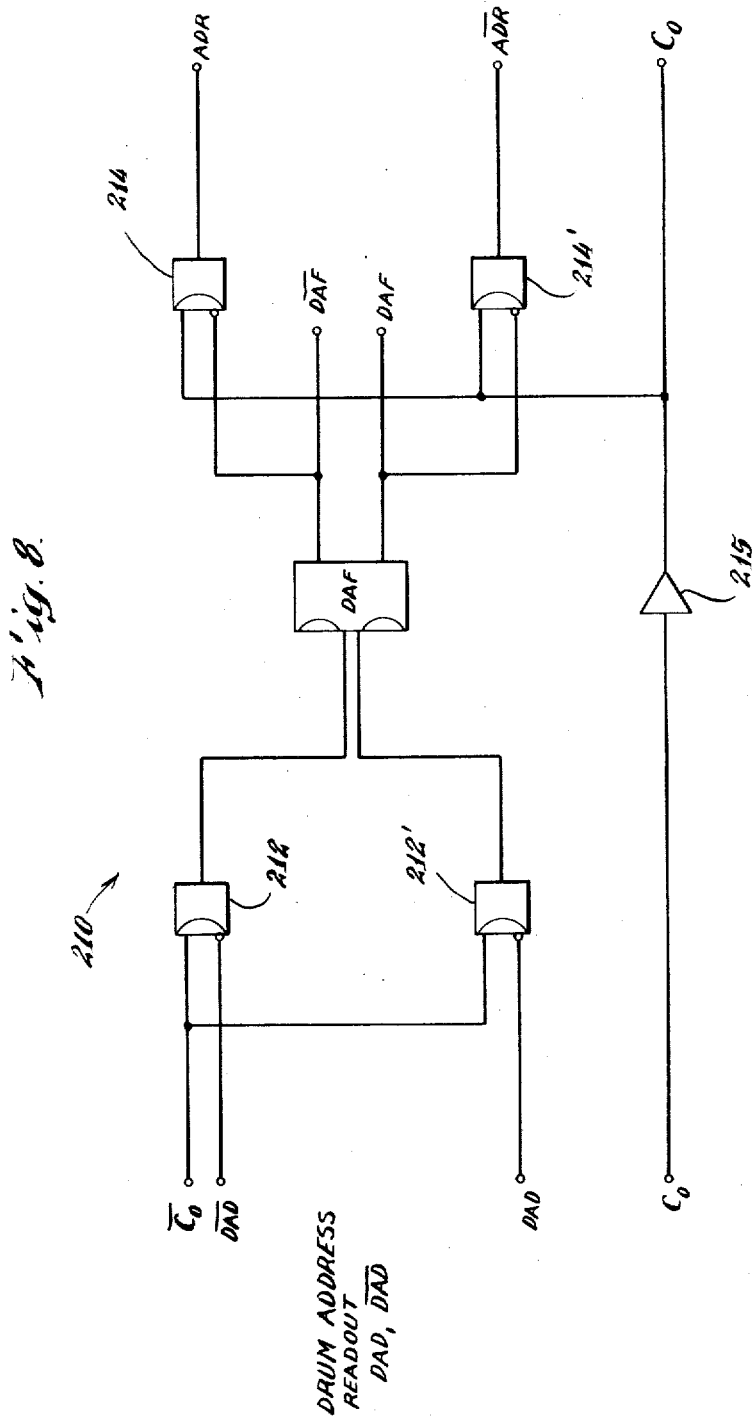
FIGURE 8 is a detailed circuit schematic diagram of an address reshape circuit used to reshape and retime the address words read from the address track on the magnetic drum of FIGURE 2A.

The individual address words DAD are read out from the drum address track 90a in serial bit by bit fashion by read head 94 (FIGURE 2A), and applied as complementary inputs DAD, $\overline{DAD}$ to an address reshape circuit, generally indicated at 210 in FIGURE 8. This address reshape circuit 210 is included as a part of the decoder-scanner 96 in FIGURE 2C. For purposes of the present description, it will be assumed that there is a logic inversion from the drum logic to the system logic. That is, from the standpoint of system logic, a logical one binary bit is recorded on the drum as a logical zero binary bit, and vice versa. It should be understood that this convention need not obtain and should not be considered as limiting the invention.

The address word input $\overline{DAD}$, which merely is the complement of address word input DAD, is applied to the enabling input of an A.C. gate 212. The address word input DAD is applied to the enabling input of a second A.C. gate 212'. The A.C. gates 212 and 212' are clocked by bit clock pulses $\overline{C_0}$, the complement of bit clock pulses $C_0$. A logical one binary bit in system logic is read from the drum address track 90a as a logical zero binary bit. Consequently, a binary one address input DAD enables the A.C. gate 212'. Since address input $\overline{DAD}$ is the complement of DAD, A.C. gate 212 is disabled for a binary one. On the other hand, when a logical zero binary bit in system logic is read from the drum address track 90a, the address inputs $\overline{DAD}$ and DAD enable A.C. gate 212 and disable A.C. gate 212', respectively. Whichever of the A.C. gates 212, 212' is enabled by the address inputs DAD, $\overline{DAD}$ passes a positive triggering pulse when an inverted bit clock pulse $\overline{C_0}$ goes through a positive transition to either set or reset a drum address flip-flop DAF. In system logic, the flip-flop DAF is set for a logical one binary bit and reset for a logical zero binary bit of the address word DAD.

The reset output $\overline{DAF}$ of the drum address flip-flop DAF is fed to the enabling input of an A.C. gate 214, and the set output DAF is applied to the enabling input of an A.C. gate 214'. The A.C. gates 214 and 214' are clocked by bit clock pulses $C_0$ after being amplified in an amplifier 215. Since the drum address flip-flop DAF is set for a binary one address word bit, its reset output $\overline{DAF}$, being a logical zero, enables A.C. gate 214 while its set output DAF disables A.C. gate 214'. If the drum address flip-flop DAF is reset to indicate a binary zero address word bit, A.C. gate 214 is disabled and A.C. gate 214' is enabled. As a result, on the occurrence of a positive going transition of the bit clock pulses $C_0$, a positive triggering pulse ADR appears at the output of A.C. gate 214 for every binary one address word bit, and a positive pulse $\overline{ADR}$ appears at the output of A.C. gate 214' for every binary zero address word bit.

The function of the address reshape circuit 210 is basically to reshape the individual address word bits and to individually reclock them to the bit clock pulses $C_0$.

Figure 9:
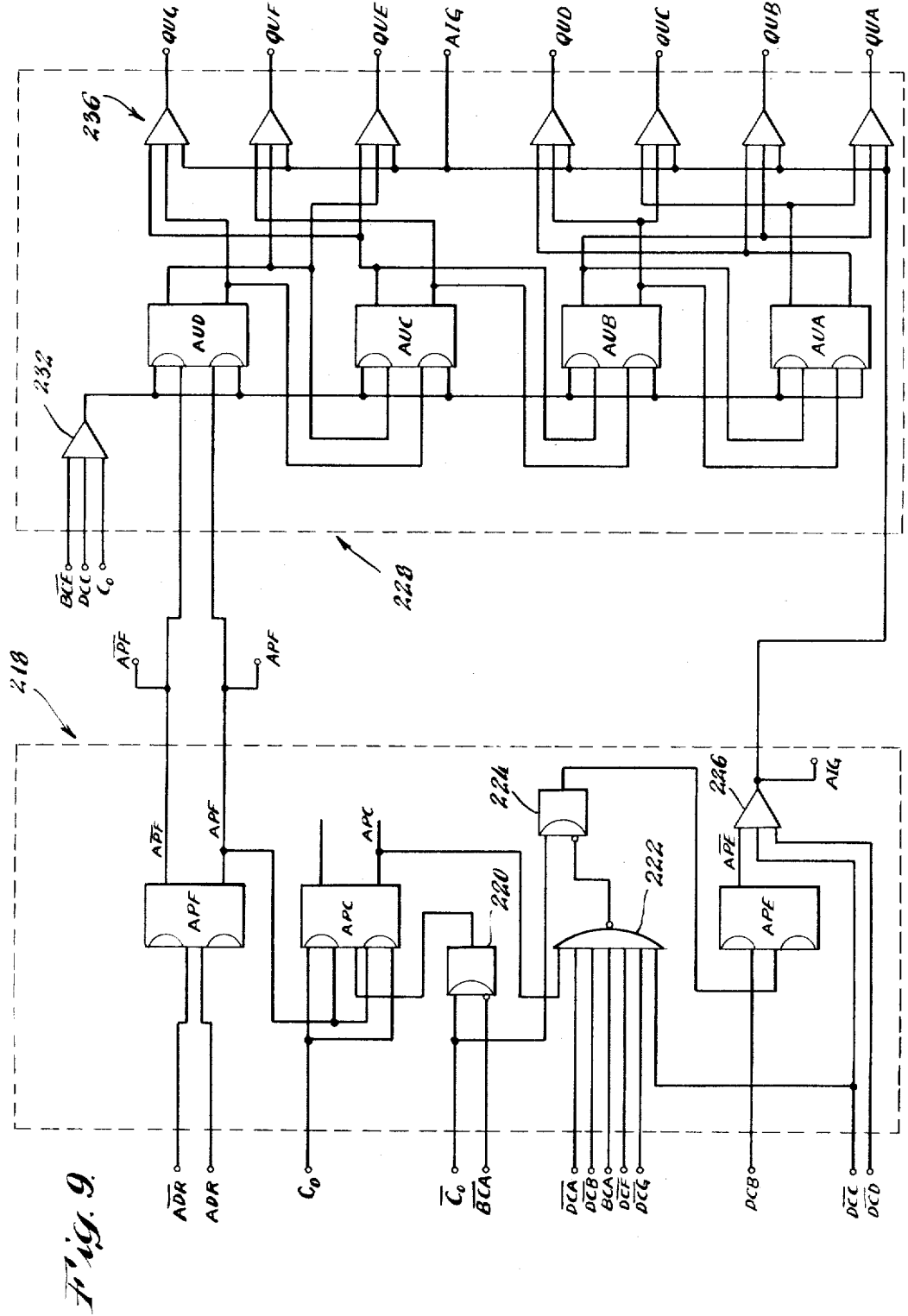
FIGURES 9 and 10 are detailed circuit schematic diagrams of an address register used to process the address words read from the address track on the magnetic drum of FIGURE 2A.

The reshaped address bits appearing as positive pulses ADR and $\overline{ADR}$ are applied to a parity check circuit, indicated generally at 218 in FIGURE 9, where each address digit is checked for parity error. The reshaped address word bits ADR and $\overline{ADR}$ are applied to the direct set and direct reset inputs, respectively, of an address parity flip-flop APF. Address parity flip-flop APF is set for binary one address word bits and reset for binary zero address word bits. The set output APF of the address parity flip-flop APF is applied to the set and reset gated inputs of an address parity check flip-flop APC. Bit clock pulses $C_0$ are also applied to the gated set and reset inputs of the address parity check flip-flop APC. An A.C. gate 220 is enabled by the bit timing signal $\overline{BCA}$, which is the complement of the bit timing signal BCA generated by the bit counter of FIGURE 6B for the first bit time of each digit. Inverted bit clock pulses $\overline{C_0}$ are applied to the gating input of the A.C. gate 220. A positive triggering pulse appearing at the output of the A.C. gate 220 is applied to the direct set input of the address parity check flip-flop APC to set this flip-flop at time approximately half way along in the first bit time (BCA) of each digit time.

The address parity check flip-flop APC is triggered according to the set output APF from the address parity flip-flop APF at the end of each bit time so as to change its state for each binary one address word bit entered into flip-flop APF. As a result, the address parity check flip-flop APC indicates by its state existing at the end of each digit time if the parity of each address digit is correct. As previously noted, the system uses an odd parity check in that the parity bit P is either a binary one or a binary zero in order to make the number of binary one bits in each address digit an odd number. Since the flip-flop APC is set for the beginning of each digit time, it should be in its reset state at the end of each digit time if the parity of the address digit is correct. If parity is incorrect, the address parity check flip-flop APC ends up in its set state at the end of a digit time indicating that the number of binary one bits in that digit is even.

The set output APC from the address parity check flip-flop APC is applied as one input to a NAND gate 222. The other inputs to NAND gate 222 are bits and digit timing signals $\overline{DCA}$, $\overline{DCB}$, BCA, $\overline{DCF}$, $\overline{DCG}$, $\overline{DCC}$. As was previously noted, the bit and digit timing signals generated by the circuitry of FIGURES 6A and 6B are reshaped and reclocked to the bit clock pulses $C_0$ in the same manner as the individual address word bits were reshaped and in FIGURE 8. As a result, the requisite timing relationship between the address word digits and the individual address word bits of the digits and the digit and bit timing signals is retained.

Still referring to FIGURE 9, the output from the NAND gate 222 is applied to the enabling input of an A.C. gate 224 while the inverted clock pulses $\overline{C_0}$ are applied to its gating input. The operation of the NAND gate 222 is such that at the beginning of each digit time (BCA) for digit times DCD and DCE its output enables the A.C. gate 224 if the set output APC from the address parity check flip-flop APC is a logical one. Since the address digits appear during the digit times DCC and DCD, the condition of the address parity check flip-flop APC during the bit time BCA of digit times DCD and DCE indicates the parity condition of the two address digits. If parity is correct, the A.C. gate 224 will not be enabled by the output from the NAND gate 222 in that the NAND gate is disabled by the set output APC of flip-flop APC. On the other hand, if parity is incorrect, the A.C. gate 224 is enabled and a clock pulse $\overline{C_0}$ is gated through to set a parity error flip-flop APE. Digit timing signal DCB is applied to the gated reset input of the address parity error flip-flop APE to reset it at the beginning of each address word time.

The reset output $\overline{APE}$ of the address parity error flip-flop APE is applied as one input to a gated amplifier 226. The gated amplifier 226 is disabled during the digit times DCC and DCD by the digit timing signals $\overline{DCC}$ and $\overline{DCD}$. Assuming no parity error, the $\overline{APE}$ output of the address parity error flip-flop APE is a logical one and the gated amplifier 226 is enabled after the fourth digit time DCD, i.e., at the beginning of digit time DCE. The gated amplifier 226 then generates an address inhibit gate signal AIG which is used to read out an address register indicated generally at 228 in FIGURE 9, and an address register indicated generally at 230 in FIGURE 10. If however, the address parity error flip-flop APE is in its set condition to indicate a parity error, its reset output $\overline{APE}$ is a logical zero and the gated amplifier 226 is disabled. The address inhibit gate signal AIG is not generated and the address registers 228 and 230 are not read out.

Figure 10:
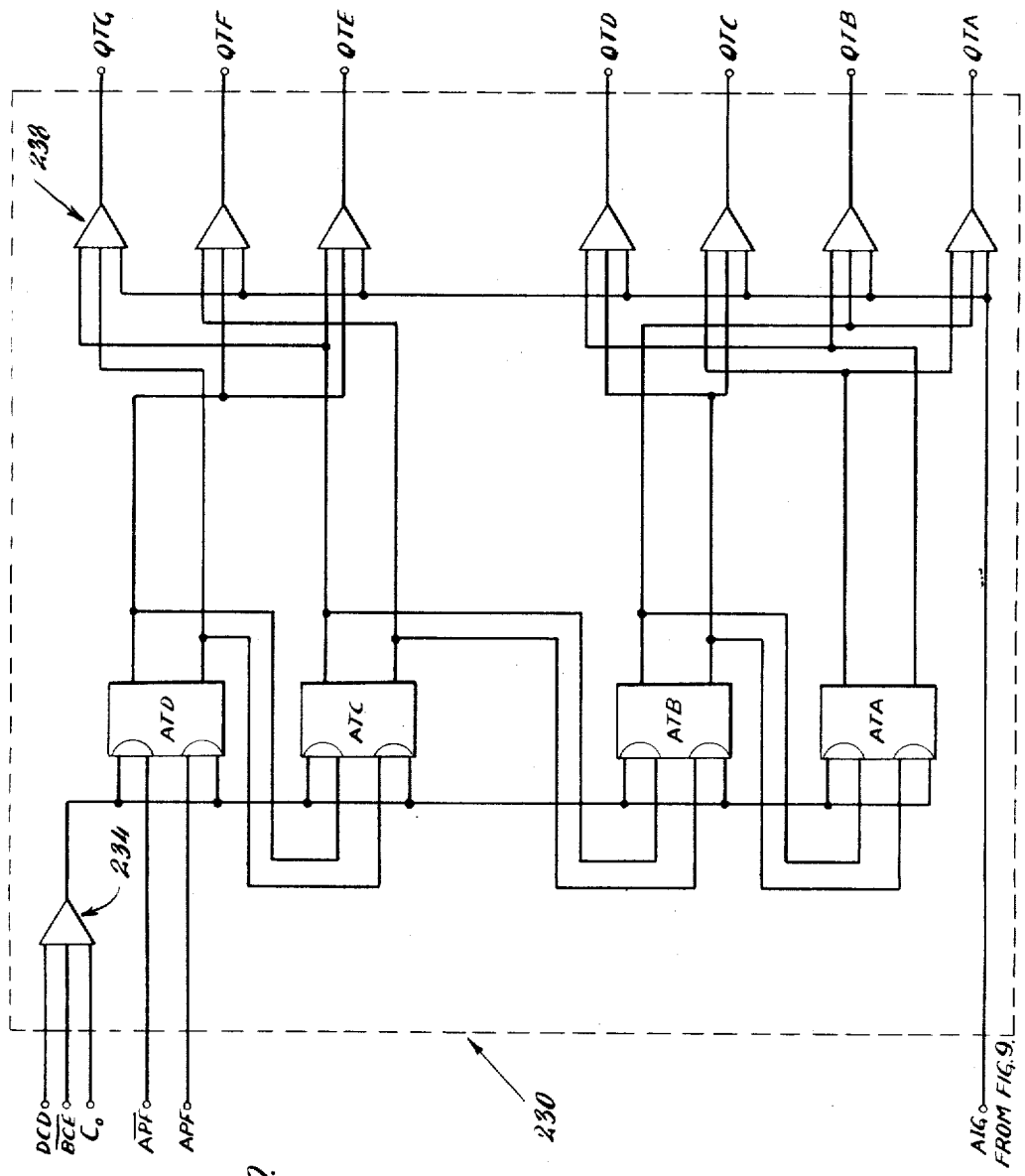

During the time that the individual address digits are checked for parity by the parity check circuit 218, the set output APF and the reset output $\overline{APF}$ of the address parity flip-flop APF are applied in parallel to the address register 228 of FIGURE 9 and the address register 230 of FIGURE 10. Address register 228 includes four flip-flops AUA–AUD which are interconnected to form a shift register. Similarly, the address register 230 of FIGURE 10 includes flip-flops ATA–ATD also interconnected to form a shift register. The reset output $\overline{APF}$ from the address parity flip-flop APF is applied to the gated reset input of flip-flop AUD of register 228 and the gated reset input of flip-flop ATD of register 230. The set output APF of the address parity flip-flop APF is applied to the gated set input of the flip-flop AUD of register 228 and to the gated set input of the flip-flop ATD of register 230.

Address register 228 of FIGURE 9 further includes a gated amplifier 232 having as inputs the bit timing signal $\overline{BCE}$, the digit timing signal DCC, and bit clock pulses $C_0$. The outputs from the gated amplifier 232 are applied to the gated set. And reset inputs of the flip-flops AUA–AUD. These outputs serve to shift the first four bits of the least significant digit of the address word into the register 228 which appear at the outputs APF, $\overline{APF}$ of the address parity flip-flop APF during the first four bit times of digit time DCC. When the address register 228 is filled, the flip-flop AUA stores the least significant bit 1 of the least significant address digit while the flip-flop AUD contains the most significant bit 8. The parity bit (P) for the least significant address digit is not shifted into the address register 228 since, when the register if full, the parity bit is held in the address parity flip-flop APF. The parity bit is discarded.

The address register 230 of FIGURE 10 operates in the same manner as the address register 228 except that it is filled with the most significant digit of the address word DAD. The shifting in of the most significant digit is controlled by a gated amplifier 234 whose output is applied to the gated set and reset inputs of the flip-flops ATA–ATD. The digit timing signal DCD, the bit timing signal $\overline{BCE}$ and the bit clock pulses $C_0$ applied as inputs to the gated amplifier 234 insure that shift pulses for the address register 230 are generated only during the first four bit times of digit time DCD which occur during the first four bit times of the most significant address digit. As in the case of the address register 228, the parity bit P for the most significant address digit is not shifted into the address register 230 and is discarded.

Returning to FIGURE 9, the set and reset outputs of the flip-flops AUA–AUD holding the least significant digit of the address word DAD are applied in predetermined input combinations to an array of gated amplifiers indicated generally at 236. The outputs QUA–QUG, because of the manner in which the outputs of the flip-flops AUA–AUD are applied to the inputs of the gated amplifiers 236, are the quaternary coded conversion of the binary coded least significant address digit held in the address register 228. The following conversion table illustrates this code conversion:

| AUD | AUC | 1 | AUB | AUA | 1 | Decimal Digit |
|---|---|---|---|---|---|---|
| 0 | 0 | QUE | 0 | 0 | QUA | 0 |
| 0 | 0 | QUE | 0 | 1 | QUB | 1 |
| 0 | 0 | QUE | 1 | 0 | QUC | 2 |
| 0 | 0 | QUE | 1 | 1 | QUD | 3 |
| 0 | 1 | QUF | 0 | 0 | QUA | 4 |
| 0 | 1 | QUF | 0 | 1 | QUB | 5 |
| 0 | 1 | QUF | 1 | 0 | QUC | 6 |
| 0 | 1 | QUF | 1 | 1 | QUD | 7 |
| 1 | 0 | QUG | 0 | 0 | QUA | 8 |
| 1 | 0 | QUG | 0 | 1 | QUB | 9 |

In corresponding fashion, the set and reset outputs of the flip-flops ATA and ATD of address register 230 (FIG. 10) are applied in specific input combinations to an array of gated amplifiers indicated generally at 238. The outputs QTA–QTG from the gated amplifiers 238 are then the quaternary code conversion of the binary coded most significant address digit held in address register 230. The code conversion logic for the most significant address digit corresponds to the conversion logic for the least significant address digit as illustrated in the conversion table above.

The address inhibit gate signal AIG generated by the parity check circuit 218 in FIGURE 9 is applied as one input to each of the gated amplifiers 236 of the address register 228 and amplifiers 238 of the address register 230 (FIG. 10). This signal serves to inhibit the gated amplifiers 236 and 238 during the times when the address registers 228 and 230 are being filled, and when a parity error has been detected.

The quaternary coded address words expressed by the outputs QUA–QUG (least significant digit) from the address register 228 (FIG. 9), and QTA–QTG (most significant digit) from the address register 230 (FIG. 10) are applied in predetermined fashion to a quaternary to decimal decoder shown in FIGURES 11, 12 and 13. The function of this quaternary to decimal decoder is to translate the fourteen quaternary inputs QUA–QUG and QTA–QTG into one hundred outputs where each output corresponds to a particular machine station 50 as determined by the address word read from the drum address track 90a (FIGURE 2). The quaternary to decimal decoder includes a plurality of decoding banks, generally indicated at 250 through 253 in FIGURE 11, 254 through 257 in FIGURE 12, and 258 through 262 in FIGURE 13. The one hundred outputs 00 through 99 corresponding to the one hundred machine stations 50 are shown emanating from the left of each decoder bank 250–262 in FIGURES 11 through 13.

Assuming that the address words referring to the machine stations, identified as 00 through 99, are read out in numerical sequence, the quaternary to decimal decoder output lines 00 through 99 will be pulsed in corresponding numerical sequence. Thus, the decoder functions also as a scanner and its one hundred outputs are the scanner lines 98 noted in FIGURE 2C.

Each of the decoding banks 250 through 262 is comprised of an array of NAND gates such as disclosed for decoding bank 250 in FIGURE 11 as indicated generally at 264. As seen in FIGURE 11 each decoder output line or scanner lnie is connected to the output of one of the NAND gates included in the decoding banks 250 through 262. All of the scanner lines are held at a negative voltage (logical one) except the one line which corresponds to the address read from the address track 90a. The NAND gate whose output is connected to this one scanner line goes to zero volts (logical zero). Consequently, the output from the decoder is in the form of a ground pulse (logical zero) on a particular scanner line which corresponds to the address word read from the drum address track 90a. The reason that the address words are decoded from binary coded decimal to quaternary coded format and then to decimal rather than directly from binary coded decimal to decimal is that there is a considerable savings in the number of components required if the intermediate quaternary decoding step is performed.

In describing the operation of the decoder of FIGURES 11 through 12, the operation of the NAND gate 266 whose output is connected to the scanner line designated 00 will be considered in full. All other NAND gates 264 operate in corresponding fashion. As seen in FIGURE 11, the inputs to NAND gate 264 are the quaternary inputs QUA, QUE, QTA and QTE. It will be seen that when the least significant address digit is a zero, the quaternary outputs QUA and QUE are each a logical one, and when the most significant address digit is a logical zero, the quaternary inputs QTA and QTE are likewise each a logical one. Since all four inputs to the NAND gate 64 are a logical one, its output which is connected to the decoder line 00 switches from a logical one to a logical zero, i.e., from a negative voltage to ground.

*Switching logic*

The one hundred scanner output lines 00–99, designated at 98 in FIGURE 2C, are connected from the decoder of FIGURES 11–13 to the switching logic circuit 92 specifically shown in FIGURE 14. The switching logic circuit 92 includes a plurality of switching banks of which three are shown at 270, 271 and 272. In the instant example, since there are one hundred scanner output lines 98 from the quaternary to decimal encoder, there will be one hundred such switching banks in the switching logic circuit 92. As specifically detailed for switching bank 270, each switching bank includes an address relay 274, a piece count relay 276, a time count relay 278 and a power on relay 279. Each of the address relays 274 is individually operated from the console 56 by an array of individually manually operated push buttons commonly indicated at 280. Each of the individual push buttons 280 is assigned a particular machine station 50, and when depressed completes an energizing circuit for an address relay 274 associated with the same machine station. In this manner a particular machine station 50 is selected from the console 56.

The relay contacts 274a of each of the one hundred address relays 274 are connected to the scanner line 98 associated with the same machine station 50 as the particular address relay operating them. Then a particular address relay 274 operates to close its associated contact 274a, a pulse, when appearing on the particular scanner line connected thereto, is passed through the closed relay contacts and a diode 282 to a common output line 59 to become the selected address signal SAD. Each and every scanner line can be similarly connected to the common output line 59 through operated relay contacts 274a of an address relay 274 and a diode 282.

It will thus be seen that a selected address signal SAD is generated only when one of the address relays 274 in the various switching banks is operated from the console 56. Moreover, a selected address signal SAD appears on common output line 59 at a time when the address word DAD corresponding to the selected machine station 50 has been read from the drum address track 90a and decoded in the manner described.

In practice, suitable holding circuitry may be included in the energizing circuitry for each address relay 274 in order that the address relays will be held operated in response to a momentary depression of the pushbuttons 280. In certain system operating modes to be described later, the individual address relays 274 in the one hundred switching banks are picked up automatically and in sequence. To achieve this, a conventional stepper switch 286 located in the console 56 operates to sequentially pick up the individual address relays 274.

Still referring to FIGURE 14, the operation of each piece count relay 276 is controlled by the piece count sensor switch 51 located at each machine stations 50. The piece count sensor switch 51 is mounted on the machine in a manner so as to open when a piece is made by the machine. The energizing circuit for the corresponding piece count relay 276 in the switching logic circuit 92 is opened and the associated relay contacts open. On the other hand, if the machine is in the process of making a piece, the sensor switch 51 is closed and the piece count relay 276 is operated to close its associated contacts 276a. The same scanner line 98 which is connected to the relay contacts 274a of the address relay 274 associated with a particular machine station 50 is also connected to the relay contacts 276a of the piece count relay 276 whose operation is controlled from the same machine station. When that scanner line is pulsed, the pulse is passed through the closed relay contacts 276a and a diode 288 to a common output line 64. The signals appearing on output line 64 are the piece count inputs PCI for the various machine stations 50. If the piece count relay contacts are closed when the scanner line connected thereto is pulsed, the piece count input PCI for the corresponding machine station 50 is a logical zero indicating that a piece is in progress at that machine station. Conversely if the piece count relay contacts 276a are open, the piece count input PCI for that machine station is interpreted as a logical one, meaning that a piece has been made at that machine station.

The operation of the time count relay 278 in each of the switching banks of the switching logic circuit 92 is controlled by the time count switch 53 located at the corresponding machine station 50. As seen in FIGURE 14, the time count switch 53 is included in an energizing circuit for the time count relay 278 over line 53a.

The scanner line 98 corresponding to a particular machine station 50 is connected through closed contact 278a of piece count relay 278, the normally closed contacts 279a of power on relay 279, and a diode 292 to a common output line 294, or through closed contacts 278b of piece count relay 278, normally closed contacts 279b of power on relay 279, and a diode 296 to a common output line 298. The power on relay 279 is operated from the machine stations 50 over line 281 when a power on switch 283 is closed to indicate that a machine station is turned on and should be in production. When the power on relay 279 is operated, its relay contacts 279a and 279b are closed.

Assuming that a particular machine station 50 is producing pieces and thus on elapsed time, the time count switch 53 is in the position shown and the time count relay 278 is deenergized. The time count relay contacts 278a are closed to connect the scanner line through to common output line 294. When the scanner line is pulsed, the elapsed time input signal ETI is a logical zero indicating that a particular machine station 50 is on elapsed time. If the time count switch 53 is closed, indicating that this particular machine is on down time, the energization circuit for the time count relay 278 is completed and its contacts 278a open while its 278b close. As a result, the scanner output line is connected through to common output line 298. When the scanner line is pulsed, the down time input DTI for that machine is a logical zero indicating that the machine is on down time. In this case time count relay contacts 278a are open, and the elapsed time input ETI on line 294 for that machine is a logical one. If the machine station has not been turned on, the power on relay contacts 279a and 279b are open, and thus both the elapsed time input ETI and the down time input DTI are logical ones indicating that this machine station is neither on elapsed time or down time.

It will be seen that the piece count input PCI, the elapsed time input ETI and the down time input DTI are generated in succession as each machine station 50 is interrogated by the pulses appearing in corresponding succession on the scanner lines 98 from the address word decoder. Thus, the particular point in time when the inputs PCI, ETI and DTI appear earmarks the particular machine station 50 to which they pertain. Since any one machine station is interrogated once on each revolution of the drum 90 (FIGURE 2A) the inputs PCI, ETI and DTI are developed for all the machine stations during one drum revolution. Similarly, the selected address signal SAD appears at a time during each drum revolution when the selected machine station 50 is interrogated.

CONSOLE

*Control panel*

The circuitry for initiating the various operating modes of the system and apparatus of the present invention at the console 56 is shown in FIGURE 15. The system has three operating modes, to wit, ENTRY, READOUT, and DISPLAY, which are initiated from the console 56. The accumulation of dynamic data is carried out automatically, and therefore independently of the console 56.

In the ENTRY mode, static data and static corrections of dynamic data can be entered from the console 56 on an individual machine station basis or on a multiple machine station basis where data is entered from the console for each of the 100 machine stations in an automatically continuing sequence. Similarly, in the READOUT mode, static and dynamic data can be read out from the system on an individual machine station basis and printed out by the teletypewriter 80. In addition, the READOUT mode can be performed on a multiple machine station basis where the static and dynamic data for every machine station 50 is assembled into message form in the message assembly register 76 and printed out by the teletypewriter 80 in sequence. This multiple READOUT mode is generally instituted at the end of a work shift although it can be instituted at any time. In the DISPLAY mode, selected data words of a selected machine station 50 are displayed at the console 56.

Referring specifically to FIGURE 15, a data enter flip-flop DEF conditions the system for operation in the ENTRY mode while a data read flip-flop DRF conditions the system for operation in the READOUT mode. A data display flip-flop DDF conditions the system for the DISPLAY mode. Under normal circumstances, the only data to be entered from the console 56 is the static data employee number and job number. It is contemplated that the machine number for a particular machine station 50 will remain constant since it will be highly unlikely that particular machines will be moved from one machine station 50 to another. As will be seen from the description to follow, the piece and time count dynamic data enters directly and automatically from the individual machine stations through the switching logic circuit 92 (FIGURE 14) and does not go through the console 56. However, as will be seen later, the system does have the capacity to correct or modify the piece and time count data recorded on a drum 90 from the console 56.

When it is desired to enter an employee number, a push button (not shown) is depressed by the console operator to apply a logical zero to the input termed EER of an AND gate 310. The output of AND gate 310, which is normally a logical one, goes to a logical zero causing the data enter flip-flop DEF to be set. Similarly, if it is desired to enter a job number, the console operator depresses a job number button (not shown) to apply a logical zero to the input termed JER causing the output of the AND gate 310 to go to a logical zero and thereby also trigger the data enter flip-flop DEF to its set condition. When entering a job number, it is generally desirable to also enter the employee number. Consequently, the input JER is also effective to set a job enter flip-flop JEF. The set output JEF of the job enter flip-flop JEF is applied directly to the gated reset input of the data enter flip-flop DEF to reset the data enter flip-flop DEF when the job enter flip-flop JEF resets. The set output JEF of the job enter flip-flop JEF is also applied to the enabling input of an A.C. gate 312. The output of the A.C. gate 312 is applied to the direct reset input of the date enter flip-flop DEF.

As will be seen from the description of FIGURE 17, an enter digit G pulse EDG is generated during the time when the seventh or last digit of a word is being entered from the console 56. The trailing edge of this enter digit G signal EDG is passed by the A.C. gate 312, if enabled, to reset the data enter flip-flop DEF. If only an employee number is to be entered, the data enter flip-flop DEF is rest on the trailing edge of the enter digit G signal EDG, which indicates that the last digit of the employee number has been entered. If however, both an employee number and a job number are to be entered or the job number alone, the job enter flip-flop JEF is set and its set output JEF inhibits the A.C. gate 312 so that the enter digit G signal EDG does not reset the data enter flip-flop DEF upon entry of the last digit of the employee number but rather upon entry of the last digit of the job number from the console 56. The job enter flip-flop JEF is reset to, in turn, reset the data enter flip-flop DEF when the last digit of the job number has been entered from the console 56 by the enter word signal EWB (FIGURE 20) and the word advance clock $\overline{WAC}$ (FIGURE 21A) which are both applied to the gated reset input of the flip-flop JEF.

The operation of the data enter flip-flop DEF thus far described covers the situation where static data is to be entered on an individual machine station basis. Once the data enter flip-flop DEF is set, whether to enter either or both an employee number and a job number, an appropriate one of the push buttons 280, shown in FIGURE 14, is depressed by the console operator to select the particular machine station 50 for which this static date data is to be entered.

To initiate a READOUT mode, the console operator depresses a readout button (not shown) causing a logical one to zero transition at the input DRR to the gated set input of the data read flip-flop DRF. This logical one to logical zero signal transition causes the data read flip-flop DRF to go to its set condition. The console operator then depresses a particular push button 280 (FIGURE 14) to select the particular machine station 50 for readout of the static and dynamic data recorded on the magnetic drum 90. As generally described in connection with FIGURES 2A, 2B and 2C, the static and dynamic data for the selected machine station 50 is read out from the static and dynamic data tracks and assembled into a message in the message assembly register 76, whereupon the message is transferred to the output buffer. Once the message has been transferred, the output buffer generates an output transfer signal OTF effective to reset the data read flip-flop DRF.

If it is desired to merely DISPLAY a selected data word for a selected machine station 50, the operator depresses a display button (not shown) producing a logical one to logical zero signal transition on input terminal DDR connected to the gated set input of a data display flip-flop DDF. The data display flip-flop DDF is then set. One of the push buttons 280 (FIGURE 14) is depressed by the console operator to select the machine station 50 for which data is to be displayed. Additional control buttons referred to in connection with FIGURES 20 and 21 are manipulated by the console operator to select which data word, whether employee number, machine number, job number, etc., is to be displayed. The selected data word of the selected machine station 50 is read out from the appropriate data track on the drum 90 and entered into the message assembly register 76. From there, the selected word is readout to a visual display unit 762 and displayed at the console 56 as will be described in detail in connection with FIGURE 31. The data display flip-flop DDF is reset when the system is converted to a different mode by the reset outputs $\overline{DRF}$ and $\overline{DEF}$ from the data read flip-flop DRF and the data enter flip-flop DEF, respectively, as applied to the gated reset input of the data display flip-flop DDF.

With the exception of the DISPLAY mode, the system can be so conditioned that the data ENTRY and the data READOUT modes automatically sequence through all one hundred of the machine stations 50. In the ENTER mode, for example, the data enter flip-flop DEF is triggered to its set condition in the manner described above. If employee numbers and/or job numbers are to be entered for all of the machine stations 50, the console operator then depresses an ALL function push button (not shown) to generate a logical one to logical zero signal transition at the input terminal ALL. This input is applied to the gated set input of an all function flip-flop ALF, causing it to be set. At the same time, this input is applied also to the gated set input of an enter all flip-flop EAF and the gated set input of a read all flip-flop RAF. Assuming that the system is in the ENTRY mode, the data enter flip-flop DEF has been set and its set output DEF is applied to the gated set input of the enter all flip-flop. Inasmuch as the set output DEF is a logical one in the ENTRY mode, the enter all flip-flop EAF will be set by the triggering input applied to the ALL input terminal.

On the other hand, if it is desired to operate the system in the multiple READOUT mode, the data read flip-flop DRF would have been set producing a logical one set output DRF, which is applied to the gated set input of the read all flip-flop RAF. Consequently, the triggering input appearing at the input terminal ALL will trigger the read all flip-flop RAF to its set condition.

At the same time that the all flip-flop ALF is set and either the enter all flip-flop EAF or the read all flip-flop RAF set, the triggering input appearing at the input terminal ALL is applied to the input of a one-shot multivibrator SMP. In response to this triggering input, the one-shot multivibrator SMP develops a stepping pulse SMP which is applied to the stepper switch indicated at 286 in FIGURE 15. The stepping pulse SMP is applied to the stepper magnet coil, indicated generally at 320. The stepper magnet pulse SMP causes the stepper magnet to pull, and at the termination of the stepping pulse SMP, releases to cause a stepper switch arm 321 mechanically connected thereto to index one switch position. Originally the stepper switch arm 321 contacts a terminal 322 which is the stepper home position SHR. When the stepper switch arm 321 indexes to the next switch position from the stepper home position SHR, the address relay 274 for machine station 00 picks up to select machine station 00 (FIGURE 14). Each successive stepping pulses SMP indexes the stepper switch arm 321, and the address relays 274 are picked up in sequence. After the address relay 274 for machine station 99 has been picked up, the next stepping pulse SMP indexes the stepper switch arm 321 to the stepper home position SHR. A stepper home signal SHR is then generated to reset the ALL function flip-flop ALF and either one of the enter all EAF or the read all RAF flip-flops which was previously set to condition the system for multiple ENTRY or multiple READOUT.

The resetting of these flip-flops signals the completion of an ALL function.

The circuitry for perpetuating the operation through to completion of an all function will now be described. As previously noted, the data enter flip-flop DEF is reset after entry of the employee and/or job numbers for a selected machine station has been completed. Similarly, the data read flip-flop DRF is reset after a message for a selected machine station 50 has been transferred to the output buffer 78 (FIGURE 2C). A NAND gate 330 is enabled by the set output ALF of the ALL function flip-flop ALF. The other input to NAND gate 330 is derived from the output of a NAND gate 332. The inputs to NAND gate 332 are the reset outputs $\overline{DEF}$, $\overline{DDF}$ and $\overline{DRF}$ from the data enter flip-flop DEF, the data display flip-flop DDF and the data read flip-flop DRF, respectively. NAND gate 332 is disabled by the data display flip-flop DDF for the DISPLAY mode since this mode is never performed on a multiple machine station basis.

Considering the ENTRY mode, the data enter flip-flop DEF is initially set by the console operator from the output of an AND gate 310. For an ALL function in the multiple ENTRY mode, the ALL function flip-flop ALF and the enter all flip-flop EAF are set. As the flip-flops ALF and EAF are set, the one-shot multivibrator SMP is triggered directly from the input terminal ALL, and a stepping pulse SMP is generated to index the stepper switch arm 321, picking up the address relay 274 for the first machine station 00. After entry has been effected as to machine station 00, the data enter flip-flop DEF is reset either from the output of A.C. gate 312 or by the set output of the job enter flip-flop JEF. When the data enter flip-flop DEF resets, NAND gate 332 is fully enabled, and its output, inverted in inverter 333, is passed by NAND gate 330 to trigger the one-shot multivibrator SMP and thereby generate another stepping pulse SMP. The stepper switch arm 321 indexes to the next position picking the address relay 274 for machine station 01 (FIGURE 14).

The output EAF of the enter all flip-flop EAF is applied as an enabling input to a NAND gate 336. The other input to the NAND gate 336 is a signal STA generated by the stepper switch 286 through operation of a switch 338 mechanically coupled to the stepper magnet 320. When the stepper magnet 320 pulls in response to a stepping pulse SMP, the switch 338 opens and then closes when the stepper magnet releases to step the stepper switch arm 321 to its next switch position. The logic circuits used in the invention interpret an open line as a logical one, thus with switch 388 open the signal STA is a logical one. On closure of the switch 338, the signal STA goes to a logical zero to indicate that the stepper switch 286 has stepped to the next position and has picked up the next address relay 274. In practice, it has been found desirable to route the signal STA through secondary relay contacts of the individual address relays 274 such that this signal will appear only after the selected address relay has actually picked up. When the signal STA returns to a logical zero, the output of NAND gate 336 sets the data enter flip-flop DEF for entry of data for the machine station 50 selected by operation of the stepper switch 286. Thus, for the multiple ENTRY mode, the flip-flop DEF is repeatedly set from the output of NAND gate 336.

This operation continues in sequence with respect to all of the machine stations 50. After the address relay 274 for the machine station 99 has been picked up and data relative thereto has been entered, the stepper switch arm 321 advances to home position SHR, whereupon flip-flops ALF and EAF are reset and flip-flop DEF can no longer be set from the output of NAND gate 336.

The multiple READOUT mode is carried to completion in the same manner. The data read flip-flop DRF is initially set by the console operator through input DRR. The ALL function triggering input applied at input terminal ALL causes the all function flip-flop ALF and the read all flip-flop RAF to be triggered to their set condition. The operation of the stepper switch 286 is precisely the same as described above for the multiple ENTRY mode. The data read flip-flop DRF is reset from the output buffer 78 each time a message has been transferred from the message assembly register 76, and then automatically set when the stepper switch has indexed to its next position by the output from a NAND gate 340 whose inputs are the set output RAF from read all flip-flop RAF and the stepper switch signal STA. After READOUT has been effected for machine station 99, the stepper switch arm 321 returns to its home position SHR and flip-flops ALF and RAF are reset to signal the completion of a multiple READOUT. NAND gate 340 is now disabled and the data enter flip-flop cannot be set.

Referring now to FIGURE 16, the selected address signal SAD developed by the switching logic circuit 92 of FIGURE 14 to identify a machine station 50 which has been selected from the console is applied to a synchronizing circuit generally indicated at 350. The purpose of the circuit 350 is to synchronize the selected address signal SAD so that it can be used to precisely locate the data recorded on the drum 90 pertaining to the selected machine station 50. As was pointed out in connection with FIGURE 3, an address word DAD is read from the drum address track 90a during the word time immediately preceding the word time when the static and dynamic data corresponding to that address word may be read from or recorded on the drum 90. As a consequence, the selected address signal SAD is not precisely in time alignment with the time when the static and dynamic data words relating to the selected machine station 50 can be read out or recorded on the drum 90.

As seen in FIGURE 16, the selected address signal SAD is inverted in an inverter 351 and applied as one input to a NAND 352. The set output DEF of the data enter flip-flop DEF (FIGURE 15) is gated with the stepper switch signal STA in a NAND gate 353. The output of NAND gate 353 is gated with a data transfer signal $\overline{DTF}$ in a NAND gate 354. Returning to FIGURE 15, the data transfer signal $\overline{DTF}$ is generated by gating together the reset output $\overline{DDF}$ from the data display flip-flop DDF and the reset output $\overline{DRF}$ from the data read flip-flop DRF in a NAND gate 355. The output from NAND gate 355 designated DTF is inverted in an inverter 356 to develop the data transfer signal $\overline{DTF}$. The outputs DTF and $\overline{DTF}$ from NAND gate 355 indicates the particular operating mode the system is conditioned to. Thus, if the output DTF is a logical zero, and therefore $\overline{DTF}$ is a logical one, the data display flip-flop DDF and the data read flip-flop DRF are both reset, and the system is neither in the DISPLAY mode or the READOUT mode. If the output DTF from NAND gate 355 is a logical one, the system is either in a DISPLAY mode or a READOUT mode. In this case, the data transfer signal $\overline{DTF}$ is a logical zero.

Returning to FIGURE 16, the output from NAND gate 354 is applied to a second input of NAND gate 352. The bit timing signal BCD and the digit timing signal DCG make up the remaining two inputs to the NAND gate 352. It will be recalled from the description of the switching logic circuit 92 (FIGURE 14) that the selected address signal SAD, when it appears, is a logical zero. Consequently, the selected address signal SAD must be inverted to a logical one by the inverter 351 to enable NAND gate 352. The data transfer signal $\overline{DTF}$ is a logical one to enable NAND gate 354 when the system is in the ENTRY mode, i.e., not in the DISPLAY mode and not in the READOUT mode. If the system is in the ENTRY mode, the set output from the data enter flip-flop DEF is a logical one, and, if the stepper switch 286 has settled down, the signal STA is a logical one. With both inputs to the NAND gate 353 being a logical one, its output is a logical zero which gives rise to a logical one output from NAND gate 354. During the fourth bit time (BCD) of the seventh digit time (DCG), all inputs to the NAND gate 352 are logical ones when the selected address signal SAD is generated by the switching logic circuit 92. Consequently the output from NAND gate 352 switches to a logical zero to enable an A.C. gate 358. During the next bit clock pulse $C_o$ after the A.C. gate 358 has been enabled, an address select flip-flop ASF is set by the output from the A.C. gate 358 as applied to its direct set input. The selected address signal SAD is also applied together with the bit timing signal BCD and the digit timing signal DCG as separate inputs to a NAND gate 360. The output of NAND gate 360 is applied to the enabling input of an A.C. gate 361. The output of A.C. gate 361 is applied to the direct reset input of the address select flip-flop ASF. When the selected address signal SAD disappears, the input to the NAND gate 360 goes to a logical one. During the bit time BCD of the digit time DCG, the NAND gate 360 is enabled, and the A.C. gate 361 thus becomes enabled. Consequently, on the next bit clock pulse $C_o$, the address select flip-flop ASF is reset.

It will thus be seen that the address select flip-flop ASF is in its set condition for precisely one word time. Since the address select flip-flop ASF is set during the fourth bit time BCD of the seventh digit time DCG, it will be seen that it is set one bit time in advance of the time when the static and dynamic data recorded on the drum 90 for the selected machine station 50 comes under the various read and write heads of the drum 90. This one bit time allows for all relay contacts to settle down.

By virtue of the disclosed gating arrangement, the operations of the address select flip-flop ASF is controlled in the first instance by the data transfer signal DTE when the system is in the DISPLAY or READOUT modes. In the ENTRY mode, the operation of the address select flip-flop ASF is controlled, in the first instance by the data enter flip-flop DEF. The stepper switch signal STA disables the address select flip-flop ASF during the time the stepper switch 286 is indexing to the next position.

The set output ASF and a reset output $\overline{ASF}$ from the address select flip-flop ASF are applied to the gated set and gated reset inputs, respectively, of a second address select flip-flop ASFC. The set and reset inputs of the address select flip-flop ASFC are clocked by the bit clock pulses $C_o$. It will thus be seen that the address select flip-flop ASFC duplicates the operation of the address select flip-flop ASF only delayed by one bit time. Consequently, the set and reset outputs ASFC and $\overline{ASFC}$ of the address select flip-flop ASFC precisely locate in time the recorded data words for the selected machine station 50.

An enter digit select driver shown in FIGURE 17 controls the entry of a word from the console 56, digit by digit. Assuming the system is in the ENTRY mode, the data enter flip-flop DEF (FIGURE 15) is set, and its set output DEF is a logical one. Once a particular machine station 50 is selected for entering data, by picking up its associated address relay 274 (FIGURE 14), the selected address signal SAD appears once each revolution as the address word corresponding to the selected machine station is read out from the drum address track 90a. The selected address signal SAD is reshaped and retimed in the synchronizing circuit 350 of FIGURE 16 to become the address select signal ASF appearing on the set output of the address select flip-flop ASF. As a consequence, the address select signal ASF appears for one full word time once each revolution of the drum 90.

Still referring to FIGURE 17, the enter digit select driver consists of a series of flip-flops EDA–EDG interconnected so as to form a counter. This counter is clocked by the address select signal ASF which is applied to the gated set and reset inputs of each of the flip-flops EDA through EDF. In the case of the flip-flop EDG, the address select signal ASF is applied only to its gated set input. The flip-flop EDG is reset from a static write flip-flop SWF (FIGURE 16) after the last digit G of a word has been entered. The set output DEF of the data enter flip-flop DEF (FIGURE 15) is applied to one input of an AND gate 370. The remaining inputs to AND gate 370 are made up of the reset outputs EDB through EDG of the flip-flops $\overline{EDB}$ through $\overline{EDG}$. To avoid unduly complicating the circuitry of FIGURE 17, the circuit connections between the reset outputs of the flip-flops to the inputs of the AND gate 370 are not specifically shown. Initially all of the flip-flops EDA through EDG are in their reset state. Consequently, their reset outputs are all logical ones. When the output DEF from the data enter flip-flop goes to a logical one, AND gate 370 goes to a logical one which enables the set input of the first flip-flop EDA of the counting chain. On the trailing edge of the first address select signal ASF, the first flip-flop EDA of the counting chain is triggered to its set condition. On the next revolution of the drum 90, after which the reappearing address select signal ASF again disappears, the flip-flop EDA is reset and the flip-flop EDB is set. It will thus be seen that the set condition of one flip-flop is transferred to the next flip-flop in the chain on each revolution of the drum 90. The reset output $\overline{EDA}$ of flip-flop EDA is connected to the input of an amplifier 272, and during the time, when the flip-flop EDA is set, the amplifier 372 generates a select digit A signal SDA. In identical fashion, the reset outputs of flip-flops EDB through EDG are connected to amplifiers 372 to develop, in sequence, select digit signals SDB through SDG during the time when their corresponding flip-flops are set.

The sequentially generated select digit signals SDA through SDG as seen in FIGURE 17 are individually applied to the wipers of an array of decimal digit switches of which three are shown in FIGURE 18 at 376, 377 and 378. Each decimal digit switch has ten contacts, one for each decimal digit. Decimal digit switch 376 is assigned to the first digit, digit A, of a word, decimal switch 377 is assigned to the second digit B of a word, and so on. Corresponding decimal contacts of all the decimal digit switches are bussed together and brought out on output lines SIA through SIL. The various digits of a data word to be entered into the system and recorded on the magnetic drum 90 are developed at the console 56 by manually setting the switch arm of the various decimal digit switches to the appropriate decimal contact. In the illustrated example of FIGURE 18, digit A is a five, digit B is an eight, and digit C is a two.

As seen from FIGURE 17, the enter digit select driver generates the select digit signal SDA which is applied to the switch arm of decimal digit switch 376. Since decimal digit switch 376 is set for the digit five, the select digit A signal SDA energizes the output line SIE. This output line SIE will remain energized for one complete revolution. After the first drum revolution, the select digit A signal SDA terminates and the select digit B signal SDB is generated. The select digit B signal SDB, being applied to the decimal digit switch 377 which is set to the digit eight, causes line SIH to be energized during the second drum revolution. For the third drum revolution, the select digit B signal SDB terminates and a select digit C signal SDC is generated and applied to the switch arm of decimal digit switch 378. As a result, the output line SIB is energized for the third revolution. The remaining four digits of the data word to be entered are developed in corresponding fashion by the select digit signals SDD through SDG applied to the remaining four decimal digit switches which have not been shown in FIGURE 18.

*Data entry*

The ten decimal output lines SIA through SIL leading from the decimal digit switches shown in FIGURE 18 are applied to a decimal to binary coded decimal (BCD)

encoder shown in FIGURE 19. The ten output lines SIA through SIL are connected in a logical ordered manner to the inputs of an array of NAND gates 380 through 384.

The output from NAND gate 380 indicates whether the first bit 1 of the digit in BCD format should be a binary one or a binary zero. The output of NAND gate 381 indicates whether the second bit 2 in the BCD format is a binary one or a binary zero. The output of NAND gate 382 indicates the logical notation of the third bit 4 while the output of NAND gate 382 indicates the logical notation of the fourth binary bit 8 of a digit. Finally, the output of NAND gate 384 determines whether the parity bit P should be a binary one or zero.

The decimal digit input lines SIA through SIL are all normally held at a logical one except for the one line energized through one of the decimal digit switches of FIGURE 18 which is a logical zero. Consequently, the outputs of all of the NAND gates 380 through 384 are a logical zero except those NAND gates to which a logical zero is applied to its input by one of the decimal output lines SIA–SIL. Any NAND gate 380 through 384 receiving a logical zero input has its output go to a logical one. The output from NAND gate 380 is gated with the bit timing signal BCE in an AND gate 385. The output from NAND gate 381 is gated with bit timing signal BCA in an AND gate 386. The output from NAND gate 382 is gated with the bit timing signal BCB in an AND gate 387. The output from NAND gate 383 is gated with the bit timing signal BCC in an AND gate 388. Finally the output from NAND gate 384 is gated with the bit timing signal BCD in a NAND gate 389. The outputs of AND gates 385 and 386 are gated together in a NOR gate 390 whose output is applied as one input to an AND gate 391. The outputs of AND gates 387 and 388 are gated together in a NOR gate 392 whose output is also applied to an input of AND gate 391. The output of NAND gate 389 constitutes the third input to AND gate 391. The output of AND gate 391 is applied to the gated reset input of a static data flip-flop SDF, and after being inverted in an inverter 393, is also applied to the gated set input of the static data flip-flop SDF. The operation of the static flip-flop SDF is clocked by bit clock pulses $C_0$ which are applied to both the gated set and reset inputs to generate the digits in serial BCD format.

To understand the operation of the decimal to binary coded decimal encoder of FIGURE 19, assume that the decimal digit to be encoded in BCD format is a one. As a result, the decimal output line SIA from the digit switches of FIGURE 18 goes to a logical zero. The output of NAND gate 380, which is the only NAND gate to which the output line SIA is applied, goes to a logical one. During the fifth bit time when bit timing signal BCE goes to a logical one, AND gate 385 is enabled and its output goes to a logical one. The output of NOR gate 390 goes to a logical zero as does the output of AND gate 391. The logical zero from AND gate 391 is applied directly to the gated reset input of the static data flip-flop SDF and disables this input. A logical zero, inverted to a logical one by the inverter 393, enables the gated set input of the static data flip-flop SDF which is then set by the next occurring bit clock pulse $C_0$. The static data flip-flop SDF is thus in its set state such that its output SDF is a logical one for the first bit time, BCA, of a digit. Since all of the remaining NAND gates 381 through 384 are developing logical zero outputs, the output from AND gate 391 is a logical one for the other bit times of digit 1. This logical one output, when inverted by the inverter 393, disables the set input of the static data flip-flop SDF and enables the gated reset input. Consequently, the static data flip-flop is reset for the next four bit times of the decimal digit 1. It will thus be seen that with the first bit a binary one and the remaining four bits, including the parity bit, a binary zero, a decimal one is expressed in the BCD format. It will be noted that the digit in BCDD format is generated by the static data flip-flop SDF repetitively, once each digit time, for as long as one of the decimal input lines SIA–SIL is energized.

An erase function, which as will be seen from FIGURE 21, is generated automatically at the end of a read out, is used to enter decimal zeros in BCD format in order to erase data previously recorded on the drum 90 and reset the accumulated piece and time counts to zero. An erase function is carried out by the generation of an erase signal EWR. In order to enter decimal zeros in BCD format, the erase signal EWR, a logical one, is applied to one input of a NAND gate 394. The other input to NAND gate 394 is the bit timing signal BCD. The output from AND gate 391 is a logical one when digits are not to be entered via the digit switches of FIGURE 18, and, as a result, the static data flip-flop SDF will remain in its reset state for the first four bit times of a digit. However, when the bit timing signal BCD goes to a logical one, the output from NAND gate 394 goes to a logical zero which, when inverted in the inverter 393, enables the gated set input of the static data flip-flop SDF. Consequently, on the next bit clock pulse $C_0$, which will occur at the beginning of the fifth bit time of a digit, the static data flip-flop SDF is set to develop the binary one parity bit required when generating a decimal zero in serial BCD format. It will thus be seen that the decimal zeros are generated in serial BCD format for the erase function without requiring a digit switch such as shown in FIGURE 18.

An output CID is taken from the output of the inverter 393 for application to the piece and time count update logic circuits 66 and 70 (FIGURES 2A and 2B) when it is desired to correct piece or time count words from the console 56, the corrected piece and time count words being entered digit by digit using decimal digit switches such as shown in FIGURE 18 and the BCD encoder in FIGURE 19.

As was noted, the static data flip-flop SDF repeatedly generates a particular digit in BCD format every digit time. This will continue for one revolution of the drum 90 until the enter digit select driver (FIGURE 17) terminates the one select digit signal SDA through SDG and generates the next in sequence. The set output SDF and the reset output $\overline{SDF}$ of the static data flip-flop SDF are fed to the read/write amplifier 104 (FIGURE 2A) in order to record the individual binary bits of the digit in one of the static data tracks on the drum 90 in serial BCD format. It now remains to enable the read/write amplifier at the proper time so that the digit generated by the static data flip-flop SDF is recorded in the proper digit slot and in the proper word slot corresponding to the selected machine station. A write enable circuit, indicated generally at 400, in FIGURE 16, performs this function. It finally remains then to select which of the static data tracks the digits are to be recorded. This function is performed by the track select circuit of FIGURES 20 and 21.

The write enable circuit 400 of FIGURE 16 will be considered first. The enter digit signal EDA through EDG (FIGURE 17) are gated with digit timing signals DCA through DCG in order to control the condition of a static write flip-flop SWF. The reset output $\overline{SWF}$ of the static write flip-flop SWF is applied to one input of an AND gate 416 to develop a logical zero static write gate signal SWG to enable the write amplifier circuit 104 (FIGURE 2A) during the appropriate digit time as determined by the time during which the flip-flop SWF is set.

To this end, the enter digit signal EDA is gated with the digit timing signal DCG in an AND gate 401, and the enter digit signal EDB is gated with the digit timing signal DCA in an AND gate 402. The outputs of AND gates 401 and 402 are gated in a NOR gate 403 whose output is applied as one input to an AND gate 404. The enter digit EDC is gated with the digit timing signal DCB in an AND gate 405, and enter digit signal EDD is gated with the digit timing signal DCC in an AND gate 406. The outputs of AND gates 405 and 406 are gated in a NOR gate 407, whose output is applied to a second input of AND gate 404. Enter digit signal EDE is gated with digit timing signal DCD in an AND gate 408, and enter digit signal EDF is gated with digit timing signal DCE in an AND gate 409. The outputs of AND gates 408 and 409 are gated in a NOR gate 410 whose output is applied to an input of AND gate 404. Finally, enter digit signal EDG is gated with digit timing signal DCF in a NAND gate 411 whose output is applied as the fourth input to the AND gate 404. The output of AND gate 404 is inverted in an inverter 412 and applied to the gated set input of the static write flip-flop SWF.

The address select signal ASF generated by the address select flip-flop ASF in the synchronizing circuit 350 is applied to the gated set input of the static write flip-flop SWF to insure that this flip-flop operates only during the word time corresponding to the selected machine station 50 for which the static data is to be recorded on the drum 90. Operation of the static write flip-flop SWF is clocked by digit clock pulses $\overline{DC}$.

It will be noted from the circuitry thus far described, that the enter digit signal for a particular digit is gated with a digit timing signal corresponding to the immediately preceding digit in the digit order making a word. Specifically, it will be seen that the enter digit signal EDA is gated with the digit timing signal DCG, which is the digit time immediately preceding the time allotted to the first digit A of a word time. As will be recalled from the description of the enter digit select driver of FIGURE 17, the enter digit signals EDA through EDG are generated sequentially with each lasting for the time duration of one full drum spin. Assuming that the enter digit signal EDA is being generated by the enter digit select driver circuit, the output of AND gate 401 will go to a logical one for the seventh digit time when digit timing signal DCG is also a logical one. The output from NOR gate 403 then goes to a logical zero as does the output of AND gate 404. The logical zero output of AND gate 404 is inverted in inverter 412 to enable the gated set input of the static write flip-flop SWF. Consequently, the static write flip-flop SWF is partially enabled fully one digit time in advance of the time when a digit is to be recorded on a static data track of the drum 90. The address select signal ASF goes to a logical one to fully enable the gated set input of the static write flip-flop SWF one bit time in advance of the time when a digit is to be recorded. The static write flip-flop SWF is then triggered to its set condition by the digit clock pulse $\overline{DC}$ one bit time later or precisely at the beginning of the digit time when recording of the digit on the drum is to be accomplished. At the end of the digit time, the static write flip-flop SWF is reset by the next digit clock pulse $\overline{DC}$. Consequently, the static write flip-flop is set, and its reset output $\overline{SWF}$ is a logical zero to develop the requisite logical zero static write gate signal SWG effective to enable the write amplifier circuitry 104 for the first digit time so that the static data flip-flop SDF (FIGURE 19) writes the first digit of a static data word on the drum precisely in the first digit slot of the word slot corresponding to the selected machine station 50.

In the next revolution of the drum, the enter signal EDB is a logical one and AND gate 402 is enabled by the digit timing signal DCA. The static write flip-flop SWF is then triggered to its set condition for the second digit time of the selected address time determined by address select signal ASF to again develop the logical zero static write gate signal SWG effective to enable the write amplifier circuit 104 in recording the second digit of a static data word on the drum 90 as generated by the static data flip-flop SDF of FIGURE 19. The above-described operation repeats until after seven spins of the drum 90, the entire static data word is recorded on the drum.

If it is desired to erase selected static data words already recorded in a static data track on the drum 90, a static erase flip-flop SEF is used to control the generation of the static write gate signal SWG to enable the write amplifier circuit 104. As seen in FIGURE 16, the address select signal ASF is also applied to one input of AND gate 414. The erase signal EWR (FIGURE 21) is applied to the other input of AND gate 414 whose output is then applied to the gated set input of the static erase flip-flop SEF. The delayed address select signal $\overline{ASFC}$ is also applied to the gated set input of the static erase flip-flop SEF while the delayed address select signal ASFC is applied to the gated reset input. For an erase function, the erase signal EWR goes to a logical one and the AND gate 414 is enabled by the address select signal ASF to in turn enable the gated set input of the static erase flip-flop SEF. On the leading edge of the delayed address select signal $\overline{ASFC}$, appearing one bit time later, static erase flip-flop ESF is set. This flip-flop is then reset by the trailing edge of the address select signal ASFC. The reset output $\overline{SEF}$ of the static erase flip-flop SEF is applied to the other input of the AND gate 416 to generate the static write gate signal SWG for a full word time as determined by the address select signal ASFC. The signal SWG, being a logical zero, enables the write amplifier circuit 104 permitting the static data flip-flop SDF (FIGURE 19) to record decimal zeros in the selected word slot of the selected machine station 50, and thereby erase the word previously recorded in that word slot.

Track select

Having described the circuitry used to generate and record static data from the console 56, the track select circuit for selecting the particular track on the drum 90 in which data words entered by the console are to be recorded is shown in FIGURES 20 and 21. It will be appreciated that the term "track select" is synonymous with "word select." The track select circuit, indicated generally at 420 in FIGURES 20 and 21, is completed by placing FIGURE 21 to the right of FIGURE 20 as shown in FIGURE 20A. The track select circuit includes flip-flops EWA through EWE and EWR interconnected to form a counter. The set outputs EWA through EWE of the flip-flops EWA through EWE are used as word select signals. The set outputs EWA through EWC are applied to the read/write amplifier 104 of FIGURE 2A to select either the employee number track 90g, the job number track 90f, or the machine number track 90e. The set outputs EWA through EWE of flip-flops EWA through EWE are used in the message assembly register 76 to assemble a message as will be seen later. Moreover, set output EWD is used in the time count update logic 70 to enter time count words from the console while set output EWE is used in the piece count update logic 66 to enter piece words from the console. The flip-flop EWR, which is the final stage of the counter, is used to automatically generate the erase signal EWR on completion of a readout function for each machine station 50.

The first flip-flop EWA in the counter may be set to select the employee number track 90g on the drum 90 by the output from an A.C. gate 424. The A.C. gate 424 is enabled by a word A select signal WAS generated at the console and flip-flop EWA is set immediately due to the fact that its gating input is permanently grounded. Similarly, word select signals WBS through WES enable A.C. gates 424 to individually set flip-flops EWB through EWE, respectively. In this manner, the flip-flops EWA through EWE are set on an individual basis by signals WAS through WES to select appropriate tracks on the drum 90. This procedure is used when displaying selected words of selected machine stations 50.

The set output DEF of the data enter flip-flop DEF (FIGURE 15) is applied to permanently enable A.C. gates 426. The outputs of A.C. gates 426 are applied to the direct reset inputs of flip-flops EWA through EWE. It will thus be seen that these flip-flops are reset when the set output DEF of the data enter flip-flop DEF goes from a logical one to logical zero. It will be recalled that the data enter flip-flop DEF is reset after entry of the last digit of a word, whereupon all the flip-flops EWA–EWE receive resetting inputs from A.C. gates 426.

The reset output $\overline{DRF}$ of the data read flip-flop (FIGURE 15) is applied to the gated set input of flip-flop EWA. In the READOUT mode, the flip-flop EWA is set to select the employee number track when the data read flip-flop sets. The set output DEF of the data enter flip-flop DEF is gated with the set output EAF of the enter all flip-flop EAF (FIGURE 15) in a NAND gate 428. The output of NAND gate 428 is gated with the enter employee signal EES and the enter job signal EJS (FIGURE 15) in an AND gate 430. The output of AND gate 430 is applied to the gated set input of flip-flop EWA. Flip-flop EWA is set from AND gate 430 for the multiple ENTRY mode.

The operation of the flip-flops EWA through EWE and EWR as a counter is clocked by word advance clock pulses WAC generated by a word advance clock pulse generator, indicated generally at 432 in FIGURE 21A. The word advance clock pulse generator 432 includes a one-shot multivibrator WAC which is triggered to generate word advance clock pulses $\overline{WAC}$. An inverter 433 connected to the output of the one-shot multivibrator WAC generates the complement of the word advance clock pulses $\overline{WAC}$ or WAC. To trigger the one-shot multivibrator WAC, enter digit signal EDG (FIGURE 17) is gated with the set output of the job enter flip-flop JEF (FIGURE 15) in an AND gate 434. The address select signal ASF (FIGURE 16) is gated with the set output of the data read flip-flop DRF (FIGURE 15) in an AND gate 435. The outputs of AND gates 434 and 435 are gated in a NOR gate 436, inverted in an inverter 437, and applied to the input of the one-shot multivibrator WAC.

The word advance clock pulses WAC and $\overline{WAC}$ are generated during a readout operation under the control of the set output DRF of the data read flip-flop DRF. As was previously noted in connection with the READOUT mode, the individual words corresponding to a selected machine station 50 are read out in sequence into the message assembly register 76 for assembly into a message. Consequently, once the flip-flop EWA is set by the data read flip-flop DRF the word advance clock pulses WAC are used to set the flip-flops EWB–EWE and EWR in sequence, so that the job number, the machine number, the time count word, and the piece count word will be read out in that order after the employee number has been read out. Once all of the static and dynamic data words for a selected machine station 50 have been read out, it is desired to erase the employee number since multiple readout is typically performed at the end of a word shift. Consequently, after the piece count word has been read out, the flip-flop EWR is triggered to its set condition by a word advance clock pulse WAC to generate an erase function EWR. As seen in FIGURE 20, the erase signal EWR is gated with the reset output EWA in a NAND gate 439 to develop a signal TSA which is applied to the read/write amplifier 104 to select the employee number track 90g. The employee number of the selected machine station 50 which has just been read out is erased by recording decimal zeros as generated by the static data flip-flop SDF (FIGURE 19) and as enabled by the static erase flip-flop SEF (FIGURE 16). The erase signal EWR is also applied to the piece and time count logic to erase piece and time count words which have just been read out. The reset output $\overline{DRF}$, being a logical zero, at this time prevents the flip-flop EWA from being set until the data read flip-flop DRF resets to cause the next machine station to be selected by the stepping switch 286, whereupon the flip-flop DRF again sets to, in turn, set flip-flop EWA.

Referring to FIGURE 21A, it will be seen that the address select signal ASF enables the AND gate 435 once every revolution of the drum 90. Consequently the word advance clock pulses WAC and $\overline{WAC}$ are generated for every revolution of the drum.

As was previously noted in connection with the description of the control panel in FIGURE 15, in most situations it is generally desirable to enter both the employee number and the job number for a selected machine station. To achieve this end, the set output JEF of the job enter flip-flop JEF is gated with the enter digit signal EDG in AND gate 434. Consequently, when the final digit, digit G, of the employee number has been entered in the employee number track 90g as selected by the fact that the flip-flop EWA is set, AND gate 434 is enabled so that the one-shot multivibrator WAC is triggered to generate a word advance clock pulse WAC. Accordingly, flip-flop EWA is reset, and flip-flop EWB is set to select the job number track 90f on the drum wherein the job number for the selected machine station 50 is entered from the console 56 on the next spin of the drum 90. The data enter flip-flop DEF resets causing flip-flop EWB to be reset. The stepper switch 286 then operates to select the next machine station, and the operation repeats.

*Piece count update logic and memory*

The piece count word, like all the other words processed by the system, consists of seven digits. The last six digits of a piece count word comprise the accumulated piece count indicating the number of pieces produced at a particular machine station 50. The first digit of a piece count word is a flag digit which, as recorded on the drum, indicates the most recent condition of the corresponding piece count relay 296 in the switching logic circuit 92 (FIGURE 14). Consequently, the flag digit of a piece count word as recorded on the drum indicates that, when last interrogated, the corresponding machine has either made a piece or is in the process of making a piece. The piece count inputs PCI for the plurality of machine stations 50 appear serially on output line 64 in the same sequence by which the machine stations are interrogated. The piece count inputs PCI indicate when a piece has been made and thus when to augment or update the accumulated piece count portion of the recorded piece count word corresponding to the machine station where a piece was made. The piece count inputs PCI are also used to control the recording of the appropriate flag digit in the piece count word slot in track 90c to indicate the current production status of the corresponding machine station 50.

The capacity of the piece count memory must be sufficient to hold a piece count word for each of the plurality of machine stations 50. In the illustrated example of 100 machine stations, the piece count memory must then hold 100 piece count words, or 3500 bits. The drum 90 in the illustrated embodiment can hold a total of 3500 bits in a single circumferential track. According to the illustrated invention, the piece count memory consists of 3500 recorded bits held in track 93 on the magnetic drum 90 (FIGURE 2A). The individual bits of the piece count words read from track 93 and recorded on track 95 are then read out serially by the read head 117 and applied as inputs PCD and $\overline{PCD}$ to a 5 bit shift register 116 shown in FIGURE 23. This shift register corresponds to the shift register 116 shown in FIGURE 2A. The bits of the piece count words are shifted through the 5 bit shift register 116 and appear as outputs PAA and $\overline{PAA}$ five bit times later. The outputs PAA and $\overline{PAA}$ are applied to a piece count rewrite flip-flop PRW seen in FIGURE 24. Always in the case of the flag digits and only when the piece count word is to be updated, the piece count rewrite flip-flop outputs PRW and $\overline{PRW}$ energize the write head 128 in track 93 to record the bits in the same bit slots as occupied by the corresponding bits read from track 93 by read head 114. It will thus be seen that, without the shift register track 95, the read head 114 would have to be spaced 5 bit slots ahead of the write head 128. It is because of the inability to electrically isolate and physically accommodate a read and write head so closely spaced that the shift register track 95 is sued to appropriately delay the application of the piece count words read from track 93 by head 114 to the shift register 116. Accordingly, the piece count words are recorded in the track 93 by write head 128 and at some time later, for example, 2000 bit times, read from this track and immediately recorded on a track 95 by write head 115. Then, 1495 bit times later, the piece count words are read from track 95 by the read head 117. It will thus be seen that the total number of bits recorded in the two tracks, as serially connected equals 3495. Thus, the four heads used in the piece count track section 90c can be conveniently spaced.

Referring now to FIGURE 23, the 5 bit shift register 116 is made up of 5 flip-flops PAA through PAE. The individual bits of the piece count words read serially from track 95 are applied as inputs PCD and $\overline{PCD}$ to the gated set and reset inputs of the first flip-flop PAE of the shift register 116. The inputs PCD and $\overline{PCD}$ are shifted through the flip-flop stages by the bit clock pulses $C_o$ and appear 5 bit times later at the set and reset outputs PAA and $\overline{PAA}$, respectively, of the last flip-flop PAA of the shift register 116. As the piece count words are being shifted through shift register 116 bit by bit, the individual digits of the piece count words are checked for parity by a parity check circuit indicated generally at 501.

The individual bits PCD of the piece count words as read serially from the drum 90 are also applied to the gated set and reset inputs of a piece count parity check flip-flop PPC. The operation of the piece count parity check flip-flop PPC is clocked by the bit clock pulses $C_o$ applied to its gated set and reset inputs. The piece count parity check flip-flop PPC is triggered to its set condition by the output of an A.C. gate 502. Bit clock pulses $C_o$ are gated with bit timing signal BCA in a NAND gate 504 whose output is connected to the gating input of A.C. gate 502. Consequently, the piece count parity check flip-flop PPC is triggered to its set condition at the beginning of each digit time by the timing signals $C_o$ and BCA. If the piece count parity check flip-flop PPC, in responding to the individual binary one bits of a digit, ends up in its reset state at the end of a digit time, parity is correct. If, however, at the end of a digit time, the piece count parity check flip-flop PPC ends up in its set condition, parity is incorrect since this indicates that the number of binary one bits in the digit is even. The set output PPC of the piece count parity check flip-flop PPC is applied back to the enabling input of the A.C. gate 502. If parity is correct, the set output PPC is a logical zero which enables the A.C. gate 502 permitting the piece count parity check flip-flop PPC to be set at the beginning of the next digit time. If the piece count parity check flip-flop PPC ends up in its set state at the end of a digit time, its set output PPC is a logical one to inhibit the needless generation of a triggering input at the beginning of the next digit time inasmuch as the flip-flop PPC is already set.

The set output PPC of the piece count parity check flip-flop PPC is gated with bit clock pulses $\overline{C_o}$ and bit timing signal BCA in a NAND gate 506. If at the end of a digit time, the piece count parity check flip-flop PPC is in its set condition indicating a parity error, NAND gate 504 is enabled at the very beginning of the next bit time to trigger a piece count parity error flip-flop PPE to its set condition. The piece count parity error flip-flop PPE is reset at the end of a word time by the digit timing signal DCG. It will be seen that the set and reset outputs PPE and $\overline{PPE}$ of the piece count parity error flip-flop are used to inhibit the piece count logic circuitry in the event a parity error is detected by the parity check circuit 501.

Referring now to FIGURE 22, the piece count inputs PCI appearing serially on the output line 64 from the switching logic circuit 92 of FIGURE 14 are applied through an inverter 510 to the gated set input of a piece start flip-flop PSF, and through inverter 510 and a second inverter 512 to the gated reset input of flip-flop PSF. The circuit of FIGURE 22, indicated generally at 112, is the update circuit 112 of FIGURE 2A. Referring momentarily to FIGURE 14, the contacts 276a of the piece count relay 276 open when a piece has been made by the machine station 50 associated therewith. Consequently, the piece count input PCI appearing on line 64 is a logical one indicating that the machine then being interrogated has made a piece. On the other hand, if the contacts 276a of the piece count relay 276 are closed when interrogated, the logical zero on the scanner line is communicated through the closed piece count relay contacts 276a to the output line 64 causing the piece count input PCI to be a logical zero which indicates that particular machine station 50 is in the process of making a piece.

The piece start flip-flop PSF in FIGURE 22 is clocked by the digit timing signal DCG and either sets or resets this flip-flop for the beginning of the next word time depending on the piece count input PCI. It will be recalled from the description of the address logic circuit 52 (FIGURE 2C), that the address word DAD for a particular machine station 50 is read out during the word time immediately preceding the word time alloted to the particular machine station 50 called for by the address word. Consequently, since the piece count input PCI for a particular machine station 50 generated in response to the interrogation of that machine station is precipitated by the readout of the corresponding address word, this input occurs at a time prior to the beginning of the word time allotted to that machine station. Thus, the piece start flip-flop PSF can be triggered to its set or reset state according to the piece count input PCI at the end of a word time by the digit timing signal DCG. It will be seen that if the piece count input PCI is a logical zero to indicate that a piece is being made at the corresponding machine station 50, the inverter 510 will apply in enabling input to the gated set input of the piece start flip-flop PSF and at the end of a word time, the piece start flip-flop PSF will be triggered to its set condition. The set output PSF of the piece start flip-flop PSF is applied to one input of an AND gate 514. The other input to AND gate 514 are the bit timing signals $\overline{BCB}$ and $\overline{BCD}$. Thus, with the piece start flip-flop PSF set, the output of AND gate 514, designated piece in progress PPI, is a logical one during the first, third and fifth bit time of a digit and a logical zero during the second and fourth bit times as controlled by the bit timing signals $\overline{BCB}$ and $\overline{BCD}$. As a result, the piece and progress output PIP from AND gate 514 generates a decimal 5 in binary coded decimal format which is the flag digit indicating that a piece is in progress at a particular machine station 50. If flip-flop PSF is set, the output PIP develops a decimal 0 flag digit.

If the piece count input PCI is a logical one indicating that a piece has been made at the corresponding machine station 50, the piece start flip-flop PSF is triggered to its reset state at the end of a word time by the digit timing signal DCG. This reset state of the piece start flip-flop PSF at the beginning of the next word time indicates by its set output PSF being a logical one that a piece has been made at the corresponding machine station 50.

Still referring to FIGURE 22, at the same time that the piece start flip-flop PSF is being triggered to its set or reset condition under the control of the piece count input signal PCI, a piece made flip-flop PMF is responding to the outputs PAA and $\overline{PAA}$ from the last flip-flop PAA of the five bit shift register 116 in FIGURE 23. It will be recalled that the piece count words are read from the drum by read head 117 and shifted through the shift register 116. At this time, the shift register 116 contains the flag digit corresponding the same machine station to which the piece count input PCI corresponds. This flag digit was recorded in the piece count track 93 on the drum 90 according to what the piece count input PCI was for the same machine station during the last spin of the drum 90. If a piece was made by that machine during the last spin of the drum, the flag digit held in the shift register 116 is a decimal zero. On the other hand, if a piece was in progress during the last spin of the drum, the flag digit in the shift register 116 is a decimal 5 in serial BCD format. If the flag digit is a decimal 5 indicating a piece in progress during the last spin of the drum 90, the least significant bit held in the flip-flop PAA of the shift register 116 is a binary one. Consequently, the piece made flip-flop PMF is triggered to its set condition by the next occurring bit clock pulse $C_o$. The set output PMF being a logical one is applied as an enabling input to a NAND gate 516. If the present piece count input PCI for the same machine station now indicates that a piece has been made, the piece start flip-flop PSF will at this time be reset to apply a logical one reset output PSF to the NAND gate 516. This condition, wherein a piece was in progress and has now been made, is the condition upon which the accumulated piece count portion of the piece count word must be updated.

The NAND gate 516 is further enabled by digit timing signal DCA, bit timing signal BCD, delay bit clock pulses $\overline{C_oD}$ and the enter piece count word signal $\overline{EWE}$ generated by the track select circuit of FIGURE 21. The enter word signal $\overline{EWE}$ enables NAND gate 516 during normal operation but serves to disable it when a piece count word is to be entered from the console 56 or read out into the message assembly register 76 (FIGURE 2B). Assuming normal operation, the NAND gate 516 is totally enabled during the fourth bit time DCB of the first digit time DCA. At this time, the output of NAND gate 516 goes from a logical one to a logical zero to trigger a piece count update flip-flop PCU to its set condition. The setting of flip-flop PCU indicates that a piece has been made and the piece count portion of the piece count word following the flag digit must be updated. Piece count update flip-flop PCU is always reset at the end of each word time by the digit timing signal DCG.

Referring now to FIGURE 25, a bit and digit carry generator indicated generally at 120 in FIGURE 25 functions to augment by adding a decimal one to the accumulated piece count portion of the piece count word each time a piece has been made. This circuit is the piece count adder 120 of FIGURE 2A. As seen in FIGURE 25, the set output PCU of the piece count update flip-flop PCU of FIGURE 22 is gated with the digit timing signal DCA and the bit timing signal BCD in a NAND gate 522. The output of NAND gate 522 is applied as one input to an AND gate 524. The output of AND gate 524 is applied directly to the gated reset input of a piece count bit carry flip-flop PBC and inverted in an inverter 526 for application to the gated set input of the bit carry flip-flop PBC. NAND gate 522 is enabled when an update condition is indicated during the last bit time BCE of the first digit time DCA to enable the bit carry flip-flop PBC to set by the next occurring bit clock pulse $C_o$.

As a result, the bit carry flip-flop PBC develops a logical one on its set output PBC at the beginning of the second digit time DCB, which is the time of the least significant digit of the accumulated piece count portion of the piece count word. This set output PBC of the bit carry flip-flop PBC is applied as one input to an AND gate 528. The other inputs to AND gate 528 are comprised of the set outputs PAB and PAE of flip-flops PAB and PAE in the shift register 116 (FIGURE 23). These set outputs PAB and PAE are also applied as separate inputs to an AND gate 530 together with the piece count update signal PCU generated by flip-flop PCU (FIGURE 22) and digit timing signal DCA. The outputs of AND gates 528 and 530 are gated together in a NOR gate 532. The output of NOR gate 532 is applied directly to the gated reset input of a piece count digit carry flip-flop PDC and through an inverter 534 to the gated set input of the same flip-flop. The operation of the digit carry flip-flop PDC is clocked by the bit timing signal BCE applied to its gated set and reset inputs. The digit carry flip-flop PDC when set indicates that a digit carry operation must be performed in order to update the piece count word. As will be readily appreciated, a digit carry operation is required when adding a decimal one to a decimal nine.

Returning for a moment to FIGURE 23, at the beginning of the fifth bit time of any digit time when the digit carry flip-flop PDC (FIGURE 25) is triggered to its set or reset state by the bit timing signal BCE, the flip-flop PAA of the shift register 116 contains the parity bit for the preceding digit. As a result, flip-flop PAB contains the least significant bit and the flip-flop PAA the most significant bit of the next digit. According to the BCD format, if the digit contained in the shift register 116 is a BCD nine, flip-flops PAB and PAE will contain a logical one bit and, as a consequence, their set outputs PAB and PAE will be logical ones.

Returning to FIGURE 25, if an update condition is indicated by the output PCU from the piece count update flip-flop PCU and the least significant digit of the piece count word contained in the shift register 116 (FIGURE 23) is a BCD 9, AND gate 530 is enabled and the digit carry flip-flop PDC is set at the end of the first digit time by the bit timing signal BCE to generate a digit carry function. The set output PDC of the digit carry flip-flop PDC is fed back through an inverter 536 to a second input of the AND gate 524. Consequently, the bit carry flip-flop PDC is triggered to its set condition so as to perform a bit carry operation on the digit following the decimal nine BCD digit. In the situation where there are a succession of decimal nine digits and an update function is called for, AND gate 528 is enabled in order that the digit carry flip-flop PDC remains set to thereby generate a digit carry function for each of the consecutively occurring decimal nine digits.

Finally, the set output PBC of the bit carry flip-flop PBC is gated with the set output PAA of the last flip-flop stage PAA of the shift register 116 (FIGURE 23) in a NAND gate 538. Thus, if a bit carry operation is required, as indicated by the bit carry flip-flop PDC being set, and the bit read from the shift register 116 is a logical one, NAND gate 538 is enabled so as to keep the bit carry flip-flop PDC in its set condition. It will thus be seen that the bit carry function is carried out as long as the bits read from the shift register 116 are logical ones. When a logical zero is read from the shift register 116, a bit carry function is no longer needed and the bit carry flip-flop PBC is reset.

Referring now to FIGURE 24, a piece count rewrite flip-flop PRW, as previously noted, controls the energization of the write head 128 associated with the piece count track to rewrite the accumulated piece count in updated form back on the piece count track 93 in the same word slot that the corresponding word occupied in track 93 when read out by read head 114 (FIGURE 2A). Thus, the piece count rewrite flip-flop PRW corresponds to the rewrite circuit 124 of FIGURE 2A. A piece count write enable flip-flop PWE, corresponding to the write enable circuit 118 of FIGURE 2A, operates to enable the write circuitry 126 associated with the write head 128 to respond to the updated piece count word generated by the piece count rewrite flip-flop PRW.

Accordingly, the piece count update signal PCU generated by the piece count update flip-flop PCU (FIGURE 22) is gated with the reset output $\overline{PPE}$ of a piece count parity error flip-flop PPE (FIGURE 23) in a NAND gate 540. The output of NAND gate 540 is applied as one input to an AND gate 542. The output of AND gate 542 is applied directly to the gated reset input of the write enable flip-flop PWE, and through an inverter 544 to the gated set input of the same flip-flop. The write enable flip-flop PWE is clocked by bit clock pulses $C_o$ applied to its gated set and reset inputs. If a piece has been made, the piece count update signal PCU is a logical one and if there is no parity error, NAND gate 540 is enabled to, in turn, enable the write enable flip-flop PWE through AND gate 542 and inverter 544 to be set by a bit clock pulse $C_o$. It will be seen that even if a piece count update condition prevails, the write enable flip-flop PWE will not be set to enable the piece count write circuit 126 (FIGURE 2A) if a parity error has been detected in a digit of the piece count word. In so doing, the piece count word already recorded on the drum 90 is left unaltered. The digit timing signal DCA is applied through an inverter 546 to a second input of the AND gate 542 in order that the write enable flip-flop PWE will be triggered to its set condition during the first digit time of every piece count word. It will be recalled that the first digit of each piece count word is the flag digit. Thus, the flag digit is always rewritten on the drum by the rewrite flip-flop PRW directly over the old flag digit of every piece count word whether or not a piece has been made.

As noted in connection with the description of the console 56, under certain circumstances it may be required to enter a piece count word from the console. To accomplish this, the enter piece count word signal EWE generated in the track select circuit of FIGURE 21, the address select signal ASFC generated in the synchronizing circuit 350 of FIGURE 16, and the write enabled gate signal WEG generated in the circuit 400 of FIGURE 16 are gated together in a NAND gate 548. NAND gate 548 is enabled to, in turn, enable the write enable flip-flop PWE to be set for entry of a piece count word from the console 56, digit by digit. The write enable gate signal WEG enables the NAND gate 548 for the appropriate digit time and the address select signal ASFC insures that the NAND gate 548 is enabled for the proper word time allotted to the machine station 50 selected for entry. The enter piece count word signal EWE serves to determine that the particular word to be entered from the console 56 is a piece count word rather than a time count word or some other static data word. Moreover, the erase signal EWR is gated with the address select signal ASFC in a NAND gate 550 so as to set the write enable flip-flop PWE when the piece count word for a selected machine station 50 is to be erased.

In order to control the operation of the rewrite flip-flop PRW during the times when entry of a piece count word into the piece count track is to be effected from the console 56, the set output DEF of the data enter flip-flop DEF (FIGURE 15) is gated with the enter piece count word signal EWE and the address select signal ASFC in an AND gate 552. The output of AND gate 552 is applied to one input of a NOR gate 554 whose output in turn is applied to one input of a NAND gate 556. To control the erasing of a piece count word recorded in the piece count track 90c, the erase signal EWR is gated with the address select signal ASFC in an AND gate 558 whose output is applied to the other input of NOR gate 554.

The other inputs to NAND gate 556 are the digit timing signal DCA and the piece in progress signal PIP appearing at the output of AND gate 514 (FIGURE 22). The output of NAND gate 556 is applied as one input to an AND gate 560. The output of AND gate 560 is applied directly to the gated reset input of the rewrite flip-flop PRW and through an inverter 562 to the gated set input of the same flip-flop. The operation of the rewrite flip-flop PRW is clocked by bit clock pulses $C_o$ applied to both its gated set and reset inputs.

Assuming normal automatic operation wherein the piece count is being accumulated under the control of the piece count input signal PCI and thus, entry is not to be affected from the console 56, the output from NOR 554 is a logical one to enable the NAND 556. As a result, during the first digit time of each piece count word, the piece in progress signal, which is the new flag digit, conditions to rewrite flip-flop PRW accordingly so as to record the new flag digit for a particular piece count word over the old flag digit of the same word regardless of whether or not the flag digit has changed. If however, a piece count word is to be entered from the console, the output of NOR gate 554 goes to a logical zero inhibiting NAND gate 556, and in such case a flag digit is not written.

For entry of a piece count word from the console, the console input digits CID, generated in FIGURE 19, are gated with the enter piece count word signal EWE and the address select signal ASFC in a NAND gate 564. It will be seen, that NAND gate 564 will be enabled during the selected address time if the entry from the console 56 is a piece count word. Accordingly, the console input digits CID are passed through NAND gate 564 and AND gate 560 to condition the rewrite flip-flop PRW to record on the drum 90 each digit of the piece count word entered from the console. One digit will be recorded on each revolution of the drum 90.

A NAND gate 566 receives as inputs the output from NOR gate 554, the set output of the bit carry flip-flop PBC (FIGURE 25), the output $\overline{PAA}$ from the shift register 116 (FIGURE 23), the reset output $\overline{PDC}$ from the digit carry flip-flop PDC (FIGURE 25), the digit timing signal $\overline{DCA}$ and the bit timing signal $\overline{BCE}$. The output of NAND gate 566 is applied as a second input to the AND gate 560. In considering the operation of NAND gate 566, it will be seen that it is completely disabled when the output from NOR gate 554 is a logical zero indicating that a piece count word is to be entered from the console 56. NAND gate 566 is also disabled during the first digit time by digit timing signal $\overline{DCA}$ since that is the time when the output of the NAND gate 556 controls the writing of the flag digit on the piece count track. NAND gate 566 is further disabled during every fifth bit time by bit timing signal $\overline{BCE}$ since that is the time for the parity bit of each piece count digit. The parity bit is generated separately in a manner to be described. Of the remaining inputs to the NAND gate 566, the digit carry signal $\overline{PDC}$ is a logical zero when the digit carry flip-flop PDC is in its set state to indicate that a digit carry function is to be performed. In effect, this logical zero digit carry signal $\overline{PDC}$ disables the NAND gate 566. As a result, the rewrite flip-flop PRW remains reset to write a decimal zero in BCD format over the decimal nine recorded in the piece count track. It will be seen that this effectively accomplishes the digit carry function. Once the digit carry signal $\overline{PDC}$ goes to a logical one indicating that a digit carry function is no longer to be performed, control of the NAND gate 566 is transferred to its inputs PBC and $\overline{PAA}$. As long as the bit carry signal PBC is a logical one, indicating that a bit carry function is to be effected, and the particular bit to be operated on, which is the input $\overline{PAA}$ from the shift register 116, is a logical zero, NAND gate 566 is fully enabled and the bit is recorded on the drum as a logical one. It will thus be seen that in accordance with addition in the binary system, a zero binary bit is changed to a one in order to add a decimal one to the binary coded digit. If the binary bit in the last flip-flop PAA is a binary one, the input $\overline{PAA}$ to the NAND gate 566 is a logical zero. Consequently, NAND gate 566 is disabled and a binary zero bit is recorded in its place on the drum 90. It will thus be seen that as long as there is a bit carry, each binary one bit read from the shift register 116 is changed to a binary zero bit and so recorded. This will continue through the bits of a digit until finally a zero binary bit is read from the shift register, whereupon NAND gate 566 causes the recording of a binary one on the drum 90 in place of the binary zero. As a consequence, NAND gate 566 controls the recording of updated piece count digits on the drum 90.

A NAND gate 568 receives as separate inputs the output from NOR gate 554, the digit timing signal $\overline{DCA}$, the digit carry signal $\overline{PDC}$, the output PAA from the shift register 116, the bit carry signal $\overline{PBC}$ and the bit timing signal $\overline{BCE}$. As in the case of NAND gate 566, the output from NOR gate 554 disables NAND gate 568 when digits are to be entered from the console 56. Digit timing signal $\overline{DCA}$ disables NAND gate 568 during the flag digit time and bit timing signal BCD disables NAND gate 568 during the parity bit time. It will be seen that PPG from parity generator flip-flop PPG is applied as one input to a NAND gate 574 in FIGURE 24.

The other input to NAND gate 574 is comprised of the bit timing signal BCE occurring during the parity bit time of each digit. It will thus be seen that if the parity generator flip-flop PPG ends up in its set state at the end of the first four bit times of a digit, which occurs when the number of binary one bits in the digit is even, the set output PPG is a logical one. Consequently, NAND gate 574 is enabled for the parity bit time by the bit timing signal BCD and the rewrite flip-flop TRW is triggered to its set condition to write a binary one parity bit on the drum for that digit so as to provide the odd parity check. Otherwise, the flip-flop PPG is reset for an odd number of binary one bits in a digit and the NAND gate 274 is disabled. Then a binary zero parity bit is recorded on the drum 90 for that digit. The set output PPG of the parity generator flip-flop PPG of FIGURE 25 is fed back to the enabling input of A.C. gate 572 so as to disable it when the parity generator flip-flop PPG is already set at the beginning of a digit time.

To briefly review the operation of the piece count update circuit, the piece count words are recorded in specifically assigned slots in the piece count track 93 by the write head 128 (FIGURE 21). These piece count words remain in their assigned word slots in the first piece count track, and thus, throughout the operation of the system, each word slot NAND gate 568 is disabled by either or both of its inputs $\overline{PDC}$ and $\overline{PBC}$ whenever a bit or digit carry function is to be carried out. Accordingly, NAND gate 568 is enabled after the bit and digit carry functions have been carried out, at which time the output of NAND gate 568 follows its input PAA and thus the remainder of the bits of an updated piece count word are recorded on the drum 90 precisely as read out and shifted through the shift register 116 (FIGURE 23).

The output from inverter 562, which is used to enable the set input of the rewrite flip-flop PRW and indicated at PAG, is applied to the gated set and reset inputs of a piece count parity generator flip-flop PPG included in a parity generator generally indicated at 570 in FIGURE 25. The operation of the parity generator flip-flop PPG is clocked by bit clock pulses $C_0$. The parity generator flip-flop PPG is triggered to its set condition by the parity generator set pulse PGC generated in FIGURE 23 at the beginning of each digit time and gated through A.C. gate 572. The parity generator flip-flop PPG responds to the same input as the rewrite flip-flop PRW and is changed in state each time the rewrite flip-flop PRW is triggered to its set condition to write a binary one during a digit time. Consequently, at the end of the first four bit times of any digit, the parity generator flip-flop PPG will be in its reset state if the number of binary one bits recorded on the drum by the rewrite flip-flop PRW is odd and will be in its set state if the number of binary one bits is even. The set output slot in the first piece count track corresponds to a particular machine station 50. At some time later, for example 2000 bit times later, the piece count words are read from the piece count track 93 and immediately recorded in the delay line piece track 95. The piece count words recorded in their assigned word slots in the first piece count track are not erased, consequently the same piece count word is recorded in both piece count tracks. Each piece count word is read from the second piece count track by read head 117 (FIGURE 2A) five bit times in advance of the time when the same piece count word recorded in the piece count track 93 arrives at the write head 128. If this piece count word is to be updated, the update circuit operates on this word as read from the track 95 by read head 117 and, using write head 128, records it in updated form in the piece count track 93 over the piece count word as previously recorded in its unupdated form. If no piece has been made, the write circuit 126 is enabled only to write the flag digit and the piece count word is left in its assigned word slot in the piece count track 93 as recorded when last updated.

Since the piece count words are rewritten on the drum only when pieces are made, the possibility of error is substantially reduced. Using two piece count tracks, the heads can be sufficiently spaced to avoid interference. Using only one track, to provide the necessary head spacing, the shift register 116 would have to be materially extended in length beyond its disclosed five bits. Since additional drum storage capacity is inexpensive, it is far more economical to provide the second piece count track 95.

*Time count logic and memory*

The time count words for the individual machine stations 50 are processed in the time count logic circuit 70 (FIGURE 2B) in substantially the same manner as the piece count words are processed in the piece count logic circuitry described above. Each time count word is seven digits in length. The time count memory, assuming 100 machine stations, is one hundred words in length, or 3500 bits, recorded by head 146 in track 67 on the drum 90 (FIGURE 2A). The words are read by read head 132, recorded by head 133 in the delay line track 69, and then read out to the shift register 134 by head 135. The time count words, as the piece count words, are recorded on these two tracks of track section 90$d$ to overcome the problems encountered in trying to position read and write heads close together. Unlike the piece count word, the time count word does not include a flag digit. Instead, the first four digits of a time count word relate to the elapsed time count ET which is accumulated when the corresponding machine station is producing pieces. The last three digits of a time count word make up the down time count DT, accumulated when the corresponding machine station is temporarily not producing pieces.

It will be seen that the time count circuitry of FIGURE 26 corresponds quite similarly to the piece count circuitry of FIGURE 23, and operates in essentially the same manner. Specifically, the individual bits of the time count words are read in serial bit by bit fashion from the time delay track by the read head 135 (FIGURE 2A) and applied as inputs TCD and $\overline{TCD}$ to the input of the five bit shift register 134. The shift register 134 is comprised of five interconnected flip-flop stages TAA-TAE and the individual bits of the time count word are shifted through the shift register by bit clock pulses $C_0$. As the bits of the time count words are read from the drum 90, the digits of the time count words are checked for parity in a time count parity check circuit 600. A parity check flip-flop TPC is triggered to its set condition at the beginning of each digit time by the parity generator set signal PGS generated in FIGURE 23 and gated through A.C. gate 602. The parity check flip-flop TCP is changed in state by each binary one bit in a digit as read from the time count track 90$d$. If the parity check flip-flop TPC ends up in its reset state at the end of a digit, parity is correct. However, if the parity check flip-flop TPC ends up in its set state at the end of a digit parity is in error and its set output TPC gated with bit timing signal BCA and a bit clock pulses $\overline{C_o}$ in a NAND gate 604, causes a time count parity error flip-flop TPE to go to its set condition. The set and reset outputs TPE and $\overline{TPE}$ of the parity error flip-flop TPE are used to disable the time count logic in the event of a parity error. The parity error flip-flop TPE is reset at the end of each word time by the digit timing signal DCG. The set output TPC of the parity check flip-flop TPC is applied to the enabling input of the A.C. gate 602 to inhibit the parity generator set signal PGS when the parity check flip-flop TPC is already in its set condition at the beginning of a digit time.

Referring now to FIGURE 27, the elapsed time input ETI for each machine station 50 appearing serially on output line 294 from the switching logic circuit 92 (FIGURE 14) and the down time input DTI for each machine station appearing serially on output line 298 from the switching logic circuit are applied to the update circuit indicated generally at 136 (FIGURES 2B and 27). The inputs ETI and DTI were commonly referred to as the time count input TCI in FIGURE 2B. The elapsed time input ETI is applied through an inverter 508 to the gated set input of an elapsed time flip-flop ETF. The down time input DTI is applied through an inverter 510 to the gated set input of a down time flip-flop DTF. The elapsed time flip-flop ETF and the down time flip-flop DTF are reset by the trailing edge of the digit timing signal DCE, i.e., at the end of the fifth digit time. Either the elapsed time flip-flop ETF or the down time flip-flop DTF, depending upon the elapsed time input ETI and the down time input DTI, is set on the trailing edge of digit timing signal DCF or at the end of the sixth digit time. If a particular machine station is on elapsed time, its elapsed time input ETI is a logical zero and its down time input DTI is a logical one. Conversely, if the particular machine station is on down time, its down time input DTI is a logical zero, and its elapsed time input ETI is a logical one. Thus, the elapsed time flip-flop ETF is set at the end of the sixth digit time by digit timing signal DCF if the interrogated machine station 50 is on elapsed time. If the interrogated machine station is on down time, down time flip-flop DTF is set at the end of the sixth digit time. However, if the interrogated machine station is not turned on, the relay contacts 279a and 279b of the power on relay 279 are open and the elapsed time input ETI and the down time input DTI are both logical ones. In this situation, flip-flops ETF and DTF remain reset.

Inasmuch as a particular machine station 50 is interrogated during the word time preceding the word time allotted to the piece count word for that machine station, the elapsed time input ETI and the down time input DTI appear at the update circuit 136 of FIGURE 27 slightly in advance of the time when the first digit of the corresponding time count word appears in the shift register 134 of FIGURE 26. It is for this reason that the digit timing signals DCF and DCE are used in timing the operation of the elapsed time flip-flop ETF and the down time flip-flop DTF.

Assuming the particular machine station is on elapsed time, the elapsed time input ETI enables the elapsed time flip-flop ETF to be set at the end of the sixth digit time by digit signal DCF. The set output ETF of the elapsed time flip-flop ETF is gated with the digit timing signal DCG, which is a logical one for the seventh digit time, in a NAND gate 512. The output of NAND gate 512 is applied as one input to NAND gate 514 to generate a time count update signal TCU at the output of NAND gate 514. It will thus be seen, that if the machine station is on elapsed time and thus producing pieces, a logical one time count update signal TCU is generated during the seventh digit time. The time count update signal TCU is thus generated when the least significant digit of the elapsed time count portion of the time count word is held in the shift register 134 of FIGURE 26.

On the other hand, if the particular machine station 50 is on down time, the down time flip-flop DTF is triggered to its set condition and its set output DTF is gated with the digit timing signal DCD in a NAND gate 516. The output of NAND gate 516 is applied to the other input of the NAND gate 514. Consequently, a time count update signal TCU is generated during the fourth digit time as controlled by the digit timing signal DCD and thus occurs during the digit time when the least significant digit of the elapsed time count portion of the time count word is held in the shift register 134. If the machine station 50 is not turned on, it will be seen that no time count update signal TCU is generated.

A bit and digit carry generator, indicated generally at 138 and corresponding to the adder 138 of FIGURE 2B, is shown in detail in FIGURE 28. It will be seen that the bit and digit carry generator 138 is constructed in essentially the same manner as the bit and digit carry generator 120 (FIGURE 25) operating on the piece count words. As seen in FIGURE 28, the time count update signal TCU and the bit timing signal BCE are gated together in a NAND gate 620. The output of NAND gate 620 is applied as one input to an AND gate 622. The output of AND gate 622 is applied to the gated reset input of a time count bit carry flip-flop TBC, and through an inverter 624 to the gated set input of the same flip-flop. Consequently, the time count update signal TCU will enable the bit carry flip-flop TBC to be set by a bit clock pulse $C_o$ during the fifth bit time of a digit as determined by bit timing signal BCE. The timing of the time count update signal TCU, as described in connection with FIGURE 27, causes the bit carry flip-flop TBC to be set one bit time preceding the first digit time of a time count word if the elapsed time count is to be updated or one bit time preceding the fifth digit time of a time count word if the down time count portion of the time count word is to be updated.

The time count update signal TCU, the set output TAE of the first flip-flop TAE in the shift register 134 (FIGURE 26), and the set output TAB of the fourth flip-flop TAB in the shift register 134 are gated together in an AND gate 626. The output of AND gate 626 is applied through a NOR gate 628 directly to the gated reset input and through an inverter 630 to the gated set input of a time count digit carry flip-flop TDC.

It will thus be seen that if there is a time count update signal TCU and the digit held in the shift register 134 is a decimal 9, the digit carry flip-flop PDC is set to generate a digit carry function. The set output PDC of the digit carry flip-flop PDC, a logical one for a digit carry, is feed back and gated with digit timing signals $\overline{DCG}$ and $\overline{DCD}$ in a NAND gate 632. The output of NAND gate 632 is applied to a second input of AND gate 622 so as to enable the bit carry flip-flop PBC to be set and thereby generate a bit carry function when there is a digit carry. The digit timing signals $\overline{DCG}$ and $\overline{DCD}$ serve to inhibit the generation of a bit carry during the fourth and last digit times even though a digit carry is called for so as to prevent a bit carry for the down time portion of a piece count word from being carried out on the elapsed time portion of the piece count word, and vice versa.

The set output TBC of the bit carry flip-flop TBC is fed back and gated with the set output PAA of the last flip-flop PAA of the shift register 134 (FIGURE 26) in a NAND gate 634. The output of NAND gate 634 is applied to a third input of AND gate 622 so as to hold the bit carry flip-flop PBC in its set condition for so long as binary one bits are read from the shift register 134.

It will be seen that the operation of the bit and digit carry generator 138 to add a decimal one to either the elapsed time or the down time portion of a time count word is identical to the operation described in connection with the piece count bit and digit carry generator 120 in FIGURE 25.

The circuit of FIGURE 29, used to record an updated time count word on the drum 90 or to enter a time count word from the console 56, is substantially identical to the circuit of FIGURE 24 which performs the same function with regard to the piece count words. The only difference of any consequence is due to the fact that the time count word does not include a flag digit. Consequently, the portion of the circuit of FIGURE 24 concerned with writing the flag digit of the piece count words is not necessary in the circuit of FIGURE 29.

A time count write enable flip-flop TWE, which corresponds to write enable circuit 140 of FIGURE 2B, is used to enable the write circuitry 142 of the head 146 (FIGURE 2A) associated with the time count drum track 67, while a time count rewrite flip-flop TRW, which corresponds to the rewrite circuit 144 of FIGURE 2B, is used to generate the updated piece count word for recording on the drum 90.

It will thus be seen from the circuitry thus far described that the time count update signal TCU indicates which portion of the time count word, either elapsed time or down time, is to be updated. The bit and digit carry generator 138 then proceeds to update either the down time or elapsed time portion of the time count word. It now remains to control when either the elapsed time or the down time portion of the time count word is to be updated.

It has been arbitrarily chosen to update the time count word in 36 second intervals. As a consequence, the elapsed time count and the down time count are expressed in 100ths of hours. This is purely arbitrary as any desired timing interval may be used.

Referring now to FIGURE 27A, the timing source 72 (FIGURE 1) generates a timing pulse TCP once every 36 seconds. This timing pulse TCP triggers a one-shot multivibrator termed time count update initiate TUI. The output TUI of the one-shot multivibrator TUI is applied to the gated set input of a time count update start flip-flop TUS, triggering it to its set condition. The set output TUS of flip-flop TUS is applied to the gated set input of a time count update flip-flop TUF. Flip-flop TUF is clocked by the revolution marker pulse RM occurring once per drum revolution. After the flip-flop TUS has been set by a time count pulse TCP issuing from the timing source 72 (FIGURE 1), the time count update flip-flop TUF is set by the revolution marker pulse RM and reset one revolution later when the pulse RM appears again. The set output TUF of flip-flop TUF is thus a logical one for one full revolution of the drum 90. This set output TUF is applied back to the gated reset input of the flip-flop TUS so that this later flip-flop will be reset when flip-flop TUF resets.

Returning to FIGURE 29, the set output TUF of the time count update flip-flop TUF is gated with the reset output $\overline{TTE}$ of the parity error flip-flop TPE (FIGURE 26) in a NAND gate 638. The output of NAND gate 638 is applied to one input of an AND gate 640 whose output is applied directly to the gated reset input and through an inverter 642 to the gated set input of the write enable TWE. It will thus be seen that as long as there is no parity error detected in the digits of the time count words, the write enable flip-flop TWE will be set by the time count update signal TUF and thereby enable the write circuit 142 for write head 146 (FIGURES 2B and 2A) for a complete revolution of the drum 90.

So as to enable the write circuit 142 for entry of a time count word from the console 56, the enter time word signal EWD (FIGURE 21), the address select signal ASFC (FIGURE 16) and the write enable gate signal WEG (FIGURE 16) are gated together in a NAND gate 644, the output of which is applied as a second input to AND gate 640. Consequently, the write enable flip-flop TWE can be set to enable the write head circuit 142 during the time of the address select signal ASFC for the recording of a time count word from the console 56 for a selected machine station 50. The write enable flip-flop TWE is also set to enable erasure of a time count word for a selected machine station 50. Accordingly, the erase signal EWR (FIGURE 21) and the address select signal ASFC are gated in a NAND gate 646, whose output is applied through AND gate 640 to the write enable flip-flop TWE.

The enter time count word signal EWD and the address select signal ASFC are gated together in an AND gate 648. The output of AND gate 648 is applied as one input to a NOR gate 650. The erase signal EWR and the address select signal ASFC are gated together in an AND gate 652, the output of which is applied as a second input to NOR gate 650. The output of NOR gate 650 is applied as one input to a NAND gate 654 and to one input of a NAND gate 656. This output from NOR gate 650 functions to disable NAND gates 654 and 656 when a time count word is to be entered directly from the console or an erase function is to be performed.

To enter the digits of a time count word from the console 56, the digits CID (FIGURE 19) are gated with the enter piece count word signal EWD and the address select signal ASFC in a NAND gate 658. The outputs of NAND gates 654, 656 and 658 are applied as separate inputs to an AND gate 660. The output of AND gate 660 is applied directly to the gated reset input and through an inverter 662 to the gated set input of the rewrite flip-flop TRW. With the output of NOR gate 650 disabling NAND gates 654 and 656 during entry from the console 56, the output of AND gate 660 then controls the state of the rewrite flip-flop TRW. Consequently, the rewrite flip-flop TRW, which is clocked by the bit clock pulse $C_o$, follows the central input digit CID to generate the individual bits of the digits of a time count word entered from the console 56 for recording on the time count track 67 by the write head 146. One digit is recorded on each revolution of the drum 90.

Still referring to FIGURE 29, the other inputs to NAND gate 654 are the set output TAA of the last flip-flop TAA of shift register 134 (FIGURE 26), the bit carry signal $\overline{TBC}$ and digit carry signal $\overline{TDC}$ (FIGURE 28), and the bit timing signal $\overline{BCE}$. The NAND gate 654 is enabled when there is no bit or digit carry function (flip-flops TBC and TDC reset), and the output of AND gate 660 follows the input TAA to NAND gate 654 whereupon the rewrite flip-flop TRW generates the individual bits of a time count digit exactly as read from the shift register 134. The NAND gate 654 is disabled during the fifth bit time by the bit timing signal $\overline{BCE}$ since the parity bit is generated separately as will be described.

NAND gate 656 receives as its remaining inputs, the output $\overline{TAA}$ from the shift register 134, the bit carry signal TBC, the digit carry signal $\overline{TDC}$, and the bit timing signal $\overline{BCE}$. Thus, the output of NAND gate 655 controls the state of the rewrite flip-flop TRW to update either the down time or the elapsed time digits of the time count word by changing decimal nines to zeros and changing binary one bits to binary zeros, and vice versa.

The output from the inverter 662, indicated at TAG which is used to enter a binary one bit in the rewrite flip-flop TRW, is fed back to the gated set and reset inputs of a time count parity generator flip-flop TPG included in a parity generator generally indicated at 663. The operation of the parity generator flip-flop TPG is clocked by the bit clock pulses $C_o$. At the beginning of each digit time, the parity generator flip-flop TPG is set by the output of an A.C. gate 670 in response to the parity generator set signal PGS generated in FIGURE 23. The state of the parity generator flip-flop TPG is changed for each binary one bit entered in the rewrite flip-flop TRW (FIGURE 29). If after the fourth bit of any digit, the parity generator flip-flop TPG is reset, the number of binary one bits in that digit is odd. On the other hand, if the parity generator flip-flop TPG ends up in its set state at the end of the fourth bit time of a digit, the number of binary one bits in the digit is even.

Returning to FIGURE 29, the set output TPG of the parity generator flip-flop TPG is gated with the bit timing signal BCE in a NAND gate 672. The output of NAND gate 672 goes to the fourth input of the AND gate 660. If the set output TPG is a logical one indicating that the flip-flop TPG is in its set state, the output of NAND gate 672 causes a binary one to be entered in the rewrite flip-flop TRW and recorded as a binary one parity bit on the drum. If the parity generator flip-flop TPG is reset, NAND gate 672 is disabled and a binary zero parity bit is written on the drum. It will thus be seen that the parity bit is generated independently as the individual bits of the digit are recorded on the drum 90, and after the fourth bit of a digit is recorded, a binary one or binary zero parity bit is recorded so as to maintain the odd parity check.

It will thus be seen that the time count update logic functions in response to a timing pulse TCP from the time source 72 to update all the time count words in one spin of the drum 90. During the interval between timing pulses TCP, the write circuitry 142 (FIGURE 2B) is disabled and the time count words recorded in their assigned word slots in the first time count track are left as previously recorded by write head 146 when the last timing pulse TCP occurred. During the drum spin when updating is performed, the time count for those machine stations not turned is not augmented since the time count update signal TCU (FIGURE 27) is not generated during the time when these time count words are shifted through the shift register 134. Thus, the rewrite flip-flop TRW (FIGURE 29) generates the bits of these piece counts exactly as shifted from the shift register 134. It will thus be seen that the philosophy used in processing the time count words is substantially identical to that used in processing the piece count words.

*Message assembly register*

In the READOUT mode to assemble the individual data words pertaining to a selected machine station 50 into a message for output to the teletypewriter 80 (FIGURE 2C) or in the DISPLAY mode when selected words relating to a selected machine station are visually displayed, the data words read from their respective tracks on the drum 90 are applied in serial bit fashion to the static/dynamic data synchronizer 150, shown generally in FIGURE 2B and detailed in FIGURE 30. The synchronizer 150 is included in the message assembly register 76 (FIGURE 2B).

As seen in FIGURE 30, a piece count word appearing as PAA when shifted bit by bit from the shift register 116 (FIGURE 23) is applied to one input of an AND gate 700. The other input to AND gate 700 is the enter piece count word signal EWE generated by the track select circuit (FIGURE 21). The signal EWE is a logical one as controlled from the console 56 when it is desired to read out a piece count word. The output of AND gate 700 is applied to one input of a NAND gate 702 whose output, in turn, is applied directly to the gated reset input and through an inverter 704 to the gated set input of a delay flip-flop PTDA. The time count word, appearing as TAA shifted bit by bit from the shift register 134 (FIGURE 26), is gated with the enter time count word signal EWD (FIGURE 21) in an AND gate 706 whose output feeds the other input of the NAND gate 702. The enter time count word signal EWD is a logical one as controlled from the console 56 to enable AND gate 706 when it is desired to read out a time count word. The bit clock pulse $C_o$, suitably delayed in a pair of inverters 708 and 708' clock the operation of the delay flip-flop PTDA. The set and reset outputs of delay flip-flop PTDA are applied to the gated set and gated reset inputs, respectively, of a second delay flip-flop PTDB clocked by the same delayed bit clock pulses $C_oPD$ that clock the delay flip-flop PTDA.

Inasmuch as the individual read/write heads 106a through 106c operating in the three static data tracks 90e through 90f share a common read/write amplifier 104 (FIGURE 2A), the select word signals EWA through EWC generated in the track select circuit of FIGURE 20 as controlled from the console 56 effect head switching so as to select the appropriate head to read the particular data words, either employee number, job number or machine number, from one of the three static data tracks on the drum 90. Consequently, the individual bits comprising the words of one of the three types of static data appear in serial bit fashion as inputs STW and $\overline{STW}$ to the synchronizer 150. The individual bits STW and $\overline{STW}$ of the selected static data word are serially entered into a delay flip-flop SDR. The delay flip-flop SDR is clocked by the delayed bit clock pulses $C_oPD$.

The purpose of the delay flip-flops PTDA and PTDB for the dynamic data and the delay flip-flop SDR for the static data is to align the individual data words in time before they are processed in the message assembly register 76. Realignment of the data words read from the drum is required because of the inherent readback delay encountered when reading out recorded data from a magnetic storage medium. It is found that the readback delay is less for the dynamic data words since these words are read from the drum 90 by heads specifically designed for reading. Whereas, the readback delay is greater in the case of the static data because of the fact that, in the illustrated embodiment, the heads reading out the static data from the magnetic drum are both a read and write head. A head designed specifically for reading can have a more rapid response than a head specifically designed to both read and write on a drum. Consequently, in order to align both the static and dynamic data, the dynamic data must be delayed to a greater extent than the static data. Hence the use of two delay flip-flops PTDA and PTDB for the dynamic data and one delay flip-flop SDR for the static data.

Still referring to FIGURE 30, the address select signal ASF (FIGURE 16), the data transfer signal DTF (FIGURE 15), the bit timing signal BCC and digit timing signal DCA are all gated together in a NAND gate 710. The output of NAND gate 710 is applied to the gated set input of a delayed address select flip-flop DASF. It will be recalled that the data transfer signal DTF is a logical one, thereby enabling NAND gate 710, when data is to be read out either for transmission to the teletypewriter 80 or for display. The address select signal $\overline{ASF}$, the digit timing signal DCA and the bit timing signal BCC are gated together in a NAND gate 712 whose output is applied to the gated reset input of the delayed address select flip-flop DASF. Assuming a READOUT or DISPLAY mode, the delayed address select flip-flop DASF is set by the output of NAND gate 710 during the third bit time of the first digit time and reset by the output of NAND gate 712, one word time later. The delayed address select flip-flop DASF is set during the third bit time of the first digit time so as to in effect delay the address select signal ASF several bit times and thereby align it with the dynamic data appearing at the set output of the delay flip-flop PTDB and the static data appearing at the set output of the delay flip-flop SDR. By resetting the flip-flop DASF one word time later, its set output DASF becomes a delayed address select signal which precisely describes the time during which the static and dynamic data words corresponding to the selected machine station 50 appear at the set outputs of the delay flip-flops PTDB and SDR.

The dynamic data, either piece count or time count words, appearing at the set output PTDB of the delay flip-flop PTDB are applied to one input of an AND gate 714 and also to one input of an AND gate 716. Enter piece word count signal EWE (FIGURE 21) is applied to the other input of AND gate 714, while enter time count word signal EWD is applied to the other input of AND gate 716. The outputs of AND gates 714 and 716 are gated together in a NOR gate 718. The output of NOR gate 718 termed hold register input $\overline{HRI}$ and the complement of this output HRI as inverted by inverter 720 are applied to the inputs of hold register, indicated generally at 152 in FIGURE 31 and corresponding the hold register 152 of FIGURE 2B. The hold register 152 is constructed of thirty-five interconnected flip-flop stages which is sufficient to hold one seven digit data word.

Returning to FIGURE 30, the set output SDR of the delay flip-flop SDR is gated with enter word signals $\overline{EWE}$ and $\overline{EWD}$ in a NAND gate 724. The enter word signals $\overline{EWE}$ and $\overline{EWD}$ disable NAND gate 724 for the periods when dynamic data words are to be read into the message assembly register 76. The output of NAND gate 724 also becomes the hold register inputs $\overline{HRI}$ and HRI.

From the foregoing circuit description, it will be seen that either employee numbers, job numbers, machine numbers, time count words or piece count words as selected by the track select circuit (word select) of FIGURES 20 and 21 are gated to the inputs of the hold register 152 (FIGURE 31). The control circuitry for controlling the hold register 152 to accept only the one data word which pertains to the selected machine station 50 will now be described.

The set output of the delayed address select flip-flop DASF is applied to one input of an AND gate 724. Bit clock pulses $C_o$ are applied to the other input of AND gate 724. The output of AND gate 724 is applied to one input of a NOR gate 726 whose output, in turn, is inverted in an inverter 728. The output, termed $C_oHR$, of inverter 728 is applied as shift pulses to the individual flip-flop stages of the hold register 152 (FIGURE 31). It will be seen that these shift pulses are only gated through to the hold register 152 during the duration of the delayed address select signal DASF which is the time during which the selected data word pertaining to the selected machine station 50 appears at the input to the hold register. Since the delayed address select flip-flop DASF remains in its set condition for one full word time, thirty-five shift pulses $C_oHR$ are generated and the entire selected data word is shifted into the hold register 152.

The delayed address select signal DASF is also applied to the gated set input of an address hold flip-flop AHF. The address hold flip-flop is triggered to its set condition by the termination of the delayed address select signal SASF. The set output of the address hold flip-flop AHF is applied to the gated set input of a message transfer flip-flop MTF. Message marker pulses MM are applied to the gated reset input of the address hold flip-flop AHF, and to the gated set and reset inputs of the message transfer flip-flop MTF. Message transfer flip-flop MTF is set by the next message marker pulse MM occurring after the address hold flip-flop AHF has been set. The message transfer flip-flop MTF remains set for one message time and is reset by the next message marker pulse MM. The set output MTF of message transfer flip-flop MTF is fed back to the gated reset input of the address hold flip-flop AHF so that this flip-flop is reset by the same message marker pulse MM that resets the message transfer flip-flop MTF.

The word counter 154 and the word locator 156 described generally in connection with FIGURE 2B are shown in detail in FIGURE 32. The word counter 154 consists of flip-flops WCA through WCE interconnected to form a counter. Message marker pulses MM are applied to the gated set input of the first flip-flop WCA of the counter triggering it to its set condition at the beginning of each message time. The word counter 154 is shifted by word marker pulses WM applied to the gated reset input of flip-flop WCA, and to the gated set and seset inputs of flip-flops WCB through WCE. It will thus be seen, that flip-flop WCA is set for the first word time in a message, flip-flop WCB is set for the second word time in a message, and so on.

The word locator 156 is comprised of a series of flip-flops WLA through WLE. The set output MTF of the message transfer flip-flop MTF (FIGURE 30) is applied to the gated reset inputs of each of these flip-flops WLA through WLE. The enter piece count word signal EWE is applied to the gated reset input of flip-flop WLA, the enter time count word signal EWD is applied to the gated set input of the flip-flop WLB, the enter machine number word signal EWC is applied to the gated set input of flip-flop WLC, the enter job number word signal EWB is applied to the gated set input of the flip-flop WLD, and, finally, the enter employee number word signal EWA is applied to the gated set input of the flip-flop WLE. It will be recalled that the enter word signals EWA through EWE are generated by the word or track select circuit disclosed in FIGURES 20 and 21. The set output DRF of the data read flip-flop (FIGURE 15) is applied to enable the gated set inputs of each of the flip-flops WLA through WLE in the word locator 156. The enter word signals EWA through EWE go to logical ones during the time when their corresponding data words are being entered into the hold register 152 (FIGURE 31). When any one of the enter word signals goes to a logical zero, this indicates that the corresponding data word has been entered into the hold register 152.

If the enter piece count word signal EWE goes to a logical one and then returns to a logical zero, the piece count word is necessarily in the hold register 152 and this is indicated by the flip-flop WLA which is triggered to its set condition. Thus, whichever flip-flop WLA through WLE sets indicates which data word is then being held in the hold register 152. Which flip-flop WLA through WLE was set when the hold register 152 was unloaded is reset when the message transfer flip-flop MTF (FIGURE 30) resets.

The set output WCA of flip-flop WCA in the word counter 154 is gated with the set output WLA of the flip-flop WLA in the word locator 156 in an AND gate 730. The set output WCB of flip-flop WCB in the word counter is gated with the set output WLB of the flip-flop WLB in the word locator in an AND gate 732. The set output WCC of the flip-flop WCC is gated with the set output WLC of flip-flop WLC in an AND gate 734. The set output WCD of flip-flop WCD is gated with the set output of WLD of flip-flop WLD in an AND gate 736. Finally, the set output WCE of flip-flop WCE is gated with the set output WLE of flip-flop WLE in an AND gate 738. The outputs of AND gates 730 and 732 are gated together in NOR gate 740. The outputs of AND gates 734 and 736 are gated together in a NOR gate 742, while the output of AND gate 738 is applied to a NOR gate 744 whose other input is grounded. The outputs of NOR gates 740, 742 and 744 are gated together in an AND gate 746 whose output in turn is gated with the reset output $\overline{MTF}$ of the message transfer flip-flop (FIGURE 30) in a NOR gate 748.

In the operation of the word counter 154 and the word locator 156 together with its associated gating circuitry, the logical one entered in the word counter by the message marker pulse MM is shifted along at word rate by the word marker pulses WM until coincidence is achieved with a logical one set output from whichever one of the flip-flops WLA through WLE is set. When this occurs, one of the AND gates 730 through 738 is enabled, and an unload hold register signal UHR is generated at the output of NOR gate 748 during the time when the message transfer flip-flop is set. It will be recalled that the message transfer flip-flop is set for one message time after the hold register 152 (FIGURE 31) has been loaded with a data word.

Returning to FIGURE 30, the unload hold register signal UHR is applied directly to the gated set input of an unload hold register flip-flop UHRA and through an inverter 750 to the gated reset input of the same flip-flop. The unload hold register flip-flop UHRA is clocked by the delayed bit clock pulses $C_oPD$. The unload hold register signal UHR is a logical one for a full word time and consequently the unload hold register flip-flop UHRA is held in its set condition for a full word time. The set output UHRA of the flip-flop UHRA is applied to enable an AND gate 752 for a full word time to pass thirty-five bit clock pulses $C_o$ which operate as hold register shift pulses $C_oHR$ effective to completely empty the hold register 152 (FIGURE 31). The output HRO from the hold register 152 is applied to one input of a NAND gate 754 (FIGURE 30). The other input to NAND gate 754 is the set output UHRA of the unload hold register flip-flop UHRA which enables this NAND gate when the hold register is unloading. The output of NAND gate 754 termed assembly line input $\overline{ALI}$ and its complement ALI, as inverted by an inverter 755, is applied to the write head 162 operating in the message assembly track 90h on the drum 90 (FIGURE 2A). Consequently, as the hold register 152 is emptied bit by bit, the word held in the hold register is recorded bit by bit on the message assembly track by the write head 162.

It will be observed that the enter word signals EWE through EWA determine which data word is held in the hold register 152 and also which of the flip-flops WLA through WLE in the word locator 156 is in its set condition. The word counter 154 then determines in what word slot of a message slot the word held in the hold register 152 will be recorded on the message assembly track 90h of the drum 90.

As noted in connection with FIGURES 2A and 2B, the write head 162 and the read head 164 operating in the message assembly track 90h of the drum 90 are spaced apart by the length of one full message or 175 bits as recorded on the drum. Once the hold register 152 has been emptied through NAND gate 754 for recording on the message assembly track 90h in a particular word slot of one message slot as determined by the word counter 154 and the word locator 156 (FIGURE 32), the unload hold register flip-flop UHRA resets to disable NAND gate 754 and enable a NAND gate 756. The other input to NAND gate 756 is connected from read head 164 and is termed assembly line output ALO. Consequently, the word recorded in a particular word slot of the previous message slot is read out by the read head 164 and applied to the assembly line inputs ALI and $\overline{ALI}$ connected to the write head 162. The same word recorded in the preceding message slot is again recorded in a corresponding word slot of the next message slot on the message assembly track 90h. After one full spin of the drum 90, the same word will be written on the drum in the corresponding word slot of every message slot in the message assembly track 90h. In the illustrated example, since the circumference of the drum 90 is twenty recorded message lengths, the same word will be written twenty times around the drum.

This process of loading and unloading the hold register 152 is repeated until, after five spins of the drum 90, all of the words pertaining to the selected machine station have been read from their respective data tracks and recorded in the message assembly track 90h in the desired message order. It will be seen from FIGURE 32, by the particular manner in which the outputs of the word counter 154 and the word locator 156 are gated together, the message is assembled in the message assembly track in reverse word order. That is, the piece count word is recorded in the first word slot of each message slot and the employee number is recorded in the last word slot of each message slot in the message assembly track 90h. This particular order is by virtue of the fact that the word locator flip-flop WLA is set in response to the enter piece count word signal EWE, and its set output WLA is gated with the set output WCA of the flip-flop WCA in the word counter 154. Since the word counter flip-flop is set for the first word time of each message time, the piece count word is recorded in the first word slot of a message slot. This reversal of word order is made necessary by the manner in which the output buffer 78 (FIGURE 2C) processes the messages in order to output the individual words of a message most significant digit first.

It will be seen that once a complete message is assembled in the message assembly track 90h, the message will be duplicated twenty times around the drum. By virtue of this, there is no need to keep track of which message slot in the message assembly track 90h a particular message is recorded. Moreover, it materially reduces the time the output buffer 78 has to wait for the message assembly register to transfer a message.

Returning to FIGURE 31, if it is desired to merely display a particular word for a selected machine station 50, the desired word to be displayed is read into the hold register 152 under the control of the enter word signals EWA through EWE and the address select signal ASF. Once the selected word is held in the hold register 152, the individual flip-flop stages are read out in parallel to a conventional binary coded decimal to decimal decoder indicated generally at 760. The decoder 760 is enabled by the set output of the data display flip-flop DDF (FIGURE 15) and disabled during the delayed address select signal time DASF so that the decoder does not begin decoding until the selected word is completely shifted into the hold register 152. The output from the decoder 760 is applied to a conventional numerical display unit 762 located at the console to display the digits in normal word order. Since, during the DISPLAY mode, the data read flip-flop DRF (FIGURE 15) is reset, the word locator 156 (FIGURE 32) is disabled and the word held in the hold register 152 is not read out to be recorded in the message assembly track 90h.

*Output buffer*

As previously noted in connection with FIGURES 1 and 2C, the output buffer 78 accepts the data words for a selected machine station 50 in assembled message form from the message assembly register 76, and prepares the assembled message for transmission to the teletypewriter 80 in a format which is acceptable. As seen in FIGURE 33, the set output WLA of the flip-flop WLA in the word locator 156 (FIGURE 32) is applied to the gated set input of a bid to transfer flip-flop BTO included in the transfer bid circuit 170 (FIGURE 2C). The flip-flop WLA in the word locator 156 is set by the enter piece count word signal EWE during the time the piece count word is being recorded in the message assembly track 90h (FIGURE 2A); the piece count word being the last word to be entered into the message assembly register 76 for assembly into a message. Consequently, when the flip-flop WLA in the word locator 156 (FIGURE 32) is reset, the bid to transfer flip-flop BTO is set indicating that the completion of a message assembly has been achieved by the message assembly register 76. The set output of flip-flop BTO is applied to one input of an AND gate 800 included in the transfer control circuit 176 (FIGURE 2C). A buffer busy flip-flop BBF, included in the buffer busy circuit 174 (FIGURE 2C), is reset by an end of print pulse EOP which is generated when the teletypewriter 80 has completed printing out a message transmitted from the output buffer 78. Consequently, the end of print pulse EOP from the teletypewriter 80 indicates that the output buffer 78 is empty and thus capable of receiving an assembled message from the message assembly register 76 (FIGURE 2B). With the buffer busy flip-flop BBF in its reset state, its logical one reset output $\overline{BBF}$ enables the AND gate 800 in the transfer control circuit 176.

The output of AND gate 800 is applied to the gated set input of an output transfer flip-flop OTF. The output transfer flip-flop OTF is clocked by message marker pulses MM applied to its gated set and reset inputs. It will thus be seen that AND gate 800 is fully enabled when a complete message has been assembled in the message assembly register 76 and the output buffer 78 is not busy. The output of AND gate 800 enables the output transfer flip-flop OTF to be set by the next occurring message marker pulse MM.

The set output OTF of the output transfer flip-flop OTF is applied as one input to a NAND gate 802 included in the recirculate circuit 184. The other input to NAND gate 802 is taken from the output ALO as read from the message assembly track 90h of the message assembly register 76 (FIGURE 30). The output of NAND gate 802 is connected directly to the write circuitry (not shown) associated with the write head 178 of the output buffer track 90b on the drum 90. This output is termed recirculate line input RLI. The output of NAND gate 802 is also applied through an inverter 804 to the write circuitry of the write head 178 as an inverted recirculate line input $\overline{RLI}$.

It will be seen that the output transfer flip-flop OTF is set for one message time and consequently, the NAND gate 802 is enabled for one message time. Since the assembled message recorded in the assembly line track 90h of the message assembly register 76 is duplicated twenty times around the drum 90, the assembled message can be read from the assembly line track during any message time and recorded in the recirculate line, i.e., output buffer track 90b, of the output buffer 78 during the next occurring full message time. It will be recalled from FIGURE 15 that the data read flip-flop resets when the output transfer flip-flop OTF resets. Thus, in the multiple READOUT mode the stepper switch 286 will be triggered to select the next machine station 50 and the data read flip-flop is again set to begin the readout and message assembly operations relating to this next selected machine station, as previously described.

Still referring to FIGURE 33, the digit request circuit 186 includes a next digit request flip-flop NDR. The next digit request flip-flop NDR is set by a next digit request signal NDRS generated under the control of the teletypewriter 80. The set output of the next digit request flip-flop is applied to the gated set input of an extend recirculate line flip-flop ERL included in the transfer control circuit 176. The set output of the extend recirculate line flip-flop ERL is applied to the gated reset input of the next digit request flip-flop NDR, and further to the gated set input of an end of delay flip-flop EOD. The set output of the end of delay flip-flop is fed back to the gated reset input of the extend recirculate line flip-flop ERL. Message marker pulses are applied to the gated reset input of the next digit request flip-flop NDR, the gated set input of the extend recirculate line flip-flop ERL, and the gated set input of the end of delay flip-flop EOD. Digit clock pulses DC are applied to the gated reset inputs of the extend recirculate line flip-flop ERL and the end of delay flip-flop EOD. The interrelated operations of these three flip-flops will be described later.

When the teletypewriter 80 is not requesting a digit from the output buffer 78, the extend recirculate line flip-flop ERL is reset. Its enabling reset output $\overline{ERL}$ is applied as one input to a NAND gate 806 in the recirculate circuit 184. Once a complete message has been read from the message assembly track 90h of the message assembly register 76 (FIGURE 2B), the output transfer flip-flop OTF is reset and its reset output $\overline{OTF}$ enables NAND gate 806. The recirculate line output RLO read from the output buffer track 90b of the output buffer 78 by the read head 180 (FIGURE 2A) is applied as the other input to NAND gate 806. It will thus be seen, that the message recorded on the output buffer track 90b is read out by the read head 180 and recirculated through NAND gate 806 to the inputs of the output buffer track RLI and $\overline{RLI}$ to be again recorded on the recirculate line track by the write head 178.

The read and write heads 180 and 178 are spaced apart on the output buffer track 90b by one message length as recorded on the drum 90. Under this condition, the message is recirculated in a recirculating line which is exactly equal in length to the length of a message. The positional relationship of the message as recorded on the output buffer track 90b relative to the message marker pulses remains constant. That is, the message is recorded in a message slot bracketed in time by adjacent message marker pulses.

The message read from the output buffer track 90b, indicated at RLO and $\overline{RLO}$ is also applied to the input of the shift register, indicated at 182 in FIGURE 34. The shift register 182 corresponds to the recirculate line extension register 182 described in connection with FIGURE 2C. The shift register 182 is comprised of five interconnected flip-flop stages LEA through LEE. The shift register 182 is shifted at bit rate by the bit clock pulses $C_0$. The output from shift register 182 appearing at the set output LEE of the flip-flop LEE is applied to one input of a NAND gate 810 included in the recirculate circuit 184 (FIGURE 33). The output of NAND gate 810 is connected to the inputs RLI and $\overline{RLI}$ of the recirculate line. NAND gate 810 is enabled when the extend recirculate line flip-flop ERL is set and, at the same time, the output transfer flip-flop OTF is reset indicating that the transfer of a message from the message assembly register 76 to the output buffer 78 has been effected. It will thus be seen that if the message recorded on the output buffer track 90b of the drum 90 is recirculated through the shift register 182 (FIGURE 34), the NAND gate 810 and then back to the write head 178, the recirculate line is extended in length by one digit, or five bits.

Under normal circumstances, the message in this recirculating line is recirculated from its output RLO directly back to its inputs RLI and $\overline{RLI}$ through NAND gate 806. If the message appearing at the output RLO of this recirculating line is recirculated through the shift register 182 and NAND gate 810, the message as recorded on the output buffer track 90b will precess. The manner in which the recorded message is precessed will be described in connection with FIGURE 35.

FIGURE 35A shows the location of the individual digits A through G of each word of a message as recorded on the output buffer track 90b of the drum 90 relative to a pair of recorded message marker pulses MM. The read head 180 is spaced from the write head 178 by a distance on the drum 90 equal to the distance between two message marker pulses MM as recorded on the drum. The drum is rotating from left to right as seen in FIGURE 35A, i.e., from the write head 178 toward the read head 180. Going from right to left in FIGURE 35A, the words of the message are written in reverse word order, i.e., piece count PC first through employee number EN last. In the normal recirculating of the message to and from output buffer track 90b, the message is read out by the read head 180 and applied directly by the recirculate circuit 184 to the write head 178 to be recorded again on the output buffer track 90b to be read out again by the read head 180 during the next message time; the message times and corresponding message slots being described by the message marker pulses MM. Since originally the message is transferred from the message assembly register 76 to the output buffer 78 during a message time, the message as originally recorded on the output buffer track 90b continually occupies a message slot defined as the portion of the track between message marker pulses MM. This is shown in FIGURE 35A.

Returning to FIGURE 33, when the teletypewriter 80 is in condition to accept a digit from the output buffer 78, the first digit transmitted should be digit G, the most significant digit, of the employee number EN; the first word in the message format to be printed out by the teletypewriter. Thus, when the teletypewriter 80 signals that it is ready to accept the most significant digit G of the employee number EN, the next request signal NDRS sets the next digit request flip-flop NDR in FIGURE 33. The set output of the flip-flop NDR enables the extend recirculate line flip-flop ERL to be set by the next message marker pulse MM. The set output ERL of the flip-flop ERL enables NAND gate 810 and its rest output $\overline{ERL}$ disables NAND gate 806 in the recirculate circuit 184. As a result, the five bit shift register 182 is switched into the message recirculating line, and the recirculate line is extended in length by one digit.

Returning to FIGURE 35A, when the flip-flop ERL is set, to extend the recirculate line, the most significant digit, digit G of the employee number EN is held in the shift register 182 since it was read out by the read head 180 during the last digit time just before the message marker pulse MM appeared to set flip-flop ERL. Digit A, the least significant digit, of the piece count word PC, is just coming under the read head 180. Since the recirculate circuit 184 now accepts the output from the shift register 182, the digit G of the employee number EN is shifted out of the shift register and recorded on the output buffer track 90b in lieu of digit A of the piece count word PC which is then being read out by the read head 180. It will be seen that the digit G of the employee number EN is recorded by write head 178 in the first digit slot of the next message slot which was previously occupied by digit A of the piece count word PC. The digits of the piece count word PC read by the read head 180 are applied to the write head 178 through the shift register 182 rather than directly, and are recorded in sequence coming after digit G of the employee number EN.

Referring now to FIGURE 35B, the relationship of the recorded digits of the various words to the read head 180 and write head 178 are shown for one message time later. During the interim, the extend recirculate line flip-flop (FIGURE 33) remained set, and the write head 178 has written the digits of the message as they are shifted from the shift register 182. As seen in FIGURE 35B, when the next message marker pulse MM appears, it immediately precedes the digit slot on the drum now occupied by most significant digit G of the employee number EN. It will be noted that the digit slot immediately preceding the message marker pulse MM is also occupied by most significant digit G of the employee number EN. Consequently, the most significant digit G of the employee number EN is also held in the shift register 182.

Returning momentarily to FIGURE 33, the set output of the extend recirculate line flip-flop ERL enables the end of delay flip-flop EOD to be set by this next appearing message marker pulse MM. Turning to FIGURE 35C, which shows the positional relationship one digit time later, digit G of the employee number EN occupying the first digit slot of the message slot has been read out and is held in the shift register 182. Digit A of the piece count word PC is just arriving at the read head 180. At the end of this one digit time both the extend recirculate line flip-flop ERL and the end of delay flip-flop EOD are reset by a digit clock pulse DC. As the set output EOD of the end of delay flip-flop COD goes to a logical zero, a one-shot, multivibrator PTC is triggered to generate a parallel transfer clock pulse PTC.

The set outputs LED through LEE of flip-flops LED through LEE included in shift register 182 are applied in parallel to an output register, indicated generally at 188 in FIGURE 34. The output register 188 includes four flip-flops PBB through PBE. The set output LEE of flip-flop LEE in the shift register 182 is applied directly to the gated set input of flip-flop PBE and through an inverter 820 to the gated reset input of the same flip-flop. The set output LED of flip-flop LED in the shift register 182 is applied directly to the gated set input and through an inverter 822 to the gated reset input of the flip-flop PBD. The set output LEC of flip-flop LEC in the shift register 182 is applied to the gated set input and through an inverter 824 to the gated reset input of the flip-flop PBC in the output register 188. Finally, the set output LEB of flip-flop LEB in the shift register 182 is applied to the gated set input and through an inverter 826 to the gated reset input of flip-flop PBB. The parallel transfer clock pulse PTC is applied to each of the gated set and reset inputs of the flip-flops PBD through PBE of the output register 188.

As previously described, when the parallel transfer clock pulse PTC is generated, the most significant digit G of the employee number EN is held in the shift register 182. This digit is read out in parallel, as outputs LEB through LEE and shifted into flip-flops PBB through PBE by the parallel transfer clock pulse PTC. Consequently, the least significant bit 1 of digit G held in flip-flop LEE of the shift register is shifted into flip-flop PBE of the register 188. The most significant bit 8 of digit G is held in flip-flop PBB. From the output register 188, the digit is transmitted to the teletypewriter 80. The parity bit of digit G held in flip-flop LEA of the shift register 182 is not read out to the register 188.

As the digit G of the employee number held in the shift register 182 is being read out to the output register 188, the extend recirculate line flip-flop ERL (FIGURE 33) resets and now the recirculate circuit 184 switches the shift register 182 out of the recirculate line of the output buffer 78. FIGURE 35D depicts the physical relationship of the digits recorded on the drum relative to the heads 178, 180 of the output buffer track 90b and the message marker pulses MM one message time less one digit time later. It will be seen that the net result has been to shift or precess the entire message one digit slot in a direction opposite to the direction of rotation of the drum 90 relative to the recorded message marker pulses MM. When the next digit, digit F of the employee number EN, is requested by the teletypewriter 80, the above described operation is repeated. The first digit slot of the next message slot will then be filled from the shift register 182 with the second most significant digit F of the employee number. When the next message marker pulse MM appears, the shift register 182 will be filled with the second most significant digit F, and one digit time later will again be filled with digit F of the employee number EN. At the end of this digit time, the digit F is read out in parallel to the output register 188 for transmission to the teletypewriter 80.

It will thus been seen that the net result of each digit request by the teletypewriter 80 is to shift or precess the message as recorded on the drum relative to the message marker pulses MM one digit slot in a direction reverse to the direction of rotation of the drum 90. The next digit transmitted to the teletypewriter 80 after a next digit request has resulted in a one digit shift of the record message, is the digit recorded in the first digit slot of a message slot. The output buffer 78 continues to so operate in response to digit requests from the teletypewriter 80 until the least significant digit A of the piece count word PC is transmitted whereupon the teletypewriter generates the end of print pulse EOP, resetting buffer busy flip-flop BBF. The output buffer 78 may then accept the transfer of another message from the message assembly register 76.

A parity check circuit, indicated generally at 830 in FIGURE 34 checks the digit to be transmitted to the teletypewriter 80 for parity error. The output RLO read from the output buffer track 90b on the drum 90 is applied directly to the gated set input of an output parity check flip-flop OPC. The output RLO is also applied through an AND gate 832 to the gated reset input of flip-flop OPC. The output parity check flip-flop OPC is clocked by the bit clock pulse of $C_0$. The other input to AND gate 832 is taken from the set output EOD of the end of delay flip-flop EOD. Consequently, the parity check circuit 830 only checks the parity of that digit shifted into the shift register 182 which is to be read out to the output register 188. As recalled, the digit to be read out is entered into the shift register 182 during the time when the end of delay flip-flop EOD is in its set condition. Since the output RLO of the recirculate line is applied directly to the gated set input of flip-flop OPC, this flip-flop will be triggered to its set condition and held there by any binary one bit read from the recirculate line. Consequently, the output parity check flip-flop OPC will be in its set condition at the beginning of the digit time when the digit to be read out is shifted into the shift register 182. The condition of the output parity check flip-flop OPC is changed for each binary one bit shifted into the shift register 182. Consequently, if the output parity check flip-flop OPC ends up in its reset state at the end of a digit time when the end of delay flip-flop EOD resets, the parity of the digit to be read out is correct. However, if parity is incorrect, the output parity check flip-flop OPC will end up in its set condition at the end of the digit time when the end of delay flip-flop EOD resets. The set output of output parity check flip-flop OPC is applied to the gated set input of an output error flip-flop OEF, which is triggered to its set condition by a parallel transfer clock pulse PTC if the output parity check flip-flop OPC is set. The set output OEF of the output error flip-flop OEF is transmitted together with the digit held in the output register 188 to the teletypewriter 80. The teletypewriter 80 prints out the digit and, at the end of the message print out, prints an error character, to indicate that the message contains an error if the output error flip-flop OEF was set at any time during the transmission of the message. The output error flip-flop OEF is reset by the end of print pulse EOD.

*Copy and transaction registers*

It may well be contemplated that the output device 80 will not be "on line," that is, always available to accept transmissions of messages from the output buffer 78. The output device 80 may be shared by other systems besides the disclosed system. This would certainly be the situation if the output device is a computer. It may or may not be the situation if the output device is a teletypewriter. It will be noted from the foregoing description that the disclosed system is capable of waiting for the output device 80. The first message will be held in the output buffer 78 and the second message will be held in the message assembly register waiting for the output device to come on line and generate a digit request signal NDRS. Readout for the third machine station will not begin until the first message has been outputted and the second message has been transferred from the message assembly register 76 to the output buffer 78. It will be recalled that after each message has been transferred to the output buffer 78, the output transfer flip-flop OTF (FIGURE 33) resets to, in turn, reset the data read flip-flop DRF (FIGURE 15). Only then is the stepper switch 286 triggered to select the next machine station for readout. If only a single work shift is involved, the system can wait for the output device 80. However, if there are consecutive work shifts, the static and dynamic memories must be read out quickly in order that they may be cleared for the start of the next shift.

To care for this situation, a copy register, indicated generally at 900 in FIGURE 36, is provided. The system generally disclosed in FIGURE 36 is identical to the system generally disclosed in FIGURE 1 except for the inclusion of the copy register 900 and a transaction register 910. The function of the transaction register 910 will be explained later.

As seen in FIGURE 36, the output 62a from the static data memory 62, the output 66a from the piece count update logic and memory 66, and the output 70a from the time count update logic and memory 70 are applied separately to the input of the message assembly register 76 precisely as disclosed in FIGURE 1. However, in addition these separate outputs are applied as inputs to the copy register 900. The copy register 900 includes at least one circumferential track on the magnetic drum (FIGURE 2A) for each type of data processed by the system. Thus, in the illustrated embodiment of the invention, the copy register 900 includes an employee number track, a job number track, a machine number track, a time count word track and a piece count word track on the magnetic drum 90. The copy register 900 also includes suitable input and output gating circuitry controlled from the console over control cable 71.

When it is desired to clear the static and dynamic data memories, such as at the end of a work shift, and quickly ready them for storing data pertaining to the next work shift, the message assembly register 76 is disabled and the copy register 900 is enabled from the console 56 to accept mass transfer of all of the data stored in the memories. Specifically, the piece count track 90c (FIGURE 2A) is read out serially in one drum revolution and simultaneously recorded serially in the piece count track included in the copy register 900. At the same time, the time count track 90c (FIGURE 2A) is read out during the same revolution and recorded in the time count track included in the copy register 900. Also during the same revolution, one of the static data tracks, for example the employee number track 90g is read out and simultaneously recorded in the corresponding employee number track included in the copy register 900. In following complete revolutions of the drum 90, the job number track 90f and the machine number track 90e (FIGURE 2A) are read out and recorded in their corresponding tracks in the copy register 900. If separate read/write amplifiers 104 (FIGURE 2A) are employed for the three static data tracks, it would take only one full spin of the drum 90 to transfer all of the static data for recording in corresponding static data tracks in the copy register 900.

It will thus be seen that in a total of three full revolutions of the drum 90, the static and dynamic data memories can be completely emptied and the data previously recorded in the data tracks is duplicated in their corresponding copy register tracks. The data words are held in the copy register tracks in the same relative word locations they occupied in their respective data tracks. Thus, the address register can be used to locate the data held in the copy register corresponding to any selected machine station. When the output device 80 comes on line, the static and dynamic data words for selected machine stations are read out on lines 900a, 900b, 900c to the message assembly register 76 for assembly into message form, and then transferred to the output buffer 78 for ultimate transmission to the output device, precisely as described above. Meanwhile, the static and dynamic data memories can be accumulating data pertaining to production during the next work shift.

The system as disclosed in FIGURE 36 is also provided with the capability to completely by-pass the copy register 900 when the intermediate buffering provided by the copy register 900 is not needed. Thus, the console may disable the copy register 900 and enable the message assembly register 76 so that the static and dynamic data words corresponding to selected machine stations are read out from their respective memories directly into the message assembly register 76 for assembly into a message, precisely as described in detail above.

The transaction register 910 is connected to the output of the message assembly register 76 and functions to hold messages assembled by the message assembly register until an output device 80 comes on line. The assembled message is transferred on line 77 when a bid to transfer signal on line 76a is accepted by the transaction register 910. The transaction register 910 comes into play when it is desired to read out messages for particular machine stations 50 at times during the work shift and the output device 80 is not available. It will be appreciated that if the output device 80 is not on line, random readout of selected machine stations 50 could not be achieved without the provision of an intermediate storage register to hold the message until the output device 80 becomes available. Otherwise, the production information for particular machine stations as of a particular time would be lost while waiting for the output device 80 to become available.

The transaction register 910 comprises one or more circumferential tracks on the magnetic drum 90 in which are serially recorded the assembled messages. The storage capacity of the transaction register 910 may be made sufficient to hold assembled messages for all of the machine stations but probably would need only be sufficient to hold 20 messages, for example, since the random sampling of the production status during work shift would probably only be performed as to several selected or key machine stations 50. The output of the transaction register 910 is applied to the input of the output buffer 78. When the output device 80 comes on line, the output buffer 78 acknowledges a transfer bid signal on line 910a and accepts transfer of the assembled messages from transaction register 910 over line 910b on a first in first out basis.

When it is desired to output all of the static and dynamic data accumulated for the various machine stations 50, the transaction register 910 is bypassed and the output of the message assembly register 76 appearing on line 77 is applied directly to the input of the output buffer 78. Message transfer is effected directly to the output buffer 78 when a transfer bid signal on line 76a is accepted. This mass readout may be taken either directly from the static and dynamic data memories or from the copy register 900 as previously described.

In practice, when it is desired to output the static and dynamic data accumulated up to the end of a work shift, and the output device 80 finally comes on line, the output buffer 78 is initially enabled to accept transfer of the assembled messages from the transaction register 910. After the transaction register 910 has been emptied, the output buffer 78 then accepts transfer of assembled messages from the message assembly register 76 which are then transmitted to the output device 80.

It has been found that the transaction register 910 is an important addition to the system even when the output device 80 is an on line teletypewriter. If the teletypewriter 80 is to be made always available to accept message transmissions, its motor must be continuously running. Manufacturers of teletypewriters generally recommend that it be serviced after 200 hours of operation. Thus, in order to extend the time between the required servicing of the teletypewriter 80, the transaction register 910 may be used to hold the assembled messages which have been read out at random during the work shift. During the time that the transaction register 910 is being filled, the teletypewriter 80 may be turned off. Only after the transaction register 910 is completely filled is the teletypewriter 80 turned on to print out the messages held in the transaction register 910.

*Summary*

From the foregoing description, it will be seen that the present invention provides a system and apparatus for continuously monitoring a plurality of remotely located stations from a centrally located point. The remote stations are monitored on an individual basis for randomly occurring events at each remote location. In the specifically disclosed application of the invention, the remote stations are machine stations 50 at which are located production machinery, and the random events are the productions of pieces and the conversions of the machinery from down time to elapsed time, and vice versa. It should be appreciated, however, that the invention is not limited by the particular form of the remote stations or the character of the random events.

The dynamic data, which, in the disclosed application is an accumulation of the piece count and the time count for the various machine stations is stored in circumferential tracks, piece count track 90c and time count track 90d, on the magnetic drum 90 (FIGURE 2A). This dynamic data, as well as the static data, could also be stored in other forms of memory devices such as magnetic disks, magnetic cores, delay lines of various types, etc.

The address register 54 (FIGURE 1) is the basic means for synchronizing the manifold operations of the system. In the specifically disclosed embodiment of the invention, the address register 54 contains address words corresponding to each machine station 50 recorded serially in the address track 90a on the drum 90. As the drum 90 rotates, the address words are read out in repeating sequence and used to effect interrogation of each corresponding machine station 50 in corresponding sequence. The piece count input PC1 and time count input TC1, resulting from each interrogation, indicate the then status of the interrogated machine station 50 and thus whether or not an event has occurred there since last interrogated. The piece count word stored in piece count track 90c and the time count word stored in time count track 90d corresponding to a particular machine station occupy assigned word slots which are read out at the time when that particular machine station is interrogated. The piece count input PC1 and the time count input TC1 determines whether or not the corresponding piece and time count words should be updated, i.e., augmented. Since the piece count and time count words are recorded in the same drum 90 as the corresponding address words, synchronism is always preserved.

The address register 54 further controls the entry of static data, i.e., employee, job and machine numbers, from the console 56 so that they will be recorded in assigned word slots corresponding to the various machine stations in their respective drum tracks 90g, 90f, and 90e. The various memories storing the static and dynamic data are associated memories, commonly addressed by the address register 54. The address register 50 thus is capable of locating the static and dynamic data recorded on the drum 90 for any selected one of the plurality of machine stations 50. This random access whether for entry or read out of static and dynamic data is an important feature of the invention. Moreover, the address register 50 further serves to distinguish the recorded data for one machine station from the recorded data for all other machine stations.

The piece and time count update logic principally function as serial adders shared by each machine station 50. They are operative to process the piece and time count words only when updating is called for. Otherwise, the piece and time count words are left in their assigned slots in their respective data tracks as previously recorded. The possibility of error is therefore held to a minimum. In the case of both the piece count and the time count a second drum track is provided in order that the read head and the write head operating in the main dynamic data track can be adequately spaced apart without requiring expensive delay circuitry in the serial adder logic.

In the illustrated embodiment of the invention the number of machine stations was conveniently chosen at one hundred which was given to be the number of words which can be recorded serially in one circumferential track on the drum 90. It will be appreciated that given the same drum capacity, the system is capable of being adapted to a greater or lesser number of machine stations. If the number of machine stations is less than one hundred, there would be a vertical section of the drum 90 as viewed in FIGURE 3 where no data is recorded. Each machine station would be interrogated once per revolution of the drum as before. If the number of machine stations is increased beyond one hundred, additional drum tracks would be used to store the address words, and the static and dynamic data words. During every other drum revolution the first one hundred machine stations would be interrogated, then during alternate drum revolutions the system would switch to these additional tracks, and the remaining machine stations would be interrogated.

The system as presently contemplated requires five drum spins in order to read out the static and dynamic data for a selected machine station. This time could be materially reduced if the individual words were recorded in staggered locations in the respective drum tracks rather than their disclosed parallel alignment. Using this technique, the individual words for a particular machine station could all be read out to the message assembly register in a fraction of a drum spin.

It will be appreciated that if the output device 80 is capable of accepting the messages least significant bit, least significant digit first, the output buffer 78 would not be needed to orient the transmission in parallel bit format, most significant digit first. The word order in which the messages are transmitted is purely arbitrary, usually determined by the user.

The particular logic elements disclosed as being employed in the system and apparatus should not be taken as limiting the invention. Moreover, the data processed and stored by the system could be coded in straight binary or other known code formats rather than in binary coded decimal format as disclosed. It will be further appreciated that the address message assembly, copy and transaction registers, and the output buffer could be adapted to use other forms of storage devices instead of drum tracks.

Rather than processing coded address words to effect the interrogation of corresponding machine stations, the address register could be adapted to count word pulses (or the like) prerecorded in the drum address track 90a. Word pulses read from the address track in sequence during a drum revolution could be used to step a counter rather than shifting addresses into the shift registers 228, 230 (FIGURES 9 and 10) to effect interrogation of the machine stations in corresponding sequence. In using this technique, it would be preferable to reset the counter or shift register to zero on the completion of each drum spin. The revolution marker pulse RM could be conveniently used to achieve this. In this way, the address register 54 would always be resynchronized at the beginning of each drum spin so that the first pulse read out in each drum revolution would effect the interrogation of the first machine station in the interrogation sequence.

It will thus be seen that the objects set forth above, among those made apparent from the preceding description, are efficiently attained and, since certain changes may be made in practicing the disclosed methods of monitoring and in the apparatus set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention which, as a matter of language, might be said to fall between the subject matter of the individual claims. The claims are intended to cover any system or apparatus employing means for providing the claimed signals or functions for similar purposes.

Particularly, it is to be understood that in said claims, elements, signals or functions recited in the singular are intended to include compatible combinations of equivalent elements, signals or functions wherever the sense permits.

Having described the invention, what is claimed as new and what it is that is desired to be secured by Letters Patent is:

1. A system for monitoring a plurality of stations and accumulating data as to events occurring at each of said stations, said system comprising, in combination,
   (A) cyclical address menas for generating an address corresponding to each station;
   (B) interrogating means operating in response to an address generated by said address means to periodically interrogate the corresponding station to determine if an event has occurred,
   (C) a cyclical memory operating in synchronism with said address means and storing accumulated data as to past events occurring at each corresponding station; and
   (D) data processing means connected to said interrogating means and operating in response to the interrogation of each station to augment the accumulated data in said memory corresponding to a station where an event has occurred since last interrogated.

2. The system defined in claim 1 wherein
   (1) said address means includes a magnetic memory,
   (2) said magnetic memory and said cyclical memory are associated magnetic memories.

3. The system defined in claim 2 and
   (E) means cooperating with said address means to provide random access to the accumulated data corresponding to any selected one of said stations.

4. A system for monitoring a plurality of stations and accumulating data as to events occurring at each of said stations, said system comprising, in combinaton,
   (A) an address register containing discrete addresses corresponding to each station;
   (B) interrogating means operating in response to an address read from said address register corresponding to a particular station to interrogate said particular station to determine if an event has occurred,
       (1) the interrogation of said stations performed in repeating sequence as synchronized by said address register;
   (C) a cyclical memory operating in synchronism with said address register and storing accumulated data as to past events occurring at each corresponding station, said memory having
       (1) an input and
       (2) an output;
   (D) data processing means connected to said interrogating means and to the output of said memory, said data processing means
       (1) operating in response to the interrogation of each station to augment the accumulated data corresponding to a station where an event has occurred, and apply the augmented accumulated data to the input of said memory for storage therein.

5. The system defined in claim 4 wherein
   (1) said address register and said memory are associated magnetic memories.

6. The system defined in claim 5 and,
   (E) means cooperating with said address register to provide for random access to the accumulated data corresponding to any selected one of said stations.

7. The system defined in claim 5 wherein
   (1) said memory is comprised of at least one circumferential data track on a magnetic drum.

8. The system defined in claim 7 wherein
   (1) said address register is comprised of at least one circumferential address track on said magnetic drum,
   (2) said accumulated data being stored serially in said data track and
   (3) said addresses being stored serially in said address track.

9. The system defined in claim 5 wherein
   (1) said accumulated data for a particular station is stored in a predermined location in said memory, and
   (2) said location of the accumulated data in said memory for any one station remaining constant.

10. The system defined in claim 9 wherein
    (1) the address for each said station is continuously held in a predetermined location in said address register, and
    (2) the address and the accumulated data for any one station are held in corresponding locations in said address register and said memory, respectively.

11. The system defined in claim 10 wherein
    (1) the accumulated data for said stations appears at said data processing means from the output of said memory substantially at the same time when the corresponding stations are being interrogated by said interrogating means.

12. The system defined in claim 11 wherein
    (1) said accumulated data held in said predetermined locations in said memory remain unchanged until an event occurs at the corresponding station.

13. The system defined in claim 12 wherein
    (1) said data processing means is inoperative to process the accumulated data for a station until an event occurs at said station, whereby the accumulated data remains as entered into said memory when last augmented.

14. A system for monitoring a plurality of remote stations and accumulating data as to events occurring at each said remote station, said system comprising, in combination,
    (A) an address register containing an address corresponding to each remote station;
    (B) a scanner responsive to said addresses read in repeating sequence from said address register, said scanner including
       (1) a plurality of scanner output lines,
          (a) said scanner output lines being activated sequentially one at a time as determined by the addresses read from said address register,
          (b) each scanner output line corresponding to one of said remote stations,
    (C) individual switching means corresponding to each of said plurality of remote stations, each said switching means
       (1) operated from its corresponding remote station when an event occurs, and
       (2) electrically connected to a corresponding scanner output line such that said scanner output line, when activated, interrogates the corresponding remote station,
       (3) the interrogation of said remote stations in sequence causing the generating of status signals appearing serially on a common output line,
    (D) a cyclical memory operating in synchronism with said address register and storing accumulated data as to past events occurring at each remote station,
       (1) said accumulated data for each said remote station including a status digit indicative of the previous status of each remote station when last interrogated; and
    (E) data processing means, said data processing means including
       (1) a detector for comparing the status digit stored said memory and the status signal pertaining to one of said remote stations, and
       (2) update circuitry connected to said detector and operating to augment the accumulated data for said corresponding remote station when said detector indicates that a change of status, and therefore an event has occurred at said corresponding remote station since last interrogated.

15. The system defined in claim 14 wherein
    (1) said update circuitry operates in response to each status signal to enter a new status digit in lieu of the old status digit to indicate the present status of each interrogated remote station.

16. The system defined in claim 15 wherein said addresses are held in said address register in coded format, said scanner further operating
    (1) to decode said addresses read in sequence from said address register in order to activate said scanner output lines in corresponding sequence.

17. A system for monitoring a plurality of stations and accumulating data as to events occurring in each of said stations, said system comprising, in combination
    (A) interrogating means operating to periodically interrogate each station in sequence to determine if an event has occurred at any of said stations;
    (B) a cyclical magnetic memory synchronized to said interrogating means and including
       (3) a first track having
          (a) a discrete location assigned to each station for containing accumulated data of past events having occurred at each corresponding station,
       (2) a first write head and a first read head operating in said first track,
       (3) a second track,
       (4) a second write head and a second read head operating in said second track, and
       (5) said first read head operating in said first track to read out the accumulated data for recording in said second track by said second write head; and
    (C) a serial adder including
       (1) a first input connected to said second read head,
       (2) a second input connected to said interrogating means,
       (3) an output connected to said first write head,
       (4) said adder operating in response to said interrogating means to augment the accumulated data for an interrogated station and record the augmented accumulated data in said first track in the location assigned to said interrogated station when an event has occurred at said interrogated station since last interrogated.

18. The system defined in claim 17 wherein
    (1) said output of said adder is disabled when it is determined as the result of the interrogation of a station that no event has occurred since said station was last interrogated, whereby the accumulated data for said interrogated station remains in its assigned location in said first track as recorded by said adder when an event last occurred there.

19. The system defined in claim 18 wherein
    (1) said accumulated data for each station is read from said second track by said second read head to appear at said first input of said adder when each corresponding station is being interrogated by said interrogating means.

20. The system defined in claim 19 wherein
    (1) said accumulated data for each station is in the form of a discrete word comprised of a plurality of digits, one of said digits being a status digit indicative of the status of the corresponding station when last interrogated,
    (2) said interrogating means generating a status signal indicative of the present status of the interrogated station,
    (3) said adder further including a detector for comparing the status signal appearing at said second input with the status digit appearing at said first input corresponding to the interrogated station to determine if a change in status exists and therefore an event has occurred at the interrogated station since last interrogated.

21. The system defined in claim 20 wherein
(1) said output of said adder is always enabled to record the appropriate status digit as determined by the corresponding status signal in its assigned location in said first track and only enabled to record accumulated data in said first track for the interrogated station when an event has occurred since last interrogated.

22. The system defined in claim 21 wherein said words are recorded in said first and second tracks, and processed in said adder in serial binary coded decimal format, said adder further including
(1) a shift register connected to said first input for temporarily holding each digit of said words,
(2) a digit carry generator connected to said shift register and said detector, and
(3) a bit carry generator connected to said digit carry generator and said shift register,
(a) said digit carry generator and said bit carry generator operating in concert to augment said words when an event has occurred at the corresponding stations as detected by said detector,
(4) said detector being connected to said shift register in order to compare said status digits and said status signals.

23. The system defined in claim 22 which further includes
(D) an address register containing discrete address words corresponding to each station,
(1) said address words being recorded in a third track included in said magnetic memory,
(2) the address word recorded in said third track and the accumulated data recorded in said first track for any one station are located in fixed corresponding locations
(3) said interrogating means operating in response to an address word read from said third track to interrogate the corresponding station.

24. The system defined in claim 23, and
(E) means cooperating with said address register to provide random access to accumulated data for any selected one of said stations.

25. Apparatus for counting signals appearing at a plurality of terminals, said apparatus comprising, in combination,
(A) a first cyclical memory containing addresses corresponding to each one of said plurality of terminals;
(B) means operating in response to addresses read from from said first cyclical memory to sample the signal conditions at said terminals in repeating sequence;
(C) a second cyclical memory operating in synchronism with said first cyclical memory and accumulating signal counts of the signals appearing at each corresponding terminal; and
(D) an adder connected to said sampling means and operating to augment the accumulated signal count in said second memory corresponding to those terminals at which the signal condition has changed from a first signal level to a second signal level between samplings by said sampling means.

26. A system for monitoring a plurality of production machines and accumulating counts as to the number of pieces produced by each said machine, said system comprising, in combination,
(A) an address register containing addresses corresponding to each machine;
(B) interrogating means operating in response to an address read from said address register to interrogate said corresponding machine to determine if a piece has been produced,
(1) the interrogation of said machines being accomplished in repeating sequence as synchronized by said address register;
(C) a cyclical memory operating in synchronism with said address register and storing accumulated piece counts as to the number of pieces produced by each corresponding machine, said memory having
(1) an input and
(2) an output;
(D) a serial adder connected to said interrogating means and to the output of said memory, said adder
(1) operating in response to the interrogation of each machine in sequence to augment the accumulated piece count for the interrogated machine and apply the augmented accumulated piece count to the input of said memory for storage therein when a piece has been produced by the interrogated machine since last interrogated.

27. The system defined in claim 26 wherein the accumulated piece counts for each machine are always stored in assigned locations in said memory, and said address register and said memory are associated cyclical magnetic memories, and
(E) means cooperating with said address register to provide for random access to the accumulated piece counts for any selected one of said machines.

28. Apparatus for timing the durations of signal appearing at a plurality of terminals, said apparatus comprising, in combination,
(A) a first cyclical memory containing addresses corresponding to each one of said plurality of terminals;
(B) means operating in response to addresses read from said first memory to sample the signal condition at said terminals in repeating sequence;
(C) a second cyclical memory operating in synchronism with said first cyclical memory and accumulating time counts of the signal durations at each corresponding terminal;
(D) a timing source operating to periodically generate a timing pluse; and
(E) an adder connected to said sampling means and operating in response to each timing pulse to augment the accumulated time counts in said second memory corresponding to those terminals at which a signal appears as determined by said sampling means during one complete sampling sequence.

29. The apparatus defined in claim 28 wherein each said accumulated time count in said second memory includes a first count portion of the time duration a signal appears at a corresponding terminal and a second count position of the time duration a signal does not appear at said corresponding terminal, said adder
(1) operating in response to each said timing pulse to augment either said first count portion or said second count portion of said accumulated time counts in said second memory according to whether a signal appears or does not appear at said corresponding terminals as determined by said sampling means during one complete sampling sequence.

30. A system for monitoring a plurality of operating stations and accumulating a count of the operating time of each said station, said system comprising, in combination,
(A) an address register containing addresses corresponding to each said station;
(B) interrogating means operating in response to an address read from said address register to interrogate the corresponding station to determine if the interrogated station is operating,
(1) the interrogation of said stations being accomplished in repeating sequence synchronized by said address register;
(C) a cyclical memory operating in synchronism with said address register and storing accumulated time counts as to the operating time of each said station, said memory having (1) an input and
(2) an output;
(D) a timing source periodically generating timing pulse; and
(E) a serial adder connected to said interrogating means, said memory, and to said timing source, said adder
  (1) operating in response to the receipt of a timing pulse to augment in one interrogation sequence the accumulated time count for those stations in operation as determined from said interrogating means, and apply the augmented accumulated time count to the input of said memory for storage therein.

31. A system for monitoring a plurality of stations and accumulating the nonoperating time of each said station, said system comprising, in combination,
(A) an address register containing addresses corresponding to each said station;
(B) interrogating means operating in response to an address read from said address register to interrogate the corresponding station to determine if the interrogated station is nonoperating,
  (1) the interrogation of said stations being accomplished in repeating sequence synchronized by said address register;
(C) a cyclical memory operating in synchronism with said address register and storing accumulated time counts as to the nonoperating time of each said station, said memory having
  (1) an input and
  (2) an output;
(D) a timing source periodically generating timing pulses; and
(E) a serial adder connected to said interrogating means, said memory, and to said timing source, said adder
  (1) operating in response to the receipt of a timing pulse to augment in one interrogation sequence the accumulated nonoperating time count for those stations nonoperating as determined from said interrogating means, and apply the augmented accumulated time count to the input of said memory for storage therein.

32. A system for monitoring the status conditions at a plurality of operating stations and accumulated time counts of the time duration each machine operates in a plurality of different status conditions, said system comprising, in combination,
(A) a cyclical address register containing addresses corresponding to each said station;
(B) interrogating means operating in response to addresses read from said address register to interrogate said corresponding stations in repeating sequence to determine the status condition at each station;
(C) a cyclical memory operating in synchronism with said address register and storing accumulated time counts of the time duration each station operated in each one of said different status conditions;
(D) a timing source periodically generating timing pulses; and
(E) an adder connected to said interrogating means, said cyclical memory, and to said timing source, said adder
  (1) operating in response to the receipt of a timing pulse to sequentially augment during one full cycle of said memory the accumulated time count of the particular status condition stored in said memory determined by said interrogating means as prevailing at each corresponding interrogated station.

33. A system for monitoring a plurality of operating stations and accumultaing the operating and non-operating time of each said station, said system comprising, in combination,
(A) an address register containing addresses corresponding to each said station;
(B) interrogating means operating in response to an address read from said address register to interrogate the corresponding station to determine if the interrogated station is operating;
  (1) the introgation of said stations being accomplished in repeating sequence synchronized by said address register;
(C) a cyclical memory operating in synchronism with said address register and storing accumulated time counts as to the operating and non-operating time of each said station, said memory having
  (1) an input and
  (2) an output;
(D) a timing source periodically generating timing pulses; and
(E) a serial adder connected to said interrogating means, said memory, and to said timing source, said adder
  (1) operating in response to the receipt of a timing pulse to sequentially augment either the accumulated operating time count or the accumulated non-operating time count for each interrogated station as determined from said interrogating means, and apply the augmented accumulated time count to the input of said memory for storage therein.

34. The system defined in claim 33 wherein
(1) said adder is disabled from augmenting the time count as stored in said cyclical memory for those stations which are not supposed to be operating.

35. The system defined in claim 34 wherein the accumulated time count for each station is always stored in an assigned location in said cyclical memory, and said address register and said memory are associated cyclical magnetic memories, and
(F) means cooperating with said address register to provide for random access to the accumulated time count for any selected one of said stations.

36. A system for monitoring a plurality of machines and accumulating time counts as to the productive and nonproductive operating times of each said machine, said system comprising, in combination,
(A) interrogating means operating to periodically interrogate each machine in sequence to determine if the interrogated machine is on productive or nonproductive time;
(B) a cyclical magnetic memory synchronized to said interrogating means and including
  (1) a first track having
    (a) a discrete location assigned to each machine for containing accumulated time counts of the time each machine was on productive time and nonproductive time in the past,
  (2) a first write head and a first read head operating in said first track,
  (3) a second track,
  (4) a second write head and a second read head operating in said second track, and
  (5) said first read head operating in said first track to read out the time counts for recording in said second track by said second write head;
(C) a timing source periodically generating timing pulses
(D) a serial adder including
  (1) a first input connected to said second read head,
  (2) a second input connected to said interrogating means,
  (3) a third input connected to said timing source, and (4) an output connected to said first write head, (5) said adder operating in response to said interrogating means and a timing pulse to sequentially augment either the accumulated productive time count or the accumulated nonproductive time count for each interrogated machine as determined from said interrogating means in one full cycle of said cyclical memory and record the augmented time count in said first track in the location assigned to said interrogated machine.

37. The system defined in claim 36 wherein
(1) said adder is controlled so as not to augment the accumulated time count corresponding to those interrogated machines not turned on.

38. The system defined in claim 37 which further includes
(E) an address register containing discrete address words corresponding to each machine,
   (1) said address words being recorded in a third track included in said magnetic memory,
   (2) the address word recorded in said third track and the time count recorded in said first track for any one machine are located in fixed corresponding locations,
   (3) said interrogating means operating in response to an address word read from said third track to interrogate the corresponding machine.

39. The system defined in claim 38, and
(E) means cooperating with said address register to provide for random access to the time count recorded in said first track for any selected one of said machines.

40. The system defined in claim 39 wherein
(1) said time count for each machine is in the form of a word having
   (a) a first plurality of digits devoted to the accumulated productive time and
   (b) a second plurality of digits devoted to the accumulated nonproductive time.

41. The system defined in claim 39 wherein each digit of said time count words is recorded and processed in serial binary format, said adder further including
(1) a shift register for temporarily holding the digits of said time count words read from said second track by said second read head,
(2) an update detector connected to said interrogating means and generating
   (a) a first update signal for those interrogated machines on productive time, and
   (b) a second update signal for those interrogated machines on nonproductive time,
(3) a digit carry generator connected to said shift register and said update detector,
(4) a bit carry generator connected to said digit carry generator, said shift register and said update detector,
   (a) said bit carry generator and said digit carry generator operating in concert to
      (i) augment the accumulated productive time digits of each time count word in response to said first update signal, and
      (ii) augment the accumulated nonproductive time digits of each time count word in response to said second update signal, and
(5) a record enable circuit enabling said first write head to record augmented time count words in said first track for one full cycle of said magnetic memory in response to each timing pulse.

42. A system for monitoring a plurality of operating stations, and accumulating the operating and nonoperating times of each said station, said system comprising, in combination,
(A) an address register containing discrete address words corresponding to each said station;

(B) a scanner responsive to address words read in repeating sequence from said address register, said scanner including
   (1) a plurality of scanner output lines, said output lines,
      (a) being activated sequentially one at a time as determined by the address words read from said address register,
      (b) each scanner output line corresponding to a particular one of said stations;
(C) individual switching means associated with each one of said plurality of stations, each said switching means including
   (1) a first switch operated from its associated station according to whether said associated station is on operating time or on nonoperating time,
   (2) a second switch operated from said associated station according to whether said associated station is turned on or turned off, and if turned off therefore on neither operating time nor nonoperating time,
   (3) said first switch being electrically connected to one of said scanner output lines such that said scanner output line, when activated, interrogates said associated station to determine if said associated station is on operating time or nonoperating time,
      (a) the interrogation of said stations in sequence causing the generation of status signals appearing serially on a common output line,
   (4) said second switch operating to inhibit the generation of a status signal when said associated station is not turned on,
(D) a cyclical memory operating in synchronism with said address register and storing accumulated time counts as to the time each station was on operating time and on nonoperating time, said memory having
   (1) an input and
   (2) an output;
(E) a timing source periodically generating timing pulses; and
(F) a serial adder connected to said interrogating means, said memory, and to said timing source, said adder
   (1) operating in response to the receipt of a timing pulse to sequentially augment either the accumulated operating time count or the accumulated nonoperating time count for each interrogated station as determined by said status signals during one full cycle of said memory, and return the augmented accumulated time count to the input of said memory for storage therein,
   (2) said adder being disconnected from the input of said memory during the interval between timing pulses, and
   (3) said adder operating in response to a timing pulse and the absence of a status signal to return the accumulated time count corresponding to a machine not turned on to the input of said memory unaugmented.

43. A system for monitoring a plurality of operating stations, accumulating the operating and nonoperating time of each said station, and accumulating data as to events occurring at each said station, said system comprising, in combination,
(A) a cyclical address register containing addresses corresponding to each said station;
(B) interrogating means operating in response to address read from said address register to interrogate said corresponding stations in repeating sequence to determine
   (1) if the interrogated station is operating, and (2) if an event has occurred since last interrogated;

(C) a first cyclical memory operating in synchronism with said address register and storing accumulated data as to past events occurring at each corresponding station;

(D) a second cyclical memory operating in synchronism with said address register and storing accumulated time counts as to the operating and nonoperating time of each corresponding station;

(E) a serial adder connected to said interrogating means operating in response to the interrogation of each station to augment the accumulated data in said memory corresponding to a station where an event has occurred since last interrogated;

(G) a second serial adder connected to said interrogating means, and operating in response to each timing pulse from a timing pulse source to augment during one full interrogation sequence either the accumulated operating time count or the accumulated nonoperating time count for each interrogated station as determined from said interrogating means.

44. The system defined in claim 43 and (H) means cooperating with said address register to provide for random access to the accumulated data stored in said first cyclical memory and the accumulated time count stored in said second cyclical memory for any selected one of said stations.

45. A system for monitoring a plurality of stations and accumulating data as to events occurring at each of said stations, said system comprising, in combination, (A) cyclical address means generating an address corresponding to each station;

(B) interrogating means operating in response to an address generated by said address means to periodically interrogate the corresponding station to determine if an event has occurred, (C) a first cyclical memory operating in synchronism with said address means and storing accumulated data as to past events occurring at each corresponding station;

(D) a serial adder connected to said interrogating means and operating in response to the interrogation of each station to augment the accumulated data in said memory corresponding to the interrogated station where an event has occurred since last interrogated;

(E) a second cyclical memory operating in synchronism with said address means; and (F) a console for generating static data relating to each station, said console
(1) selectively operating when a selected station is interrogated to enter static data relating to said selected station into said second cyclical memory.

46. The system defined in claim 45 wherein (1) said address means and said console further operating to provide for random access into said first and second memories for accumulated data and static data corresponding to any selected one of said stations.

47. A system for monitoring a plurality of stations and accumulating data as to events occurring at each of said stations, said system comprising, in combination, (A) an address register containing discrete address words corresponding to each station;

(B) interrogating means operating in response to said address words read in repeating sequence from said address register to interrogate said stations in corresponding repeating sequence;

(C) means for selecting any one of said stations,
(1) said means operating in response to the interrogation of said selected station;

(D) a first cyclical memory synchronized to said address register (E) means operating when said selected station is interrogated to enter static data relating to said selected station into said first cyclical memory;

(F) a second cyclical memory synchronized to said address register and accumulating data relative to events having occurred at each said station; and (G) data processing means connected to said interrogating means and operating in response to the interrogation of each station to augment the accumulated data in said second cyclical memory corresponding to a station where an event has occurred since last interrogated;

(H) said address words, said static data, and said accumulated data for any one station occupying fixed corresponding locations in said address register, said first cyclical memory and said second cyclical memory, respectively.

48. The system defined in claim 47 wherein
(1) said address register, said first cyclical memory and said second cyclical memory are associated magnetic memories and, (I) means responsive to said address words located in said address register to provide random access to the static data and the accumulated data stored in said first and second cyclical memories for any selected one of said stations.

49. The system defined in claim 48 wherein
(1) said address register, said first cyclical memory and said second cyclical memory are each at least one circumferential track on a magnetic drum.

50. A system for monitoring a plurality of stations and accumulating data as to events occurring at each of said stations, said system comprising, in combination, (A) a cyclical address register containing address words corresponding to each said station;

(B) a scanner responsive to address words read in repeating sequence from said address register, said scanner including
(1) a plurality of scanner output lines,
(a) said scanner output lines being activated in sequence as determined by the address words read from said address register,
(b) each scanner output line corresponding to one of said stations;

(C) a console selectively operating to generate static data pertaining to each of said stations;

(D) an array of switching means,
(1) one of said switching means being associated with each said station,
(2) each switching means including a first switch operated from a corresponding station when an event occurs, and
(3) a second switch operated from said console to select one of said stations,
(a) said first and second switches of each switching means being connected to one of said scanner output lines such that said scanner output line, when activated, interrogates the associated station to generate
(i) a status signal according to the condition of said first switch, and
(ii) a selected address signal to said console if said interrogated station was selected, (E) a first cyclical memory operating in synchronism with said address register and storing accumulated data as to past events occurring at each station, (F) data processing means operating in response to said status signal corresponding to each said station to augment the accumulated data in said first memory corresponding to those stations where events have occurred since last interrogated; and (G) a second cyclical memory connected to said console for storing static data pertaining to selected stations generated by said console in response to a selected address signal.

51. The system defined in claim 50 wherein
 (1) said address register, said first memory, and said second memory are separate circumferential tracks on a magnetic drum,
 (2) said address information, said accumulated data and said static data corresponding to a particular station occupying fixed corresponding locations in their respective tracks on said drum.

52. The system defined in claim 51 wherein
 (1) said console includes stepping means for automatically and sequentially operating said second switches in each switching means to sequentially select said stations for entry of static data into said second memory when said selected stations are interrogated during successive interrogation sequences.

53. A system for monitoring a plurality of stations, and accumulating static and dynamic data corresponding to each said station, wherein said dynamic data pertains to events occurring at each station and said static data pertains to relatively fixed conditions prevailing at each station, said system comprising, in combination,
 (A) a cyclical address register containing addresses corresponding to each station;
 (B) interrogating means operating in response to said addresses read from said address register to periodically interrogate each corresponding station in sequence to determine if an event has occurred;
 (C) a first cyclical memory operating in synchronism with said address register and storing dynamic data as to past events occurring at each corresponding station;
 (D) data processing means connected to said interrogating means and operating in response to the interrogation of each station to augment the dynamic data in said memory corresponding to a station where an event has occurred since last interrogated;
 (E) a second cyclical memory synchronized to said address register and operating to store static data corresponding to each station; and
 (F) a console including
  (1) a control panel having
   (a) means connected to said interrogating means for selecting a particular one of said stations, and
   (b) generating means for generating static data corresponding to said selected station;
  (2) static data entry means having
   (a) a first input connected to said interrogating means to receive a selected address signal when said selected station is interrogated,
   (b) a second input connected to said control panel to receive the static data corresponding to said selected station generated by said control panel, and
   (c) an output connected to said second memory for entering said static data into said second memory for storage therein.

54. The system defined in claim 53 wherein
 (1) said address register, said first memory and said second memory are associated magnetic memories, and
 (2) said address, said dynamic data and said static data corresponding to any one station occupy fixed corresponding locations in their respective memories.

55. The system defined in claim 54 wherein
 (1) said control panel further operates in conjunction with said address register to provide random access to the static and dynamic data in said second and first memories, respectively, corresponding to any selected one of said stations.

56. The system defined in claim 55 wherein
 (1) said static and dynamic data are in the form of words comprised of pluralities of digits, said words being coded in serial binary coded decimal format.

57. The system defined in claim 56 wherein said control panel further includes
 (c) an array of decimal digit switches, and
 (d) a decimal digit driver responsive to selected address signals for sequentially pulsing said decimal digit switches so as to generate the individual digits of a static data word in decimal format,
  (i) one of said digits being generated each time said selected station is interrogated, and
 wherein said static data entry means further includes
 (e) a decimal to binary coded decimal encoder connected to the outputs of said decimal digit switches to convert said decimal digits to binary coded decimal digits; and
 (f) an entry enable circuit operating to enable the entry of said binary coded decimal digits from said encoder into said second memory during the time duration of said selected address signal.

58. The system defined in claim 57 which further includes,
 (G) means generating digit timing pulses,
  (1) said entry enable circuit being controlled by said digit timing signals and said digit driver so as to enable the entry of a digit from said encoder during a particular portion of the selected address signal time whereby particular digits of a static data word are entered in proper locations in said second cyclical memory.

59. The system defined in claim 58 which further includes,
 (H) stepping means operating to select said stations in automatic sequence,
  (1) said stepping means being responsive to said digit driver to automatically select a next station after the last digit of a static data word has been entered into said second memory for the previously selected station.

60. The system defined in claim 59 wherein there are a plurality of static data words corresponding to each station and a corresponding plurality of cyclical memories for storing said static data words,
 (1) said plurality of static data memories being synchronized to said address register and
 (2) said static data words are stored in their respective memories in fixed locations corresponding to the fixed location of the address in said address register for any one of said stations.

61. The system defined in claim 60 which further includes
 (I) a word select circuit
  (1) selectively operated to individually select any one of said first memory and said plurality of memories storing static data words for entry of selected data words from said console during the times when a selected station is interrogated.

62. A system for monitoring a plurality of operating stations, and accumulating various types of data corresponding to each said station, said system comprising, in combination,
 (A) a cyclical address means generating addresses corresponding to each station;
 (B) interrogating means operating in response to said addresses generated by said address means to periodically interrogate corresponding stations in sequence;
 (C) a first cyclical memory operating in synchronism with said address means and connected to said interrogating means for storing accumulated data of a first type corresponding to each said station;
 (D) a second cyclical memory operating in synchronism with said address means and connected to said interrogating means for storing data of a second type corresponding to each station;

(E) means connected to said interrogating means for selecting one of said stations for read out of the data in said first and second memories corresponding thereto;

(F) a message assembly register controlled by said selecting means to
  (1) accept said first and second types of data read from said first and second memories corresponding to a station selected for read out during the time said selected station is interrogated by said interrogated means, and
  (2) arrange accepted first and second types of data in a predetermined order to form a message; and (G) an output buffer connected to said message assembly register for transmitting assembled messages transferred from said message assembly register to an output device in a predetermined format.

63. The system defined in claim 61 wherein
(1) said first and second cyclical memories and said address means are associated cyclical magnetic memories,
(2) said first and second types of data, and said address corresponding to any one station occupy fixed corresponding locations in their respective magnetic memories.

64. The system defined in claim 3 which further includes
(H) a transaction register connected to said message assembly register for storing a plurality of assembled messages,
  (1) said plurality of assembled messages being transferred one at a time to said output buffer at the request of said output buffer.

65. The system defined in claim 63 which further includes
(H) a cyclical copy register synchronized to said address means, said copy register adapted to
  (1) accept mass transfer of said first and second types of data from said first and second memories for all of said stations
  (2) said first and second types of data for any one station occupy fixed locations in said copy register corresponding to their fixed locations in said first and second memories, respectively
  (3) said message assembly register being further controlled by said selecting means to accept first and second types of data for selected stations from said copy register for assembly into messages.

66. The system as defined in claim 64 which further includes
(I) a cyclical copy register synchronized to said address means, said copy register adapted to
  (1) accept mass transfer of said first and second types of data from said first and second memories for all of said stations
  (2) said first and second types of data for any one station occupy fixed locations in said copy register corresponding to their fixed locations in said first and second memories, respectively
  (3) said message assembly register being further controlled by said selecting means to accept first and second types of data for selected stations from said copy register for assembly into messages.

67. The system defined in claim 66 wherein
(1) said message assembly register includes a first recirculating line in which said first and second types of data are arranged and stored in message order, and
(2) said output buffer includes a second recirculating line storing an assembled message for ultimate transmission to said output device.

68. The system defined in claim 66 wherein
(1) separate circumferential tracks on a magnetic drum are provided to store
  (a) said addresses in said address means,
  (b) said first type data in said first memory,
  (c) said second type data in said second memory,
  (d) said first type data in said copy register
  (e) said second type data in said copy register
  (f) said assembled messages in said message assembly register
  (g) said assembled messages in said transaction register, and
  (h) said assembled messages in said output buffer.

69. A system for monitoring a plurality of stations, and accumulating static and dynamic data corresponding to each said station, wherein said dynamic data pertains to different events occurring at each station and said static data pertains to relatively fixed conditions prevailing at each station, said system comprising, in combination,
(A) a cyclical address register containing addresses corresponding to each station;
(B) interrogataing means operating in response to said addresses read from said address register to periodically interrogate corresponding stations in sequence to determine if an event has occurred;
(C) first cyclical memories operating in synchronism with said address register and separately storing accumulated dynamic data as to the different events occurring at each corresponding station;
(D) data processing means connected to said interrogating means and operating in response to the interrogation of each station to augment the separate accumulated dynamic data in said first memories corresponding to those stations where said different events have occurred as determined by said interrogating means;
(E) second cyclical memories operating in synchronism with said address register for storing static data corresponding to each station;
(F) means connected to said interrogating means for
  (1) individually selecting said stations for entry of static data into said second cyclical memory when said selected station is interrogated and
  (2) further individually selecting said stations for which static and dynamic data is to be read out from said first and second memories;
(G) a message assembly register controlled by said station selecting means to
  (1) accept the static and dynamic data for a selected station read out from said first and second memories during the time said selected station is interrogated by said interrogated means, and,
  (2) arrange said accepted static and dynamic data in a predetermined format to form a message; and
(H) an output buffer connected to said message assembly register for transmitting assembled messages transferred from said message assembly register to an output device in a predetermined format.

70. The system defined in claim 69 wherein
(1) said station selecting means includes operating means to select said stations for readout of static and dynamic data in automatically continuing continuing succession, said operating means
  (a) being controlled from said output buffer to automatically select the next station in said succession when the assembled message corresponding to the previous station in said succession has been transferred from said message assembly register to said output buffer.

71. The system defined in claim 70 which further includes (I) data selection means controlling said message assembly register to accept said static and dynamic data from said first and second memories for a selected station in predetermined sequence.

72. The system defined in claim 71 which further includes (J) erasing means controlled by said station selecting means and said data selecting means to erase static and dynamic data read out from said first and second memories to said message assembly register.

73. The system defined in claim 71 which further ncludes (J) display means connected to said message assembly register for visually displaying selected data of selected stations.

74. The system defined in claim 73 wherein (1) said message assembly register includes means for sending a bid to transfer signal to said output buffer when a message has been assembled, and
(2) said output buffer includes means responsive to said bid to transfer signal to condition said output buffer to accepted transfer of a message from said message assembly register after a previously transferred message has been transmitted to said output device.

75. The system for monitoring a plurality of stations, and accumulating static and dynamic data corresponding to each station, wherein said dynamic data pertains to events occurring at each station and said static data pertains to relatively fixed conditions prevailing at each station, said system comprising, in combination, (A) a magnetic drum,
(B) an address register containing addresses corresponding to each station,
   (1) said addresses being recorded in predetermined locations in a first track section on said magnetic drum;
(C) interrogating means responsive to said addresses read sequentially from said first track section to periodically interrogate said corresponding stations in corresponding sequence;
(D) a first cyclical memory accumulating dynamic data of past events occurring at each said station,
   (1) said dynamic data being recorded in predetermined locations in a second track section on said drum;
(E) a serial adder connected to said interrogating means and operating to augment the accumulated dynamic data for an interrogated station where an event has occurred since last interrogated;
(F) a second cyclical memory for storing static data for each station,
   (1) said static data being recorded in predetermined locations in a third track section on said magnetic drum;
(G) a console connected to said interrogating means for
   (1) selecting one of said stations,
   (2) said interrogating means operating to generate a selected address signal each time a selected station is interrogated;
(H) a message assembly register including
   (1) gating means responsive to said selected address signal to accept said static and dynamic data for a selected station during successive interrogations of said selected station,
   (2) said message assembly register operating to record said static and dynamic data in predetermined locations in a fourth track section on said magnetic drum,
     (a) said predetermined locations being relatively located in said fourth track section whereby said static and dynamic data is recorded therein in a predetermined message format; and
(I) an output buffer operating to accept the transfer of an assembled message from said message assembly register,
   (1) said transferred message being recorded in a fifth track section on said magnetic drum,
   (2) said message being recirculated in said fifth track section for ultimate transmission to an output device in a format acceptable to said output device.

76. The system defined in claim 75 wherein (1) the address, the dynamic data, and the static data for any one station occupying fixed corresponding locations in their respective track sections.

77. The system defined in claim 76; and (J) a copy register for accepting mass transfer of said dynamic and static data stored in said first and second memories, said copy register including
   (1) a sixth track section on said drum for storing dynamic data in fixed locations corresponding to their fixed locations in said second track section, and
   (2) a seventh track section on said drum for storing static data in fixed locations corresponding to their fixed locations in said third track section.

78. The system defined in claim 77 wherein (1) said message assembly register is controlled from said console to
   (a) accept dynamic and static data from said first and second memories in a first operating mode, and
   (b) accept dynamic and static data from said copy register in a second operating mode.

79. The system defined in claim 76, and (J) a transaction register for storing a plurality of assembled messages transferred from said message assembly register in a sixth track section on said drum;
   (1) said output buffer controlled from said console to
     (a) accept transfer of an assembled message from said message assembly register in a first operating mode, and
     (b) accept transfer of an assembled message from said transaction register in a second operating mode.

80. The system defined in claim 77, and (K) a transaction register for storing a plurality of assembled messages transferred from said message assembly register in a seventh track section on said drum;
   (1) said output buffer controlled from said console to
     (a) accept transfer of an assembled message from said message assembly register in a first operating mode, and
     (b) accept transfer of an assembled message from said transaction register in a second operating mode.

81. A message assembly apparatus for assembling selected words received from a plurality of separate word sources into predetermined word order to form a message, said register comprising, in combination, (A) a word selector operating to accept selected words from said word sources;
(B) a hold register connected to said word selector for temporarily storing a word accepted by said word selector;
(C) a storage device capable of storing at least one full message in serialized word order, said storage device
   (1) connected to the output of said hold register, and (2) providing predetermined word locations arranged in message order for storing words of of a message;

(D) a word counter operating in synchronism with said storage device to designated said predetermined word locations in said storage device;

(E) a word locator connected to said word selector to identify the word source of each word accepted by said word selector to be held in said hold register;

(F) gating means receiving inputs from said word counter and said word locator, said gating means operating
  (1) to initiate readout of the word held in said hold register for storage in an appropriate one of said predetermined word locations in said storage device.

82. The apparatus defined in claim 81 which further includes
(G) a recirculate circuit
  (1) normally operating to connect the output of said storage device back to the input thereof to recirculate the words of a message in message order, and
  (2) operating in response to said gating means to disconnect the output of said storage device from the input thereof and connect the output of said hold register to the input of said storage device in order to read out a word held in said hold register into said storage device.

83. The apparatus defined in claim 82 wherein said storage device includes
  (1) a track on a magnetic drum,
  (2) a read head operating in said track as the output of said storage device,
  (3) a write head operating in said track as the input of said storage device
  (4) said read and write being spaced apart in said track a distance equal to the length of a message recorded serially in said track.

84. Apparatus for transmitting to an output device in reverse serial order the message units forming a serial message, said apparatus comprising in combination,
(A) a shift register for storing message units of a message in serial order having
  (1) an input,
  (2) an output, and
  (3) a capacity equal to the serial length of message stored therein;
(B) a second register having
  (1) an input connected to the output of said first shift register,
  (2) an output, and
  (3) a capacity of one message unit;
(C) a recirculate circuit normally operating to connect the input and output of said shift register together so as to recirculate said message repeatedly through said shift register;
(D) means for identifying a selected message unit storage location in said shift register;
(E) a control circuit
  (1) responsive to said identifying means and to a request signal from an output device to connect said shift register and said second register in series to recirculate the message through both said registers in series
    (a) whereby the entire message is delayed one message unit time in said registers to shift the last message unit into said selected message unit storage location,
  (2) said control circuit disconnecting said second register and reconnecting the input and output of said shift register in series when the last message unit of the message is read from said selected message unit storage location into said second register,
    (a) whereby the last message unit may be read from said second register for transmission to said output device.

85. The apparatus defined in claim 84 wherein
  (1) said message unit is read out in parallel from said second register for transmission to said output device.

86. The apparatus defined in claim 85 wherein
  (1) said shift register is comprised of a circumferential track on a magnetic drum,
  (2) a magnetic write head operating in said track as the input of said shift register, and
  (3) a magnetic read head operating in said track as the output of said shift register,
  (4) said magnetic read and write heads being spaced apart by a distance equal to the length of a message recorded in said track.

87. An output buffer for transmitting messages to an output device wherein said messages are comprised of words arranged in a predetermined serial word order and said words are comprised of digits arranged in serial order from least significant digit first to most significant digit last, and wherein said output device is adapted to accept the digits of each word in the order most significant digit first to least significant digit last, said output buffer comprising in combination
(A) a message shift register for storing said message in reverse word order from that acceptable by said output device, said memory having
  (1) an input,
  (2) an output, and
  (3) a storage capacity exactly equal to the serialized length of said message as stored therein,
(B) a digit shift register having a length sufficient to store one digit, said digit shift register having
  (1) an input connected to said output of said message shift register and
  (2) an output;
(C) a recirculate circuit having
  (1) a first input connected to the output of said message shift register,
  (2) a second input connected to the output of said digit shift register, and
  (3) an output connected to the input of said message shift register,
  (4) said recirculate circuit normally operating to connect the output and input of said message shift register together so as to recirculate said message repeatedly through said first serial memory;
(D) timing means generating
  (1) message marker pulses marking the beginning and end of a message originally recirculated in said message shift register, and further marking the time required to complete one normal message recirculation, and
  (2) digit marker pulses marking the time required to circulate a digit through said digit shift register; and
(E) a control circuit synchronized by said timing means and operating in response to a digit request from said output device to control said recirculate circuit to
  (1) recirculate said message serially through both said message and digit shift registers on receipt of a message marker pulse so as to shift the entire message relative to said message marker pulses by one digit time,
  (2) whereby the most significant digit of the first word of the message appears in said digit shift register for transmission to said output device after one message time plus one digit time has elapsed,
  (3) said control circuit then controlling said recirculate circuit to normally recirculate said message through said message shift register whereby said one digit time shift of said recirculated message relative to said message marker pulses is preserved until said output device requests the second most significant digit of the first word of the message.

88. The system defined in claim 87 wherein said digits are coded in binary code format and said digits are transmitted from said digit shift register to said output device in parallel bit format.

89. The system defined in claim 88 wherein said control circuit includes
(1) a transfer bid circuit and
(2) a buffer busy circuit,
(a) said buffer busy circuit and said transfer bid circuit operating in conjunction to prevent transfer of a second message to said output buffer until a first message has been transmitted to said output device.

90. A system for monitoring a plurality of stations, and accumulating dynamic and static data corresponding to each said station, wherein said dynamic data pertains to events occurring at each station and said static data pertains to relatively fixed conditions prevailing at each station, said system comprising, in combination,
(A) a cyclical address register containing addresses corresponding to each station;
(B) interrogating means operating in response to said addresses read from said address register to periodically interrogate corresponding stations in sequence to determine if an event has occurred;
(C) a first cyclical memory synchronized to said interrogating means and including
(1) a first magnetic drum track having
(a) a discrete location assigned to each station for storing accumulated dynamic data of the events occurring at each station,
(2) a first write head and a first read head operating in said first track,
(3) a second magnetic drum track,
(4) a second write head and a second read head operating in said second track, and
(5) said first read head operating in said first track to read out the time counts for recording in said second track by said second write head;
(D) a serial adder including
(1) a first input connected to said second read head,
(2) a second input connected to said interrogating means,
(3) a third input connected to said timing source, and
(4) an output connected to said first write head,
(5) said adder operating in response to said interrogating means to augment the accumulated dynamic data for those stations where events have occurred since last interrogated, and record the augmented dynamic data in said first track in the location assigned to those interrogated stations,
(E) a second cyclical memory operating in synchronism with said address register for storing static data corresponding to each station;
(F) a console connected to said interrogating means for
(1) individually selecting said stations for which static and dynamic data is to be read out from said first and second memories;
(G) a message assembly register controlled by said console to
(1) accept the static and dynamic data for a selected station read out from said first and second memories during the time said selected station is interrogated by said interrogated means, and
(2) arrange said accepted static and dynamic data in a predetermined format to form a message; and
(H) an output buffer connected to said message assembly register for transmitting assembled messages transferred from said message assembly register to an output device in a predetermined format.

91. A system for monitoring a plurality of stations, and accumulating dynamic and static data corresponding to each said station, wherein said dynamic data is in the form of words pertaining to different events occurring at each station and said static data is in the form of words pertaining to relatively fixed conditions prevailing at each station, said system comprising, in combination,
(A) a cyclical address register containing addresses corresponding to each station;
(B) interrogating means operating in response to said addresses read from said address register to periodically interrogate corresponding stations in sequence to determine if an event has occurred;
(C) first cyclical memories operating in synchronism with said address register and separately storing accumulated dynamic data words as to the different events occurring at each corresponding station;
(D) data processing means connected to said interrogating means and operating in response to the interrogation of each station to augment the separate accumulated dynamic data words in said first memories corresponding to those stations where said different events have occurred as determined by said interrogating means;
(E) second cyclical memories operating in synchronism with said address register for storing static data words corresponding to each station;
(F) a console connected to said interrogating means for
(1) individually selecting said stations for which static and dynamic data words are to be read out from said first and second memories;
(G) a message assembly register including
(1) a word selector controlled by said console to accept dynamic and static data words read from said first and second memories for a selected station,
(2) a hold register connected to said word selector for temporarily storing a data word accepted by said word selector,
(3) a storage device capable of storing at least one full message in serialized word order, said storage device
(a) connected to the output of said hold register, and
(b) providing predetermined word locations arranged in message order for storing data words of a message,
(4) a word counter operating in synchronism with said storage device to designate said predetermined word locations in said storage device,
(5) a word locator connected to said word selector to identify the data word accepted by said word selector and held in said hold register; and
(6) gating means receiving inputs from said word counter and said word locator, said gating means operating
(a) to initiate readout of the data word held in said hold register for storage in an appropriate one of said predetermined word locations in said storage device; and
(H) an output buffer connected to said message assembly register for transmitting assembled messages transferred from said message assembly register to an output device in a predetermined format.

92. A system for monitoring a plurality of stations, and accumulating dynamic and static data corresponding to each said station, wherein said dynamic data pertains to different events occurring at each station and said static data pertains to relatively fixed conditions prevailing at each station, said system comprising, in combination,
(A) a cyclical address register containing addresses corresponding to each station;

(B) interrogating means operating in response to said addresses read from said address register to periodically interrogate corresponding stations in sequence to determine if an event has occurred;

(C) first cyclical memories operating in synchronism with said address register and separately storing accumulated dynamic data as to the different events occurring at each corresponding station;

(D) data processing means connected to said interrogating means and operating in response to the interrogation of each station to augment the separate accumulated dynamic data in said first memories corresponding to those stations where said different events have occurred as determined by said interrogating means;

(E) second cyclical memories operating in synchronism with said address register for storing static data corresponding to each station;

(F) a console connected to said interrogating means for
  (1) individually selecting said stations for which static and dynamic data is to be read out from said first and second memories;

(G) a message assembly register controlled by said station selecting means to
  (1) accept the static and dynamic data for a selected station read out from said first and second memories during the time said selected station is interrogated by said interrogated means, and
  (2) arrange said accepted static and dynamic data in serial message unit order to form a message; and (H) an output buffer for transmitting to an output device in reverse serial order the message units forming a serial message, said output buffer including
  (1) a shift register for storing message units of a message in serial order having
    (a) an input,
    (b) an output, and
    (c) a capacity equal to the serial length of a message stored therein;
  (2) a second register having
    (a) an input connected to the output of said first shift register,
    (b) an output, and
    (c) a capacity of one message unit;
  (3) a transfer control circuit accepting transfer of an assembled message from said message assembly register for storage in said shift register,
  (4) a recirculate circuit normally operating to connect the input and output of said shift register together so as to recirculate said message repeatedly through said shift register;
  (5) means for identifying a selected message unit storage location in said shift register;
  (6) a control circuit
    (a) responsive to said identifying means and to a request signal from an output device to connect said shift register and said second register in series to recirculate the message through both said registers in series
      (i) whereby the entire message is delayed one message unit time in said registers to shift the last message unit into said selected message unit storage location,
    (b) said control circuit disconnecting said second register and reconnecting the input and output of said shift register in series when the last message unit of the message is read from said selected message unit storage location into said second register,
      (i) whereby the last message unit may be read from said second register for transmission to said output device.

References Cited
UNITED STATES PATENTS

| | | | |
|---|---|---|---|
| 2,978,680 | 4/1961 | Schulte | 340—172.5 |
| 2,985,368 | 5/1961 | Kohler | 235—92 |
| 3,099,512 | 7/1963 | Kohler | 346—34 |
| 3,114,900 | 12/1963 | Anderson | 340—182 |
| 3,231,867 | 1/1966 | Bartlett | 340—172.5 |
| 3,258,692 | 6/1966 | Jacomini | 324—113 |

ROBERT C. BAILEY, *Primary Examiner.*

R. B. ZACHE, *Assistant Examiner.*

UNITED STATES PATENT OFFICE
CERTIFICATE OF CORRECTION

Patent No. 3,344,408                                             September 26, 1967

Edwin Singer et al.

It is hereby certified that error appears in the above numbered patent requiring correction and that the said Letters Patent should read as corrected below.

Column 2, line 40, for "regions" read -- station --; column 8, line 44, for "are" read -- at --; column 11, line 66, for "A count" read -- A "count" --; column 15, line 5, for "real" read -- read --; column 16, line 33, for "weight" read -- weigh --; column 17, line 43, for "piec" read -- piece --; line 64, after "pulse" strike out "for"; column 23, line 49, for "last" read -- least --; column 30, line 5, for "lnie" read -- line --; column 41, line 62, after "enter" insert -- digit --; column 42, line 53, after "piece", second occurrence, insert -- count --; column 58, line 1, for "pulse" read -- pulses --; column 74, line 18, for "3" read -- 1 --; column 77, line 4, for "pulse" read -- pulses --; column 85, line 27, for the claim reference numeral "3" read -- 63 --; column 86, line 67, strike out "continuing"; column 89, line 3, strike out "of"; line 47, after "of" insert -- a --.

Signed and sealed this 22nd day of July 1969.

(SEAL)
Attest:

EDWARD M. FLETCHER, JR.                            WILLIAM E. SCHUYLER, JR.
Attesting Officer                                          Commissioner of Patents